US011539647B1

(12) United States Patent
Tai et al.

(10) Patent No.: US 11,539,647 B1
(45) Date of Patent: Dec. 27, 2022

(54) MESSAGE THREAD MEDIA GALLERY

(71) Applicant: Meta Platforms, Inc., Menlo Park, CA (US)

(72) Inventors: Farbound Tai, Palo Alto, CA (US); Wing Mei Cheramie Cheung, Menlo Park, CA (US); David Marc Cohen, Tel Aviv (IL); Andrew Suciu, Portola Valley, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/904,203

(22) Filed: Jun. 17, 2020

(51) Int. Cl.
| | | |
|---|---|---|
| *H04L 51/216* | (2022.01) | |
| *G06F 3/0482* | (2013.01) | |
| *H04L 51/10* | (2022.01) | |
| *G06F 16/43* | (2019.01) | |
| *G06F 16/438* | (2019.01) | |
| *G06F 16/538* | (2019.01) | |

(52) U.S. Cl.
CPC .......... *H04L 51/216* (2022.05); *G06F 3/0482* (2013.01); *G06F 16/43* (2019.01); *G06F 16/4393* (2019.01); *H04L 51/10* (2013.01); *G06F 16/538* (2019.01)

(58) Field of Classification Search
CPC ....... H04L 51/16; H04L 51/10; H04L 51/216; G06F 16/4393; G06F 3/0482; G06F 16/43; G06F 16/439
See application file for complete search history.

(56) References Cited

U.S. PATENT DOCUMENTS

| | | | | |
|---|---|---|---|---|
| 9,264,437 | B1 * | 2/2016 | Tran | H04L 65/4084 |
| 2009/0239558 | A1 * | 9/2009 | Choi | H04W 4/12 |
| | | | | 455/466 |
| 2012/0027256 | A1 * | 2/2012 | Kiyohara | G06F 16/435 |
| | | | | 382/103 |

(Continued)

FOREIGN PATENT DOCUMENTS

| | | | | |
|---|---|---|---|---|
| WO | WO-2017030642 A1 * | 2/2017 | | G06F 3/0482 |
| WO | WO-2018069728 A1 * | 4/2018 | | H04L 51/08 |

OTHER PUBLICATIONS

Office Action for U.S. Appl. No. 16/904,242, dated Mar. 31, 2022, Tai, "Message Thread Media Albums", 18 pages.

(Continued)

*Primary Examiner* — Amy M Levy
(74) *Attorney, Agent, or Firm* — Lee & Hayes, P.C.

(57) ABSTRACT

Techniques are described that provide a gallery of media files via a messaging application. The messaging application may include one or more messaging threads between a user and one or more other users. The user may share a media file with another user via a message associated with a message thread. The media files may include photographs, videos, links, screenshots, documents, graphic interchange format (GIF) images, and other media content shared between a user and one or more other users. A communication platform may determine that the message includes a media file and may associate the media file with media galleries associated with the user and the other user. The media galleries may enable both users to easily access shared media content and to quickly identify a particular media files of interest.

20 Claims, 22 Drawing Sheets

(56) References Cited

U.S. PATENT DOCUMENTS

| | | | |
|---|---|---|---|
| 2012/0131102 A1* | 5/2012 | Gabos | H04N 1/00164 709/204 |
| 2012/0331568 A1 | 12/2012 | Weinstein et al. | |
| 2013/0072239 A1* | 3/2013 | Hullfish | H04L 51/046 455/466 |
| 2013/0159878 A1* | 6/2013 | Kim | G06F 3/0482 715/752 |
| 2013/0332856 A1* | 12/2013 | Sanders | G06F 3/0481 715/753 |
| 2014/0188997 A1* | 7/2014 | Schneiderman | H04L 51/10 709/204 |
| 2014/0330824 A1 | 11/2014 | Johnson et al. | |
| 2015/0013016 A1* | 1/2015 | Kanter | H04L 67/10 726/28 |
| 2015/0085317 A1* | 3/2015 | Kim | G06K 15/007 358/1.15 |
| 2015/0104060 A1* | 4/2015 | Dolson | G06F 16/58 382/100 |
| 2016/0132231 A1* | 5/2016 | Rathod | G06F 3/017 715/719 |
| 2016/0285808 A1* | 9/2016 | Franklin | H04L 51/16 |
| 2016/0352667 A1* | 12/2016 | Pickett | H04L 51/16 |
| 2016/0364106 A1* | 12/2016 | Koum | G06F 3/0485 |
| 2016/0364108 A1* | 12/2016 | Koum | H04L 51/16 |
| 2017/0161388 A1* | 6/2017 | Aziz | G06Q 10/109 |
| 2017/0255883 A1 | 9/2017 | Grignon | |
| 2017/0310717 A1 | 10/2017 | Staples et al. | |
| 2017/0357382 A1* | 12/2017 | Miura | G06F 16/44 |
| 2018/0241871 A1* | 8/2018 | Sarafa | H04L 51/18 |
| 2018/0337994 A1 | 11/2018 | Dachille et al. | |
| 2019/0052734 A1 | 2/2019 | Bradley et al. | |
| 2019/0138174 A1* | 5/2019 | Deets, Jr. | H04M 1/7243 |
| 2019/0215173 A1 | 7/2019 | Svendsen | |
| 2019/0230330 A1 | 7/2019 | Winn et al. | |
| 2019/0245821 A1* | 8/2019 | Crowe | H04W 4/12 |
| 2019/0339822 A1* | 11/2019 | Devine | G06F 3/0484 |
| 2019/0391997 A1 | 12/2019 | Duggal et al. | |
| 2020/0099639 A1* | 3/2020 | McBeath | H04L 51/12 |

OTHER PUBLICATIONS

Office Action for U.S. Appl. No. 16/904,242, dated Nov. 30, 2021, Tai," Message Thread Media Albums", 15 Pages.

* cited by examiner

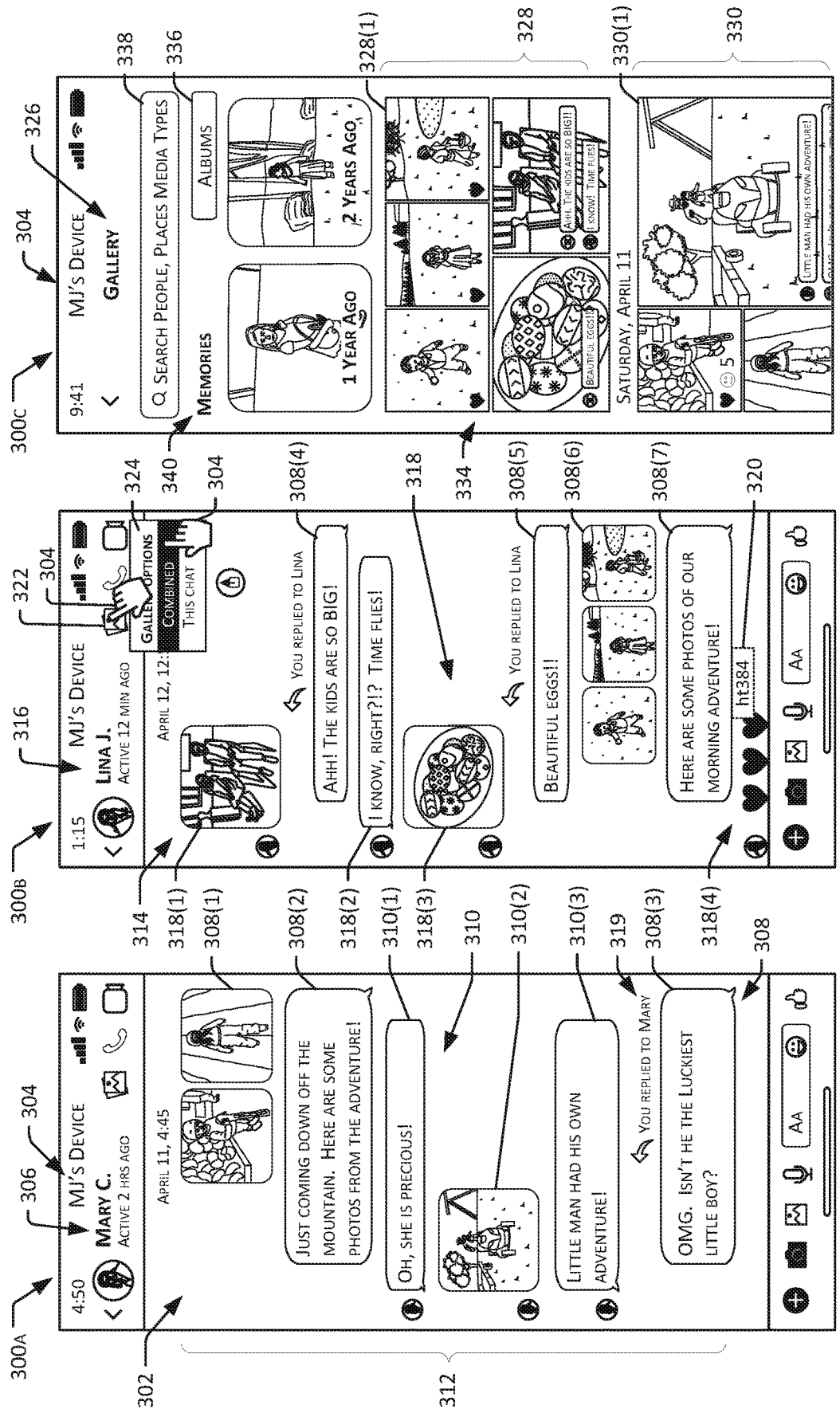

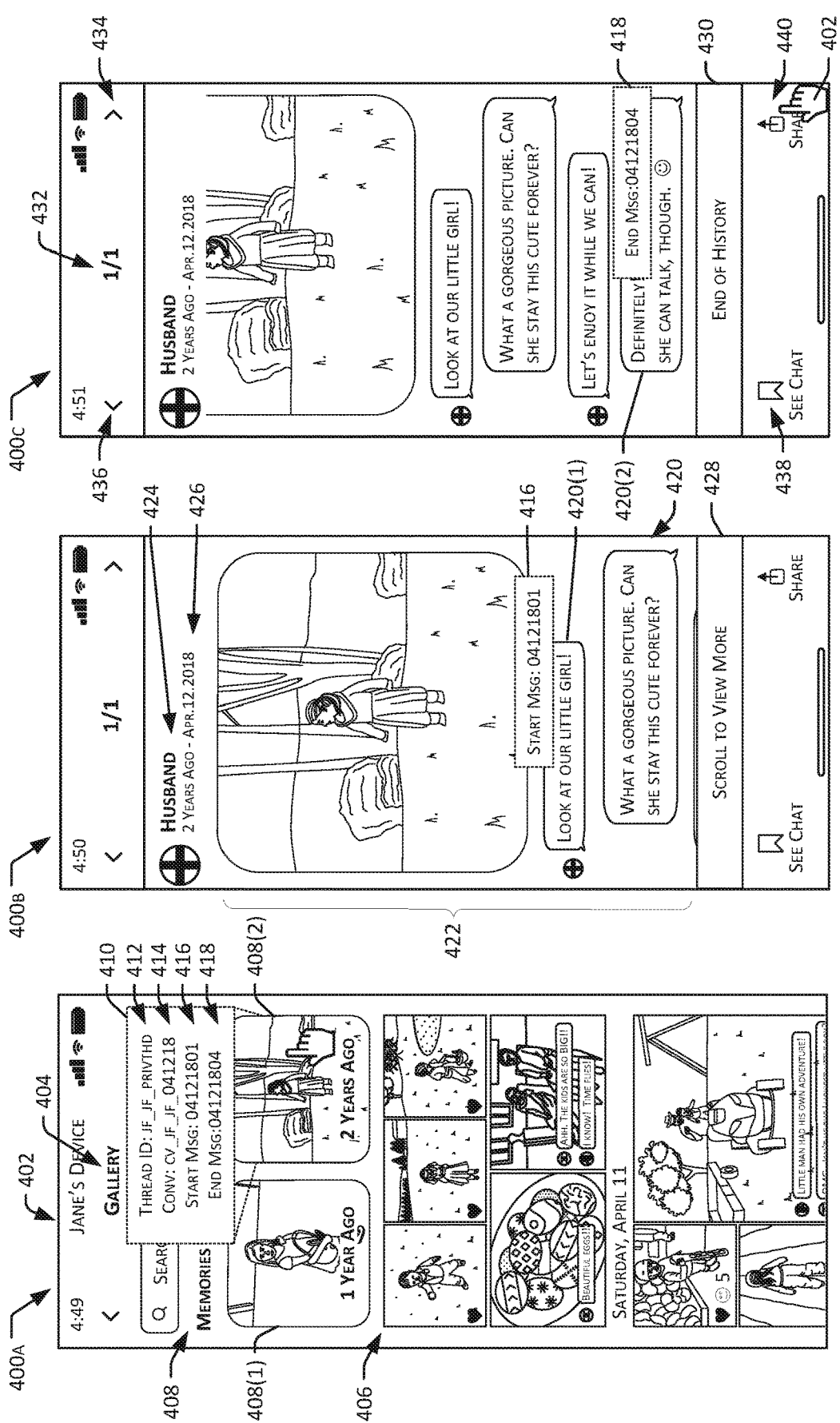

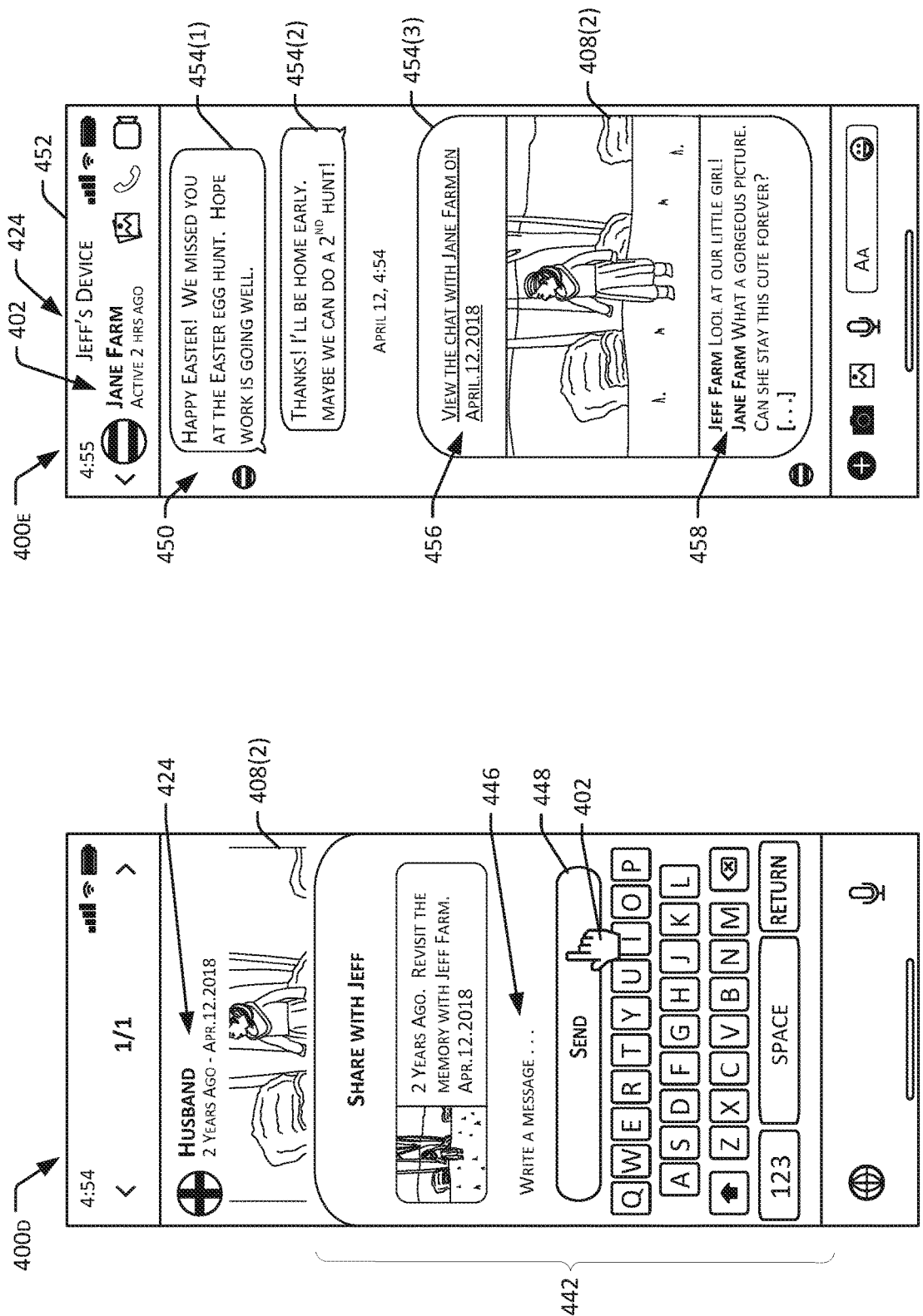

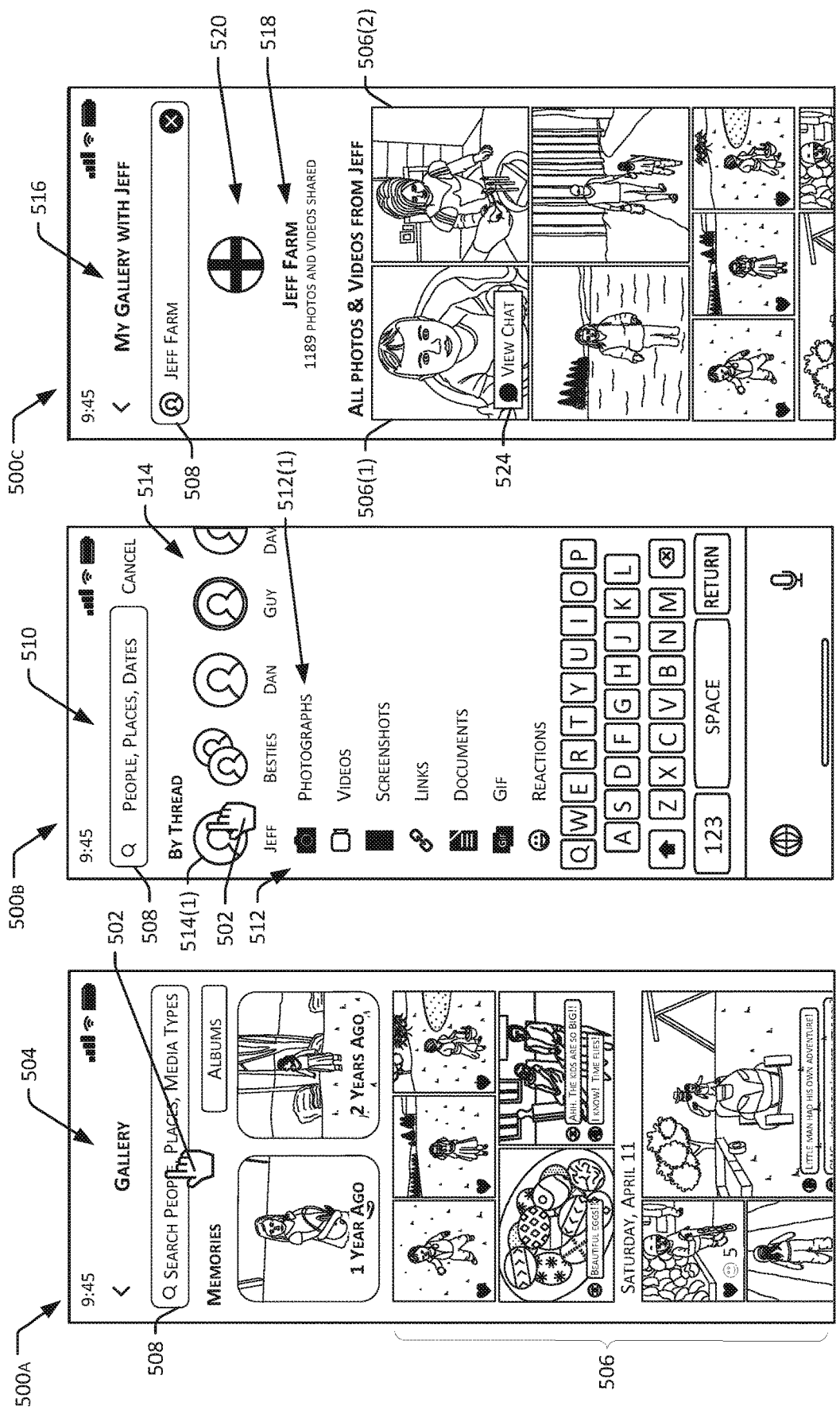

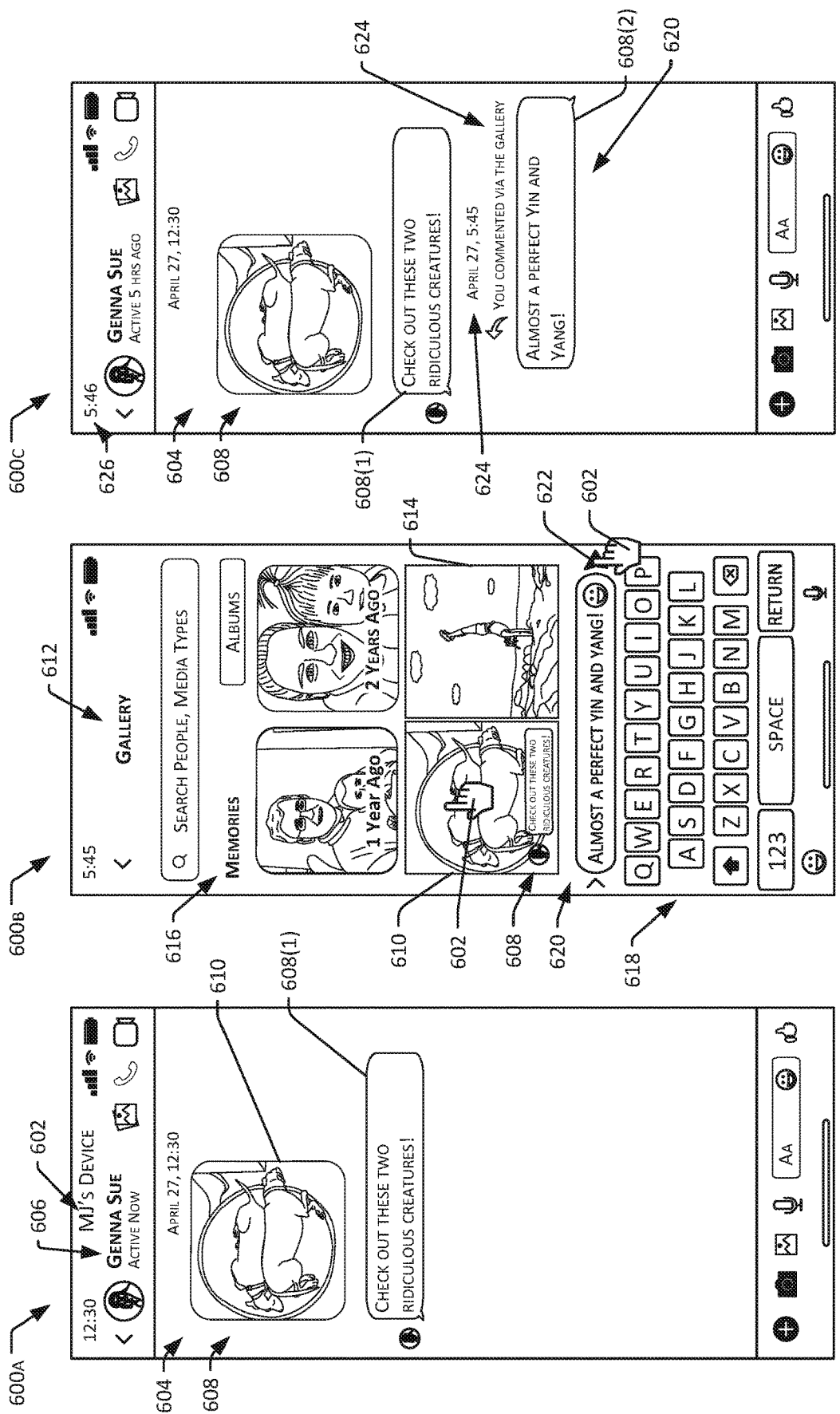

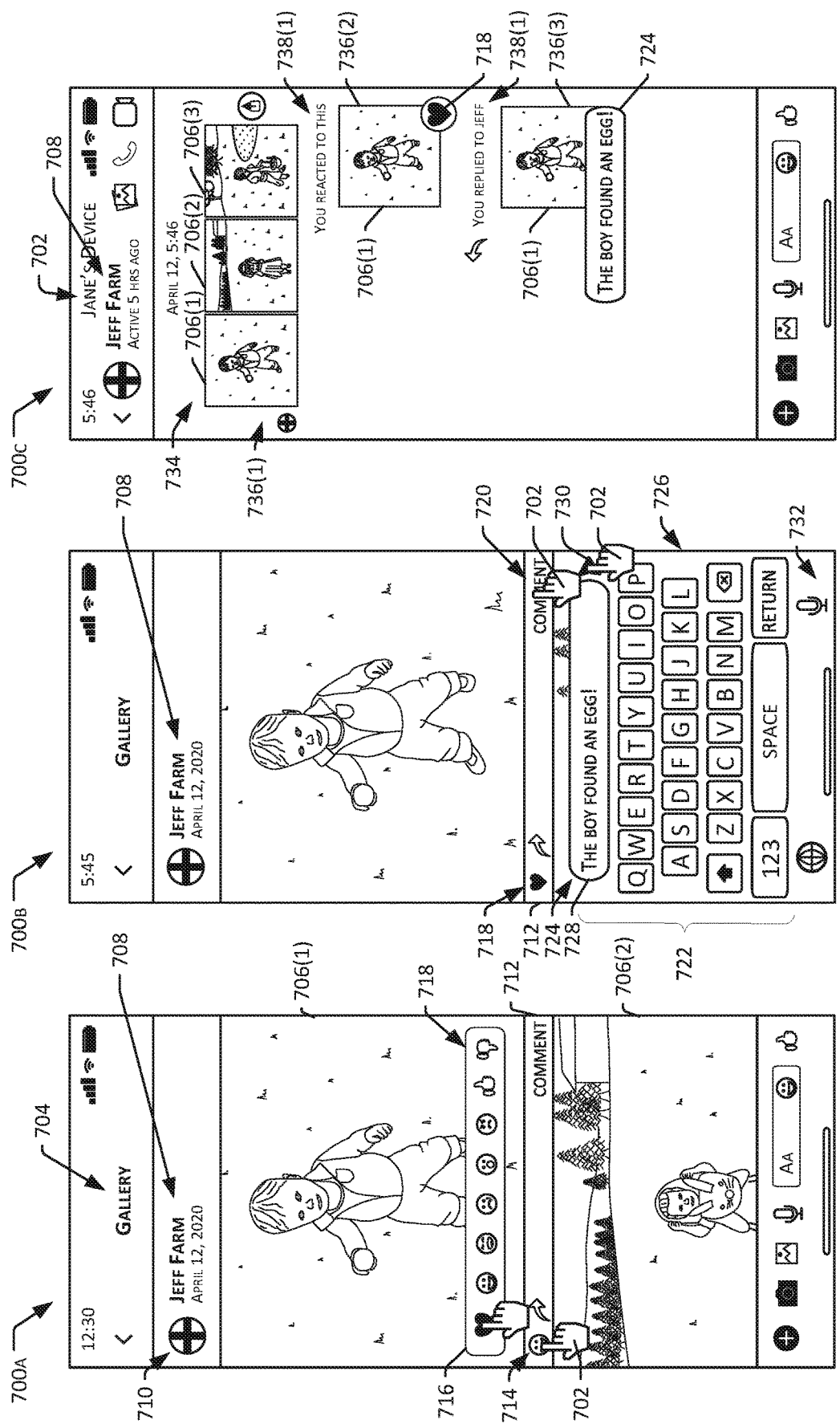

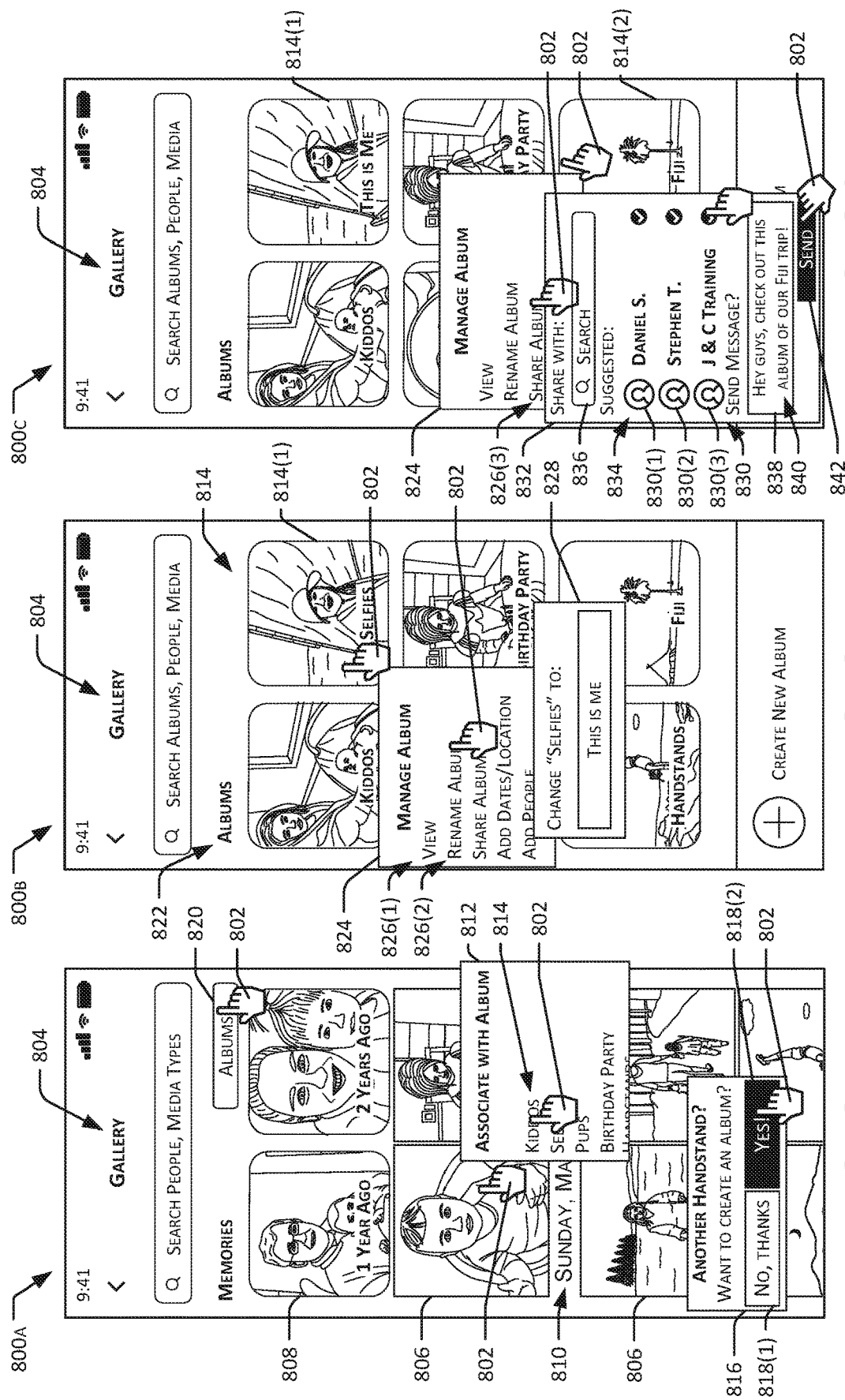

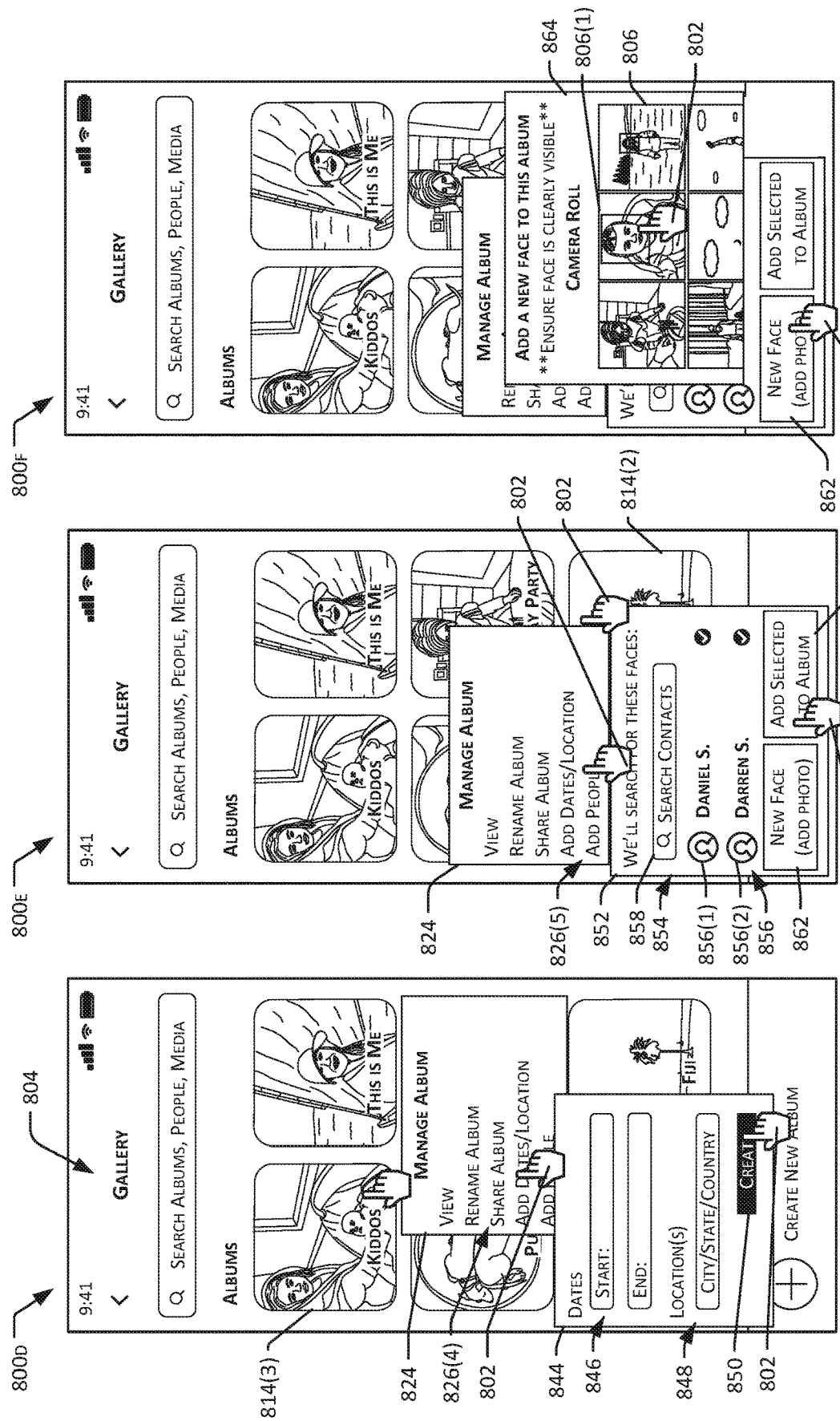

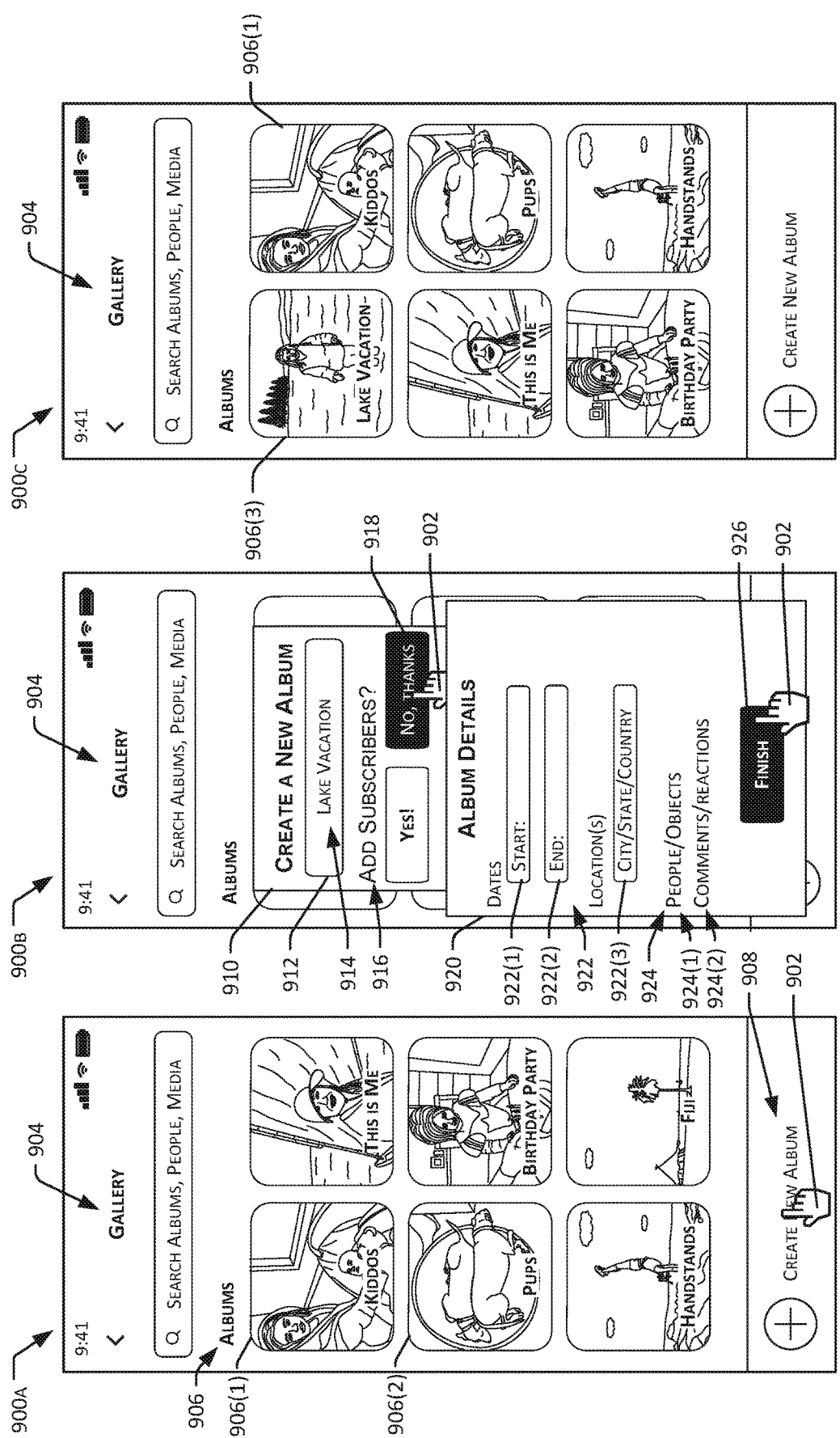

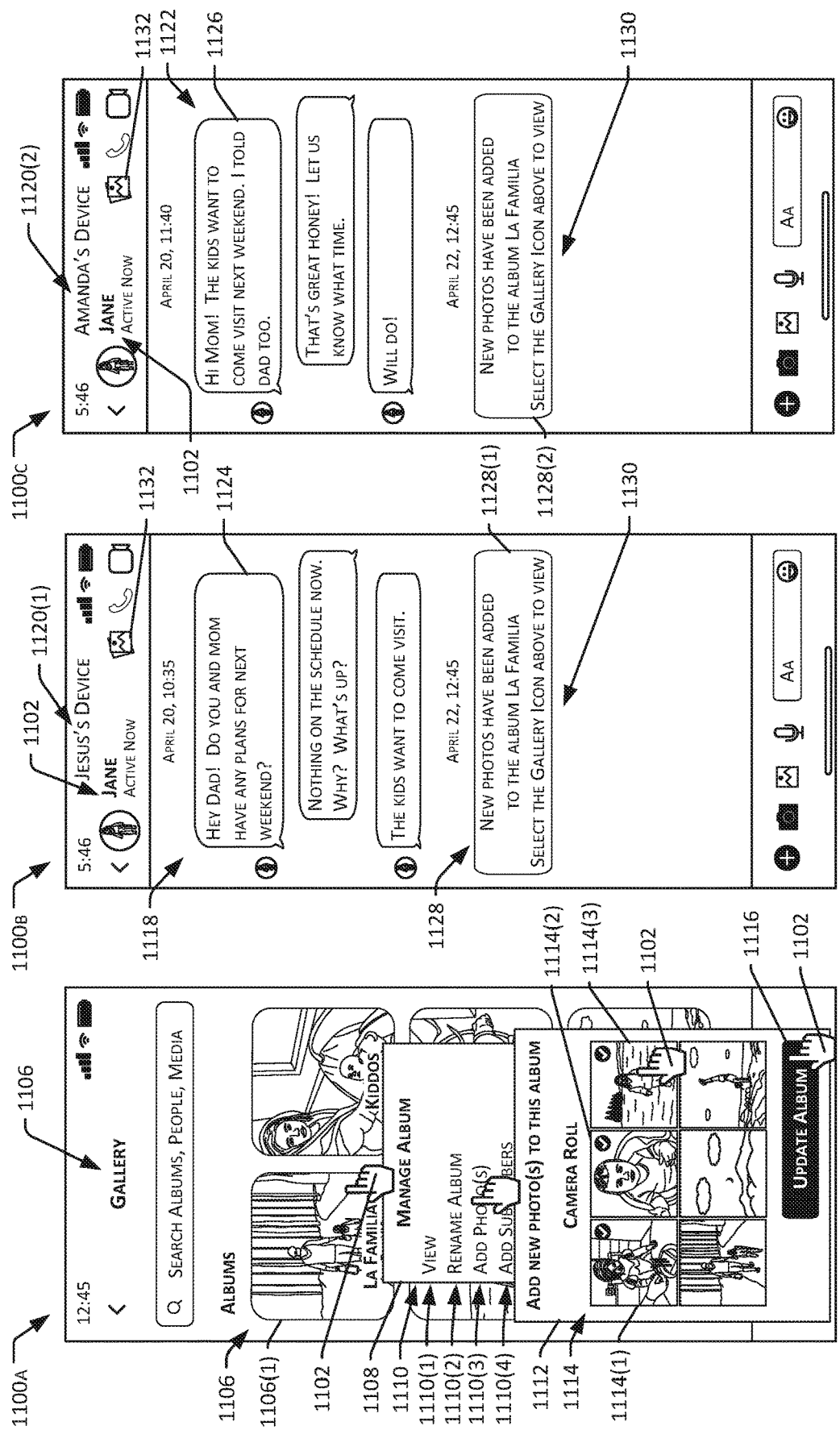

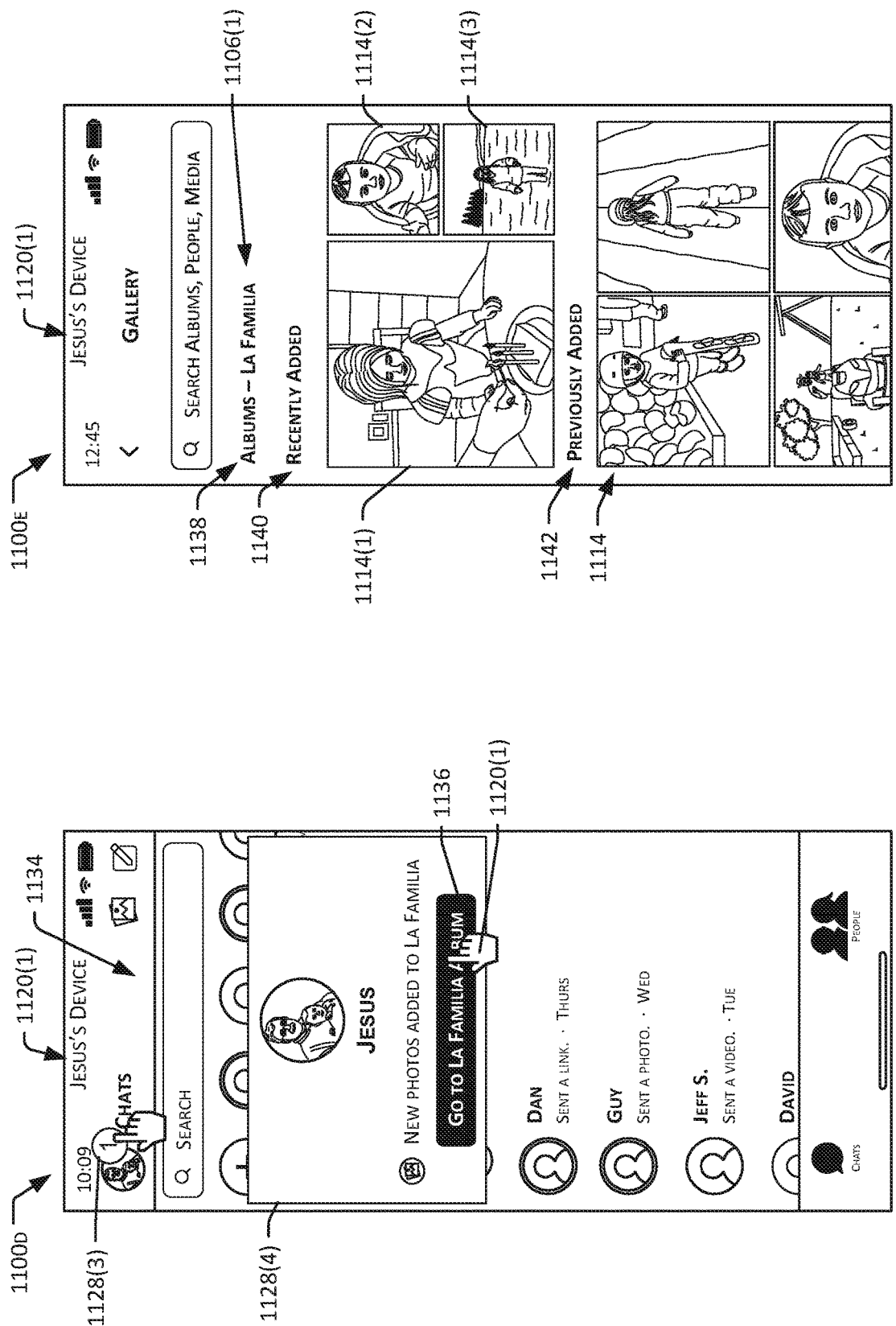

1600

RECEIVE, FROM A FIRST USER DEVICE ASSOCIATED WITH A FIRST USER ACCOUNT, A MEDIA FILE FOR ASSOCIATION WITH AN ALBUM OF A MEDIA GALLERY
1602

IDENTIFY A SECOND USER ACCOUNT ASSOCIATED WITH A SUBSCRIBER TO THE ALBUM
1604

IDENTIFY A MESSAGING THREAD BETWEEN THE FIRST USER ACCOUNT AND THE SECOND USER ACCOUNT
1606

CAUSE A NOTIFICATION THAT THE MEDIA FILE WAS ASSOCIATED WITH THE ALBUM TO BE PRESENTED VIA THE SECOND USER ACCOUNT IN ASSOCIATION WITH THE MESSAGING THREAD
1608

FIG. 16

MESSAGE THREAD MEDIA GALLERY

BACKGROUND

Messaging applications are becoming an increasingly popular means by which people communicate. Oftentimes, the messaging applications support sharing media content, such as photographs, videos, and the like via messaging threads. Such sharing enables people to feel more in touch with one another and up-to-date with the events taking place in each other's lives. For example, a first person may share a photo of an event, such as a birth of a child, with a second person via a messaging thread. The second person may view the photo and reply to the photo via the messaging thread. However, over time, and after many messages have been sent via the messaging thread, the photo of the event may be difficult to find in the messaging inbox. The second person may be required to scroll through dozens, or hundreds of messages to access the photo of the event and re-live the memory. Such scrolling can be cumbersome and inefficient and can result in a frustrating user experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3A-3C illustrate example interfaces associated with a messaging application. FIGS. 3A and 3B illustrate examples interfaces of messaging threads through which media content may be shared between users. FIG. 3C illustrates an example interface of an example media gallery including media content shared via the messaging threads illustrated in FIGS. 3A and 3B.

FIGS. 4A-4E illustrate example interfaces usable to enable a user to view and share a media content and associated messages from a past conversation.

FIGS. 5A-5C illustrate example interfaces usable to enable a user to search for media content associated with messaging threads.

FIGS. 6A-6C illustrate example interfaces usable to enable a user to comment on a media content via an example media gallery.

FIGS. 7A-7C illustrate example interfaces usable to enable a user to share comments and reactions to media content via an example media gallery.

FIGS. 8A-8F illustrate example interfaces usable to enable a user to manage albums of media content via an example media gallery.

FIGS. 9A-9C illustrate example interfaces usable to enable a user to create an album of media content via an example media gallery.

FIGS. 11A-11E illustrate example interfaces usable to enable a user to update an album that is shared with other users. FIG. 11A illustrates an example interface via which the user may add new media content to the album. FIGS. 11B-11D illustrate example interfaces via which the other users may be notified that the album was updated. FIG. 11E illustrates an example interface in which another user may view the album with the new media content.

FIG. 16 illustrates an example process for causing a presentation of a media content associated with a memory via a media gallery, utilizing the techniques described herein.

DETAILED DESCRIPTION

Figure 1:
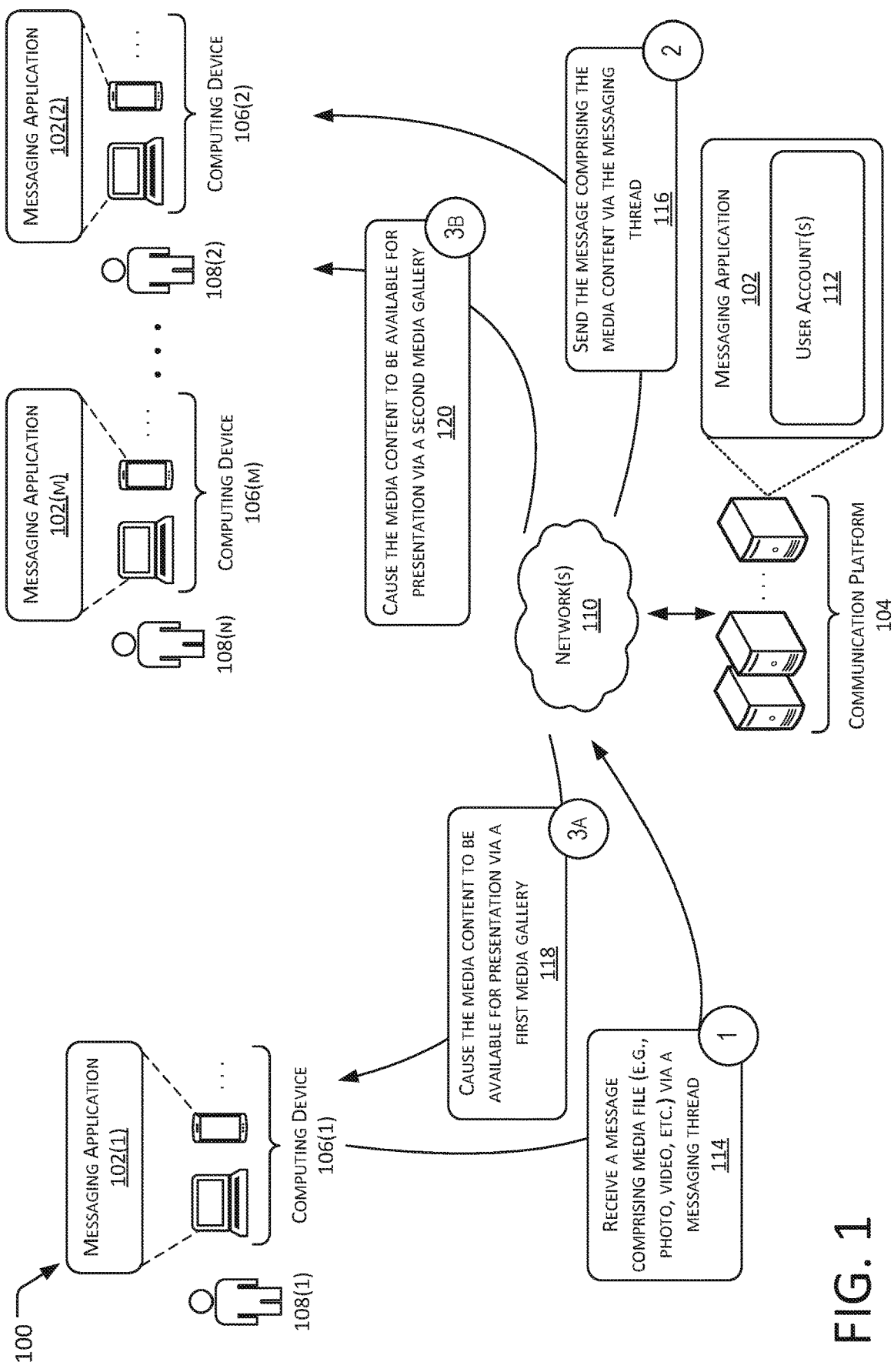
FIG. 1 is a schematic view of an example system usable to generate example message thread media galleries, as described herein.

As discussed above, messaging applications have become an increasingly popular means through which people share media content, such as photographs, videos, links, and the like. Over time, the media content may get buried under a plethora of messages sent via a messaging thread, making the content sharing ephemeral. However, many of the events captured or described in the media content may include meaningful experiences, and those which people may want to revisit at later times. For instance, a first user may communicate with a second user via a messaging thread, such as to keep up to date on events occurring in each other's lives. The first user and the second user may share stories and media content describing the events and other experiences in their lives. The messaging thread may be stored in the application and/or by a communication platform so the first user and the second user may access the messages and/or media content. Over time, the first user and the second user may initiate many different conversations in the messaging thread, making it increasingly more difficult to find particular media content associated with a conversation. For instance, the first user and/or the second user may scroll through and read dozens of pages of messages to locate particular media content of interest.

This application describes techniques for providing a gallery of media content (e.g., photographs, videos, links, screenshots, documents, graphic interchange format (GIF) images, etc.) associated with messaging threads (e.g., conversation threads, threads, etc.) on a messaging application provided by a communication platform, to enable a user to easily access media content and quickly identify a particular media content of interest to the user. The media gallery may include media content from a single messaging thread and/or a plurality of messaging threads.

A media content may be associated with a conversation thread and presented on a user device via the messaging thread and the media gallery. For instance, a communication platform may process messages between a first user and a second user in a messaging thread. The communication platform may determine that a messaging thread includes a media content and may store the media content in association with a first media gallery associated with the first user and a second media gallery associated with a second user. The communication platform may additionally determine and store metadata associated with the media content, such as a time the media content was generated, a location associated with the media content generation, a time stamp associated with the media content being sent via a messaging thread, a messaging thread identifier, and the like. In some examples, the communication platform may determine that one or more messages sent via the messaging thread in response to the media content include comments and/or reactions thereto. In such examples, the communication platform may store the comments and/or reactions as metadata associated with the media content. The communication platform may cause the media content, the comments, and/or reactions thereto to be presented via the media gallery. In various examples, the communication platform may receive comments and/or reactions to select media content via the media gallery. In such examples, the communication platform may store the comments and/or reactions as metadata associated with the media content and may cause the comments and/or reactions to be sent as a message via the messaging thread.

In some examples, the communication platform may receive a first message associated with a messaging thread including messages between a first user and a second user, wherein the messages are transmitted between a first instance of an application on a first user device associated with the first user and a second instance of the application on a second user device associated with the second user and determine that the first message comprises a media file. The communication platform may associate the media file with a first media gallery associated with a first user account of the first user, wherein the first media gallery comprises media files associated with messaging threads between the first user and one or more other users. The communication platform may receive, from the first user device via the first instance of the application, a request to view the first media gallery and cause the first media gallery including the media file to be presented at the first user device via the first instance of the application based at least in part on the request to view the first media gallery.

In some examples, the communication platform may receive, from the first user device via the first media gallery associated with the first user account, at least one of a comment or a reaction to the media file and associate the at least one of the comment or the reaction with the media file. The communication platform may send, to the second user device via the second instance of the application, the at least one of the comment or the reaction as a second message associated with the messaging thread In some examples, the communication platform may receive, from the second user device via the second instance of the application at a second time after the first time, a second message associated with the messaging thread and determine that the second message includes at least one of a comment or a reaction to the media file. The communication platform may associate the at least one of the comment or the reaction to the media file and cause the at least one of the comment or the reaction to be presented in association with the media file based at least in part on the request to view the first media gallery.

In some examples, the communication platform may receive, from the first user device via the first media gallery associated with the first user account, an indication of selection of the media file. The communication platform may determine that the messaging thread is associated with the media file and may cause the messaging thread to be presented at the first user device via the first instance of the application based at least in part on the indication of selection.

In some examples, the communication platform may process a second group of messages associated with a second messaging thread of the messaging threads, the second messaging thread being between the first user and a third user, wherein the second group of messages are transmitted between the first instance of the application and a third instance of the application on a third device associated with the third user. The communication platform may determine that a second message of the second group of messages comprises a second media file received at a second time prior to the first time. The communication platform may associate the second media file with the first media gallery and cause the first media file and the second media file to be presented at the first user device via the first instance of the application based at least in part on a request to view the first media gallery.

In some examples, the communication platform may determine a first time associated with the request to view the first media gallery and may identify a second media file associated with a second time, the second time being a predetermined time period prior to the first time. Based on receiving a request to view the first media gallery, the communication platform may cause the second media file to be presented based at least in part on the predetermined time period.

In some examples, the communication platform may receive, from the first user device, an indication of selection of a second media file associated with a predetermined time period in the past. The communication platform may determine a second messaging thread associated with the second media file and may cause the second messaging thread to be presented at the first user device via the first instance of the application based at least in part on the indication of selection of the second media file, wherein the second media file associated with the second time is presented with the second messaging thread.

In some examples, the communication platform may associate the media file with a second media gallery associated with a second user account of the second user, wherein the second media gallery comprises a plurality of media files associated with a plurality of messaging threads between the second user and a plurality of users. The communication platform may receive, from the second user device via the second instance of the application, a request to view the second media gallery and cause the media file to be presented at the second user device via the second instance of the application based at least in part on the request to view the second media gallery.

In various examples, the communication platform may receive, from the first user device via the first instance of the application or the second user device via the second instance of the application, a second message associated with the messaging thread at a second time after the first time. The communication platform may determine that the second message comprises at least one of a comment or a reaction to the media file based at least in part on determining that at least one of: a time period between the first message and the second message is less than a threshold time period, the second message is proximate the first message in the messaging thread, or a content of the second message is associated with the media file. The communication platform may associate the at least one of the comment or the reaction with the media file and cause the first media gallery to be presented comprises causing the media file and the at least one of the comment or the reaction associated therewith to be presented at the first user device.

In various examples, the communication platform may determine a characteristic of the media file, wherein the characteristic comprises at least one of: an object captured in the media file, a location associated with the media file, or a time associated with a capture of the media file. The communication platform may identify an album corresponding to the first media gallery that is associated with the characteristic and associate the media file with the album.

In various examples, the communication platform may receive, from the first user device via the first media gallery associated with the first user account, a request to view one or more albums associated with the first media gallery, each of the one or more albums having associated therewith at least one media file of the plurality of media files. The communication platform may cause the one or more albums to be presented at the first user device via the first instance of the application based at least in part on the request to view the one or more albums.

In various examples, the communication platform may receive, from the first user device via the first media gallery associated with the first user account, a request to share the album with a third user and send, to a third user device associated with the third user, an instance of the album.

In various examples, the communication platform may receive, from the first user device via the first media gallery associated with the first user account, a request to modify the characteristic associated with the album. The communication platform may associate a modified characteristic with the album and determine, based at least in part on the modified characteristic, that the media file is not associated with the album. The communication platform may remove an association between the media file and the album, wherein responsive to removing the association, the media file is presented via the first media gallery but not via the album associated therewith.

In various examples, the communication platform may receive, from the first user device via the first media gallery associated with the first user account, a request to add a person to the album. The communication platform may receive at least one of: an indication of a user identifier corresponding to a second user account associated with the person, or a second media file comprising an image of the person. The communication platform may identify one or more media files associated with the person and cause the one or more media files to be presented in association with the album.

In some examples, the communication platform may receive, from the first user device via the first media gallery associated with the first user account, a request to create an album comprising one or more media files, the request comprising a characteristic associated with the album, the characteristic comprising at least one of: an object captured in the media file, a location associated with the media file, a time associated with a capture of the media file. The communication platform may identify the one or more media files of the plurality of media files that comprise the characteristic and associate the one or more media files with the album. The communication platform may receive, from the first user device via the first media gallery associated with the first user account, a request to view the album and cause the album comprising the one or more media files to be presented at the first user device based at least in part on the request to view the album.

In some examples, the communication platform may receive, from a first user device associated with a first user account and via a first instance of a messaging application, a request to generate an album of media files, the request comprising an identifier associated with a subscriber to the album. The communication platform may identify a second user account associated with the subscriber based at least in part on the identifier and associate the second user account with the album based at least in part on the request to generate the album. The communication platform may receive, from the first user device, a request to associate a media file with the album and associate the media file with the album based at least in part on the request to associate the media file with the album. The communication platform may send, to a second user device associated with the second user account via a second instance of the messaging application, a notification that the media file has been associated with the album.

In various examples, the communication platform may send, to the second user device via the second instance of the messaging application, a request to approve an association between the second user account and the album corresponding to the first user account. The communication platform may receive, from the second user device, an indication of approval of the association, and associate the second user account with the album based at last in part on receiving the indication of approval.

In some examples, the communication platform may receive, from the first user device via the first instance of the messaging application, a request to add a second subscriber to the album, the request to add the second subscriber comprising a second identifier associated with the second subscriber. The communication platform may determine that the first subscriber is not a contributor to the album and associate a third user account corresponding to the second subscriber with the album based at least in part on determining that the first subscriber is not the contributor.

In some examples, the communication platform may receive, from the first user device via the first instance of the messaging application, a request to add a second subscriber to the album, the request to add the second subscriber comprising a second identifier associated with the second subscriber. The communication platform may determine that a first subscriber is a contributor to the album and may send, to the second user device associated with the first subscriber via the second instance of the messaging application, a request to approve an association between the second subscriber and the album. Based on a determination that the association is not approved by the first subscriber, the communication platform may send a second notification to the first user device indicating that the association was not approved by the first subscriber. Based on a determination that the association is approved by the first subscriber, the communication platform may associate the second subscriber with the album.

In some examples, the communication platform may receive, from the first user device via the first instance of the messaging application, an indication that the subscriber is a contributor to the album. The communication platform may receive, from the second user device via the second instance of the messaging application, a second media file to associate with the album and associate the second media file with the album. The communication platform may send, to the first user device via the first instance of the messaging application, a second notification that the second media file has been associated with the album.

In some examples, the communication platform may receive, from the second user device via the second instance of the messaging application, a request to view the album and cause the media file associated with the album to be presented at the second user device based at least in part on the request.

In some examples, the communication platform may determine that the first user has associated the media file to the album and send, to a second user device associated with the second user account via a second instance of the messaging application, a notification that the media file has been associated with the album, the notification comprising at least one of: a message associated with a messaging thread between the first user account and the second user account, a pop-up notification associated with the messaging application, a text message, or an electronic mail message.

In some examples, the communication platform may receive, from the second user device via the second instance of the messaging application, a request to view the album and cause the media file associated with the album to be presented at the second user device via the second instance of the messaging application based at least in part on the request to view the album.

In some examples, the communication platform may identify a messaging thread between the first user account and the second user account associated with the subscriber and send the notification to the subscriber via the messaging thread.

The techniques described herein improve a user interface of a computing device by providing a gallery of media content transmitted via multiple messaging threads. The media gallery may provide a means by which a user may quickly access media content transmitted via different messaging threads, such as to relive old memories, review the materials, or the like. The media gallery may additionally provide a means by which a user may comment and/or react to media content. For instance, the context identifier may improve efficiency of using an electronic device by allowing the user to comment and/or react to a media content without first searching through a messaging thread to identify the media content.

Additionally, the techniques described herein improve performance of one or more computing devices by reducing an amount of time necessary to identify a media content. As discussed above, in a traditional messaging application, a user may scroll through dozens, if not hundreds, of messages of a messaging thread before identifying a particular media content previously sent via the messaging thread. Utilizing the techniques described herein, the user may easily locate the media content by accessing the media gallery and/or performing a search within the media gallery. The ease of access to media content may reduce a total amount of time and processing power required to find particular media content.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device. Also, while many of the examples are given in the context of providing customer service, the techniques described herein may also be applied to any other type of messaging with a third-party service provider or other party via a messaging application.

In particular examples, one or more objects (e.g., content or other types of objects) of a computing system may be associated with one or more privacy settings. The one or more objects may be stored on or otherwise associated with any suitable computing system or application, such as, for example, a messaging application, a social-networking system, a client system, a third-party system, a social-networking application, a photo-sharing application, or any other suitable computing system or application. Although the examples discussed herein are in the context of an online messaging application, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the messaging application network. When privacy settings for an object allow a particular user or other entity to access that object, the object may be described as being "visible" with respect to that user or other entity. As an example, and not by way of limitation, a user of the messaging application may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities with whom a user does not want to communicate. The blocked list or restricted list may specify one or more users or entities for which an object is not visible. As an example, and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example, and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the messaging application network. Similarly, the privacy settings applied to a particular node may control whether the user or concept corresponding to the node is visible to other users of the messaging application network. As an example, and not by way of limitation, a first user may share an object to a communication platform associated with a messaging application. The object may be associated with a concept node connected to a user node of the first user by an edge. The first user may specify privacy settings that apply to a particular edge connecting to the concept node of the object or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular examples, the communication platform associated with the messaging application may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the communication platform may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access, including the "restrict" functionality described herein. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers may be authorization/privacy servers for enforcing privacy settings. In response to a request from a user (or other entity) for a particular object stored in a data store, the communication platform may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example, and not by way of limitation, one or more objects may be visible to a user's "Trending" page. In particular examples, an object may correspond to a particular user. The object may be content associated with the particular user or may be the particular user's account or information stored on the communication platform, or other computing system. As an example, and not by way of limitation, a first user may view one or more second users of an online messaging application network through a "People You May Know" function of the online messaging application network, or by viewing a list of friends of the first user. As an example, and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may have different types of privacy settings. As an example, and not by way of limitation, a first user may specify that the first user's status updates are public, but any images shared by the first user are visible only to the first user's friends on the online messaging application network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example, and not by way of limitation, a first user may specify that other users who attend the same university as the first user may view the first user's pictures, but that other users who are family members of the first user may not view those same pictures.

In particular examples, the communication platform may provide one or more default privacy settings for each object of a particular object-type. A privacy setting for an object that is set to a default may be changed by a user associated with that object. As an example, and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the communication platform may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The communication platform may access such information in order to provide a particular function or service to the first user, without the communication platform having access to that information for any other purposes. Before accessing, storing, or using such objects or information, the communication platform may prompt the user to provide privacy settings specifying which applications or processes, if any, may access, store, or use the object or information prior to allowing any such action. As an example, and not by way of limitation, a first user may transmit a message to a second user via an application related to the online messaging network (e.g., a messaging app), and may specify privacy settings that such messages should not be stored by the social-networking system.

In particular examples, a user may specify whether particular types of objects or information associated with the first user may be accessed, stored, or used by the communication platform. As an example, and not by way of limitation, the first user may specify that images sent by the first user through the communication platform (a messaging application associated therewith) may not be stored by the communication platform. As another example and not by way of limitation, a first user may specify that messages sent from the first user to a particular second user may not be stored by the communication platform. As yet another example and not by way of limitation, a first user may specify that all objects sent via a particular application may be saved by the communication platform.

In particular examples, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The communication platform may provide default privacy settings with respect to each device, system, or application, and/or the first user may be prompted to specify a particular privacy setting for each context. As an example, and not by way of limitation, the first user may utilize a location-services feature of the communication platform to provide recommendations for restaurants or other places in proximity to the user. The first user's default privacy settings may specify that the communication platform may use location information provided from a client device of the first user to provide the location-based services, but that the communication platform may not store the location information of the first user or provide it to any third-party system. The first user may then update the privacy settings to allow location information to be used by a third-party image-sharing application in order to geo-tag photos.

Privacy Settings for Mood, Emotion, or Sentiment Information

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The communication platform may predict or determine a mood, emotion, or sentiment associated with a user based on, for example, inputs provided by the user and interactions with particular objects, such as based on messages sent by the user, and interactions with other content of the online messaging network. In particular examples, the communication platform may use a user's previous activities and calculated moods, emotions, or sentiments to determine a present mood, emotion, or sentiment. A user who wishes to enable this functionality may indicate in their privacy settings that they opt in to the communication platform receiving the inputs necessary to determine the mood, emotion, or sentiment. As an example, and not by way of limitation, the communication platform may determine that a default privacy setting is to not receive any information necessary for determining mood, emotion, or sentiment until there is an express indication from a user that the communication platform may do so. By contrast, if a user does not opt in to the communication platform receiving these inputs (or affirmatively opts out of the communication platform receiving these inputs), the communication platform may be prevented from receiving, collecting, logging, or storing these inputs or any information associated with these inputs. In particular examples, the communication platform may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example, and not by way of limitation, the communication platform may use the user's mood, emotion, or sentiment to provide newsfeed items, pages, friends, or advertisements to a user. The user may specify in their privacy settings that the communication platform may determine the user's mood, emotion, or sentiment. The user may then be asked to provide additional privacy settings to indicate the purposes for which the user's mood, emotion, or sentiment may be used. The user may indicate that the communication platform may use his or her mood, emotion, or sentiment to provide newsfeed content and recommend pages, but not for recommending friends or advertisements. The communication platform may then only provide newsfeed content or pages based on user mood, emotion, or sentiment, and may not use that information for any other purpose, even if not expressly prohibited by the privacy settings.

Privacy Settings for Ephemeral Sharing

In particular examples, privacy settings may allow a user to engage in the ephemeral sharing of objects on the online messaging network. Ephemeral sharing refers to the sharing of objects (e.g., posts, photos) or information for a finite period of time. Access or denial of access to the objects or information may be specified by time or date. As an example, and not by way of limitation, a user may specify that a particular message sent by the user is visible to the user's friends for the next week, after which time the message may no longer be accessible to other users. As another example and not by way of limitation, a company may post content related to a product release ahead of the official launch and specify that the content may not be visible to other users until after the product launch.

In particular examples, for particular objects or information having privacy settings specifying that they are ephemeral, the communication platform may be restricted in its access, storage, or use of the objects or information. The communication platform may temporarily access, store, or use these particular objects or information in order to facilitate particular actions of a user associated with the objects or information, and may subsequently delete the objects or information, as specified by the respective privacy settings. As an example, and not by way of limitation, a first user may transmit a message to a second user, and the communication platform may temporarily store the message in a data store until the second user has viewed or downloaded the message, at which point the communication platform may delete the message from the data store. As another example and not by way of limitation, continuing with the prior example, the message may be stored for a specified period of time (e.g., 2 weeks), after which point the communication platform may delete the message from the data store.

Privacy Settings for User-Authentication and Experience-Personalization Information In particular examples, the communication platform may have functionalities that may use, as inputs, personal or biometric information of a user for user-authentication or experience-personalization purposes. A user may opt to make use of these functionalities to enhance their experience on the online messaging network. As an example, and not by way of limitation, a user may provide personal or biometric information to the social-networking system. The user's privacy settings may specify that such information may be used only for particular processes, such as authentication, and further specify that such information may not be shared with any third-party system or used for other processes or applications associated with the communication platform. As another example and not by way of limitation, the communication platform may provide a functionality for a user to provide voice-print recordings to the online messaging network. As an example, and not by way of limitation, if a user wishes to utilize this function of the online messaging network, the user may provide a voice recording of his or her own voice to provide a status update on the online messaging network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system or used by other processes or applications associated with the communication platform. As another example and not by way of limitation, the communication platform may provide a functionality for a user to provide a reference image (e.g., a facial profile, a retinal scan) to the online messaging network. The online messaging network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system or used by other processes or applications associated with the communication platform.

User-Initiated Changes to Privacy Settings

In particular examples, changes to privacy settings may take effect retroactively, affecting the visibility of objects and content shared prior to the change. As an example, and not by way of limitation, a first user may share a first image and specify that the first image is to be public to all other users. At a later time, the first user may specify that any images shared by the first user should be made visible only to a first user group. The communication platform may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the communication platform may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the communication platform may determine that a first user may want to change one or more privacy settings in response to a trigger action associated with the first user. The trigger action may be any suitable action on the online messaging network. As an example, and not by way of limitation, a trigger action may be a change in the relationship between a first and second user of the online messaging network (e.g., "un-friending" a user, changing the relationship status between the users). In particular examples, upon determining that a trigger action has occurred, the communication platform may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online messaging network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example, and not by way of limitation, a user's default privacy settings may indicate that a person's relationship status is visible to all users (i.e., "public"). However, if the user changes his or her relationship status, the communication platform may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the communication platform may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example, and not by way of limitation, the communication platform may send a reminder to the user to confirm his or her privacy settings every six months or after every ten photo posts. In particular examples, privacy settings may also allow users to control access to the objects or information on a per-request basis. As an example, and not by way of limitation, the communication platform may notify the user whenever a third-party system attempts to access information associated with the user and require the user to provide verification that access should be allowed before proceeding.

EXAMPLE SYSTEM ARCHITECTURE

FIG. 1 is a schematic view of an example system 100 usable to implement the techniques described herein to provide a gallery of media files (e.g., photographs, videos, etc.) sent via messaging threads on a messaging application 102 via the system 100. In some examples, the system may include a communication platform 104 configured to manage the messaging application 102, such as to provide a means of messaging between user computing devices 106(1), 106(2), . . . 106(M) (collectively "user device(s) 106") associated with users 108(1), 108(2), . . . 108(N) (collectively "users 108). In various examples, a first user device(s) 106(1) may include a first instance of the messaging application 102(1) and the second user device 106(2) may include a second instance of the messaging application 102(2), to facilitate communications between the first user 108(1) and the second user 108(2).

Each of the user devices 106 include one or more processors and memory storing computer executable instructions to implement the functionality discussed herein attributable to the various computing devices. In some examples, the user devices 106 may include desktop computers, laptop computers, tablet computers, mobile devices (e.g., smart phones or other cellular or mobile phones, mobile gaming devices, portable media devices, etc.), or other suitable computing devices. The user devices 106 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 110.

The network 110 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the user devices 106 may access the communication platform 104 and/or communicate with one another.

The communication platform 104 may include one or more servers or other computing devices, any or all of which may include one or more processors and memory storing computer executable instructions to implement the functionality discussed herein attributable to a social networking system or digital platform. The communication platform 104 may enable the user(s) 108 to communicate with one another via the first instance of the messaging application 102(1) on the first user device(s) 106(1) and the second instance of the messaging application 102(2) on the second user device(s) 106(2). The communication platform 104 may manage the messaging application 102, including the first instance of the messaging application 102(1) and the second instance of the messaging application 102(2), to facilitate communications between the user(s) 108.

In various examples, the communication platform 104 may store user data associated with the user(s) 108, such as in a user account 112 associated therewith. The user data may include identifiers associated with the user (e.g., telephone number, IP address, other identifiers, etc.), messaging threads associated with the user(s) 108 and one or more other users 108, media content and associated metadata associated with a media gallery, and the like. In at least one example, the user data may include preferences with respect to the media gallery associated with the user account. In some examples, the preferences may include one or more messaging threads designated for association with the media gallery. In such examples, the communication platform 104 may store media content transmitted via the one or more designated threads in association with the media gallery. In some examples, the preferences may include one or more subscribers to a particular album associated with the media gallery. In such examples, the communication platform 104 may determine new content has been added to the particular album and may send a notification to a user device 106 associated with the subscriber(s), alerting the subscribers of the new content.

FIG. 1 illustrates an example in which, at operation 114 (indicated by "1"), the communication platform 104 may receive, from a first user device 106(1) associated with a first user 108(1), a message comprising media content via a messaging thread. The message may be sent from the first user device 106(1) via a first instance of the messaging application 102(1). As used herein an instance of an application, such as the first instance of the messaging application 102(1) and a second instance of the messaging application 102(2) may include native applications installed on a respective user device 106 and/or a web applications accessed via a web browser associated with the respective user device 106. In various examples, the first user 108(1) may launch the first instance of the messaging application 102(1) on the first user device 106(1), select an identifier associated with a second user 108(2), and cause the message to be sent via the communication platform. The media content may include one or more photographs, videos, links, screenshots, documents, graphic interchange format (GIF) images, and/or any other type of media content.

In various examples, the communication platform 104 may process the message via the messaging application 102. In some examples, the communication platform 104 may determine that the message comprises the media content, such as based on a file type (e.g., JPEG, GIF, PNG, TIFF, BMP, AAC, MP3, WAV, MPEG-1, MPEG-2, AVI, PDF, DOC, hyperlink, etc.) associated with the content of the message and/or an attachment thereto. In various examples, the communication platform 104 may store the media content in association with the messaging thread in a first media gallery associated with the first user 108(1) and/or in a second media gallery associated with a second user 108(2).

In various examples, the communication platform 104 may store metadata in association with the media content in the first media gallery and/or the second media gallery. The metadata may include a message identifier associated with the messaging thread, a user identifier associated with an originating user (e.g., sender of the media content), a user identifier associated with a receiving user (e.g., receiver of the media content), a timestamp associated with the message, a time associated with generation of the media content (e.g., a time a photograph was captured, etc.), a location associated with creation of the media content (e.g., a location associated with photograph capture, etc.), or other information associated with the media content. In various examples, the communication platform 104 may store the media content in the first media gallery and/or the second media gallery based at least in part on metadata associated with the media content. For example, the media content may be stored in the first media gallery and organized or displayed in chronological order with other media content sent via one or more messaging threads based at least in part on the metadata.

At operation 116 (indicated by "2"), the communication platform 104 may send the message comprising the media content to the second user device 106(2) associated with the second user 108(2) via the second instance of the messaging application 102(2). In various examples, the communication platform 104 may cause the message to be presented on a display of the second user device 106(2) via a user interface associated with the second instance of the messaging application 102(2). In such an example, the second user 108(2) may view the media content via the user interface.

In various examples, the communication platform 104 may receive second message in association with the messaging thread from the second user device 106(2) after sending the message at operation 114 (e.g., a first message). The communication platform 104 may determine that the second message is associated with the messaging thread based on a messaging thread identifier associated therewith.

In some examples, the communication platform 104 may determine that the second message is associated with the media content sent by the first user 108(1). In such examples, the second message may include a comment and/or a reaction to the media content. For example, the second message may include a "thumbs up" icon, denoting approval of media content by the second user 108(2).

In some examples, the communication platform 104 may determine that the second message is associated with the media content based on a timestamp associated therewith being within a threshold time of a timestamp associated with the first message (containing the media content). In some examples, the communication platform 104 may determine the association based on a determination that the first message and the second message are transmitted consecutively, such as in a group or cluster of messages.

In some examples, the communication platform 104 may determine that the second message is associated with the media content based on contents of the second message. In some examples, the contents may include an identifier associated with a particular reaction emoji. In such examples, the reaction emoji may be associated with the media content. In some examples, the communication platform 104 may utilize natural language processing to determine the contents of the second message. In such examples, based on the contents, the communication platform 104 may determine whether the second message is associated with the media content, such as if the contents include a comment and/or a reaction to the media content.

In various examples, the communication platform 104 may be configured to perform image recognition on the media content to determine an expected reaction and/or comment thereto. In such examples, the communication platform 104 may utilize one or more image processing algorithms to determine objects, people, places, actions, and the like captured in an image (or series of images). In some examples, the expected reaction and/or comment thereto may be determined utilizing machine learned models, heuristics, observations, experimentation, and/or other methods of predicting human behavior. In some examples, the communication platform 104 may compare the contents of the second message to determine whether the second message includes a reaction and/or comment to the media content of the first image. For example, the communication platform 104 may determine that the media content of the first message includes a picture of a baby. The communication platform may determine that an expected reaction may include the words "baby," "adorable," "cute," "precious," "stunning," "angel," "beautiful," "handsome," and the like. The communication platform 104 may perform natural language processing on the second message to determine that the second message includes a statement "she's adorable!" Based on a determination that the contents of the message match the expected reaction, the communication platform 104 may associate the second message with the media content.

In some examples, the second message may be stored as metadata associated with the media content, such as in the first media gallery and/or the second media gallery stored in the user account(s) 112 associated with the first user 108(1) and/or the second user 108(2). At operation 118 (indicated by "$3_A$"), the communication platform 104 may cause the media content to be available for presentation via a first media gallery. In some examples, the communication platform 104 may enable a link on the first instance of the messaging application 102(1) to view the first media gallery. In such examples, the link may be associated with the media content in the messaging thread and/or may be independent from the media content and/or the messaging thread. In some examples, the communication platform 104 may cause the first media gallery including the media content to be presented based on receiving an indication of selection of the link (e.g., request to view the first media gallery). In some examples, the first media gallery may include the media content sent via the messaging thread between the first user 108(1) and the second user 108(2), as well as other media content transmitted via the messaging thread and/or other messaging threads between the first user 108(1) and one or more other users 108.

At operation 120 (indicated by "$3_B$"), the communication platform 104 may cause the media content to be available for presentation via a second media gallery. In some examples, the communication platform 104 may enable a link on the second instance of the messaging application 102(2) to view the second media gallery. In such examples, the link may be associated with the media content in the messaging thread and/or may be separate from the media content. In some examples, the communication platform 104 may cause the second media gallery including the media content to be presented based on receiving an indication of selection of the link (e.g., request to view the second media gallery). In some examples, the second media gallery may include the media content sent via the messaging thread between the first user 108(1) and the second user 108(2), as well as other media content transmitted via the messaging thread and/or other messaging threads between the second user 108(2) and one or more other users 108.

In some examples, the communication platform 104 may cause at least a portion of the metadata associated with the media content to be presented via the first media gallery and/or the second media gallery. In some examples, the at least the portion of the metadata may include one or more comments and/or reactions to the media content. Continuing the example from above, the media content of the first message may include a picture of a baby, to which the second user 108(2) replies with a comment that "she's adorable." The communication platform 104 may cause the comment "she's adorable" to be presented in association with the media content via the first media gallery and/or the second media gallery.

In various examples, the communication platform 104 may store multiple comments and/or reactions to media content received via multiple messaging threads as metadata associated with the media content. In such examples, the communication platform 104 may determine that a same media content (e.g., same picture, video, etc.) is sent by the first user 108(1) via different messaging threads, such as based on a media content identifier. The communication platform 104 may include the media content in multiple instances of media galleries associated with users 108 corresponding to the multiple messaging threads. The communication platform 104 may determine that one or more messages sent via the multiple messaging threads include comments and/or reactions to the media content, such as using the techniques described above. The communication platform may store the multiple comments and/or reactions to the media content as metadata associated with the media content in the user account(s) 112. Continuing the example from above, the first user 108(1) may additionally send the media content including the picture of the baby to two other users 108 as messages via two separate and independent messaging threads. The one of the other users 108 may respond to the message with an emoji reaction of a "heart" and the other may respond to the message with a comment "oh my, she's precious." The communication platform may store the reaction "heart" and the comment "oh my, she's precious" as metadata associated with the media content in the first media gallery.

In some examples, the communication platform 104 may cause one or more of the multiple comments and/or reactions to be presented in association with the media content via the first media gallery and/or the second media gallery. In some examples, the communication platform 104 may cause one or more comments and/or reactions to be presented based on privacy settings associated with a user account 112, such as those described above. In such examples, the privacy settings may include settings associated with the sender of a comment and/or reaction and/or a user associated with the media gallery (e.g., privacy setting associated with the first user 108(1)).

In some examples, the communication platform 104 may cause one or more comments and/or reactions to be presented based on a time associated therewith. For example, the communication platform may cause a group of the most recent comments and/or reactions to be presented. In some examples, the communication platform may cause all or substantially all of the reactions to be presented. Continuing the baby photo example from above, the communication platform may receive an indication of selection to view the first media gallery via the first instance of the messaging application 102(1). Based on the indication of selection, the communication platform 104 may cause the media content to be presented on the first media gallery via the first instance of the messaging application 102(1). The communication platform 104 may determine that the comments "she's adorable" and "oh my, she's precious" are two of the most recent comments to the media content and may cause the comments to be presented in association with the media content on the first media gallery. Additionally or alternatively, the communication platform 104 may cause the "heart" reaction to be presented in association with the media content.

In various examples, the communication platform 104 may enable the first user 108(1) and/or the second user 108(2) to comment and/or react to the media content presented via the first media gallery and/or the second media gallery. For example, the communication platform 104 may receive an indication of selection of the media content via a first media gallery. Based on the indication of selection, the communication platform 104 may cause at least one of a keyboard or a reaction emoji menu to be presented via the first instance of the messaging application 102(1). The first user 108(1) may input a comment and/or a reaction via the keyboard or the reaction emoji menu and may send the comment and/or reaction to the communication platform 104. The communication platform 104 may receive the comment and/or reaction and may store the comment and/or reaction as metadata associated with the media content. In some examples, the communication platform 104 may cause the comment and/or the reaction to be sent to the second user 108(2) as a separate message via the messaging thread.

In some examples, the communication platform 104 may organize the media content into one or more albums. In some examples, the album(s) may be organized based on default settings. In such examples, the communication platform 104 may include one or more default settings for albums, such as selfies, videos of me (e.g., the user 108 associated with the media gallery), family, and the like. In some examples, the default settings may be based on one or more relationships a user has stored in a user account 112. For example, a user account 112 associated with the first user 108(1) may include a user identifier associated with a mother, a father, a spouse, and a child. The communication platform 104 may generate a "family" album including media content transmitted via messaging threads between the first user 108(1) and one or more family members.

In various examples, the communication platform 104 may be configured to enable a user 108, such as the first user 108(1) to organize media content associated with the first media gallery. In some examples, the communication platform 104 may enable the first user 108(1) to organize different media content into albums. In such examples, the first user 108(1) may provide one or more preferences with regard to an album. The preferences may include one or more dates associated with the album (e.g., a particular date, date range, etc.), a location associated with the album (e.g., address, city, state, province, country, etc.), objects associated with the album (e.g., contacts of the first user 108(1) via the messaging application 102, people recognized by faces (e.g., determined using facial recognition software, etc.), dogs, cats, etc.), a name associated with the album, and the like.

In various examples, the communication platform 104 may associate the media content with the first media gallery and/or associate the media content with a particular album thereof, based at least in part on the user preferences. For example, the first user 108(1) may create a "family" album of media content from family members. The first user 108(1) may identify contacts that are family members in the user preferences associated with the "family" album. The communication platform 104 may automatically associate media content transmitted via one or more messaging threads with the family members. For another example, the first user 108(1) may create a "kids" album of media content including children of the first user 108(1). The first user 108(1) may provide one or more images to the communication platform 104, the image(s) including faces of the children, to enable the communication platform 104 to identify images of the children captured in media content, such as by utilizing facial recognition techniques.

In some examples, the communication platform 104 may receive a request from the first user 108(1) to move media content into a particular album. In some examples, the communication platform may be configured to organize the media content associated with the first media gallery automatically, such as without input from the first user 108(1). For example, the first user 108(1) may create a "wedding" album and may set a date and location as user preferences associated with the album. The communication platform 104 may receive a plurality of messages comprising media content via a plurality of messaging threads, such as from people who attended the wedding. The communication platform 104 may identify particular media content including the date and location, such as by evaluating the metadata associated therewith. The communication platform 104 may associate the particular media content with the "wedding" album based on the date and location and cause the particular media content to be presented in association with the "wedding" album via the first media gallery.

In various examples, the communication platform 104 may enable a user 108, such as the first user 108(1) to create an album for sharing media content with designated individuals. In some examples, the first user 108(1) may create an album and designate one or more subscribers (e.g., other users) to the album. The subscribers may be designated based on a user identifier, user name, user account, or the like.

In some examples, the communication platform 104 may request permission of the other users to be added as subscribers to the album of the first user 108(1). In such examples, the communication platform may send a message to the other users requesting approval of the association with the album. Responsive to receiving approval, the communication platform 104 may associate the other users with the album, as subscribers.

In various examples, the communication platform 104 may receive a request from the first user 108(1) to add media content to the album. The communication platform 104 may receive the media content and may associate the media content with the album. For example, the first user 108(1) may request to add three photographs to the album. The communication platform 104 may receive the three photographs and may store them in association with the album in a user account 112 of the first user 108(1).

In various examples, the communication platform may identify one or more subscribers to the album. The communication platform may determine a messaging thread between the first user 108(1) and each of the subscriber(s) to the album. In some examples, the messaging thread may be identified based on a messaging thread identifier, a first user 108(1) identifier, and/or a subscriber identifier. In various examples, the communication platform 104 may send a notification to the subscriber, via an instance of the messaging application 102, indicating that new media content has been added to the album. In some examples, the notification may be presented as a message in a messaging thread between the first user 108(1) and the subscriber. In some examples, the notification may be presented on a chat page" associated with the instance of the messaging application 102 on a user device of the subscriber. In some examples, the notification may be presented as a pop-up notification or other notification type.

In various examples, the notification may provide an indication to the subscriber that the media content has been added to the album. In some examples, the notification may include at least a portion of the newly added media content. For example, the notification may include a thumbnail image of one of the three new photos added to the album by the first user 108(1). In some examples, the notification may provide a hyperlink to the album, to enable the subscriber to quickly view the new content. In some examples, the subscriber may access the album via an instance of a media gallery associated with a user account 112 of the subscriber.

In various examples, the communication platform 104 may be configured to enable a user 108, such as a first user 108(1) to quickly and easily access memories from a previous time via a first media gallery. The memories may include media content associated with a particular day or period of time in the past. In some examples, the communication platform 104 may receive, from a first user device 106(1), a request to view the first media gallery at a first time. The communication platform 104 may determine a second time prior to the first time, such as a period of time in the past (e.g., one year ago, two years ago, one month ago, six months ago, etc.). The communication platform 104 may identify media content associated with the second time, such as based on metadata associated therewith (e.g., a time associated with image capture, timestamp associated with a message through which the media content was shared, etc.). The communication platform 104 may cause the media content to be presented via the first media gallery in association with the second time. For example, the first user 108(1) may request to view the first media gallery at a particular time. The communication platform 104 may identify media content associated with one year prior to the particular time and may cause the media content to be presented as a memory from one year ago via the first media gallery.

In various examples, the communication platform 104 may store an association between the media content associated with the memory and one or more messages of a messaging thread corresponding to the memory. In some examples, first user 108(1) may select the media content associated with the memory via the first media gallery. In some examples, responsive to receiving the indication of selection of the memory, the communication platform 104 may cause the one or more messages of the messaging thread to be presented via the first instance of the messaging application 102(1). In such examples, the communication platform 104 may enable the user 108 to quickly and easily access previous conversations associated with media content stored in a media gallery. The quick access to conversations may prevent the user 108 from scrolling through dozens of pages of messages to relive the memory associated with the media content, thereby improving the functioning of the user device 106.

Though primarily described throughout as actions performed by a first user 108(1) with respect to a first media gallery, this is not intended to be so limiting. One skilled in the art would understand that any or all of the actions described herein with regard to the first user 108(1) may be performed by any user 108, such as the second user 108(2) in association with a second media gallery, or the like.

Example User Interfaces

FIG. 2A-FIG. 11E are schematic views showing example user interfaces that are usable to implement the techniques described herein for providing galleries of media content shared via messaging threads. The interfaces may be generated by a computing device of a communication platform (e.g., communication platform 104) and transmitted to one or more user computing devices (e.g., first user device 106(1), second user device 106(2), etc.) for presentation. Additionally or alternatively, the interfaces may be generated by the user computing device(s) based at least in part on instructions received from the communication platform. As discussed above, the interfaces described in this section may, but need not, be implemented in the context of the system 100.

Figures 2A, 2B:
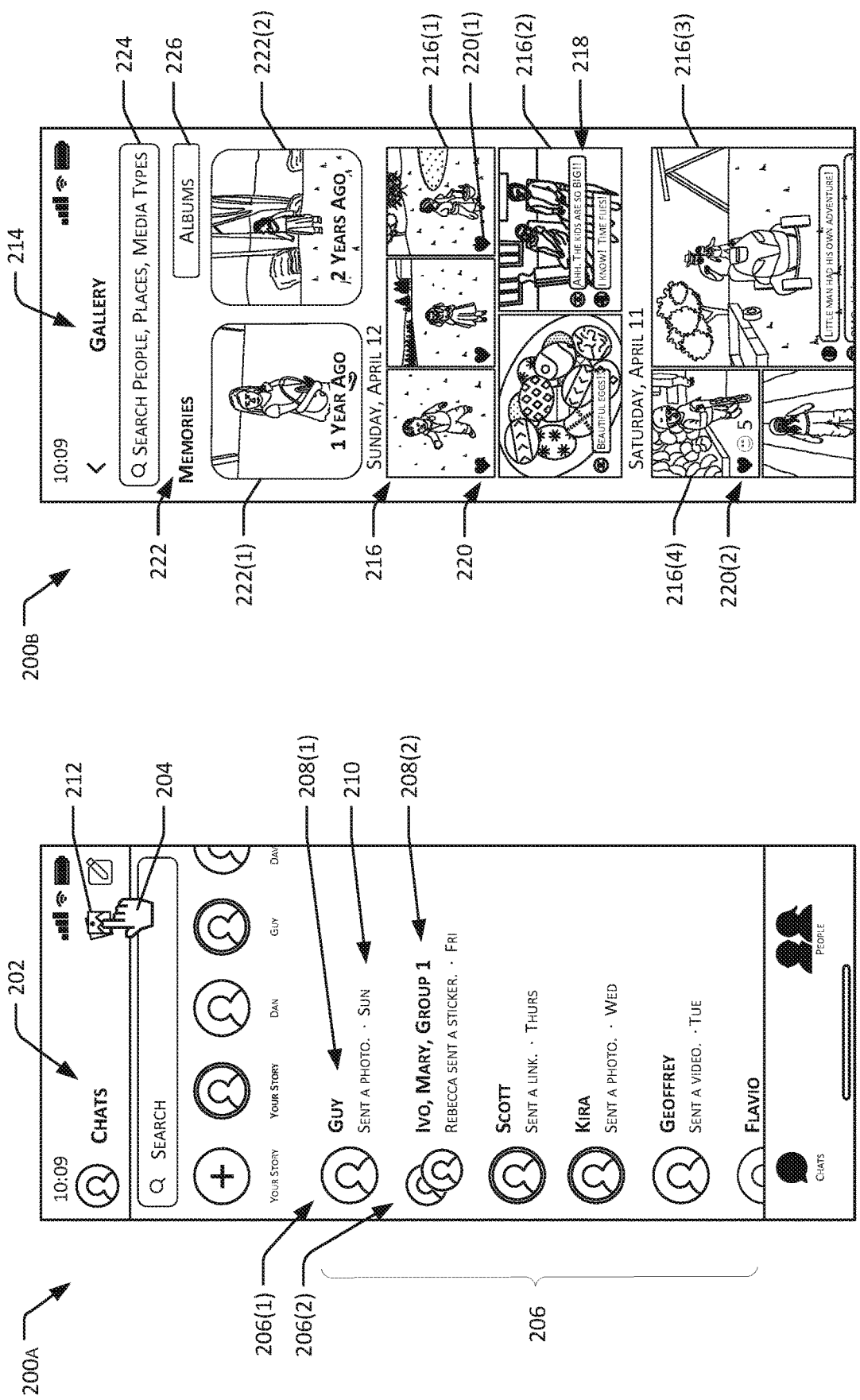
FIGS. 2A and 2B illustrate example interfaces in which an example media gallery may be accessed in association with a messaging application.

FIGS. 2A and 2B illustrate example interfaces in which an example media gallery may be accessed in association with a messaging application. Interface $200_A$ illustrates a chat page 202 associated with a messaging application, such as messaging application 102, via which a user 204 (e.g., a user 108 of FIG. 1) may access a media gallery.

In the illustrative example, the chat page includes one or more messaging threads 206 between the user 204 and one or more other users 208, such as users 108 of FIG. 1. For example, a first messaging thread 206(1) may include messages shared privately between the user 204 and another user 208(1) (illustrated as "Guy"). For another example, a second messaging thread 206(2) may include messages shared privately between the user 204 and a group of users 208(2) (illustrated as Group 1, including "Ivo and Mary"). In various examples, the messaging thread(s) 206 may be selectable, such as to access a particular messaging thread for communicating with associated user(s) 208.

In the illustrative example, the messaging thread(s) 206 include descriptions 210 of content recently shared therein. In some examples, the content includes a description of media content, such as a photo, a sticker, a video, etc. In other examples, the description may include text associated with a message sent via the messaging thread(s) 206.

As discussed above, the messaging threads 206 may include a means by which the communication platform may populate a media gallery, such as with media content shared therein. In various examples, the chat page 202 may include a media gallery selectable option 212 (e.g., media gallery icon) to view the media gallery. In various examples, responsive to receiving an indication of selection of the media gallery selectable option 212, the communication platform may cause the media gallery 214, illustrated in interface $200_B$ of FIG. 2B, to be presented via the messaging application.

The media gallery 214 may include media content, such as photographs, videos, links, screenshots, documents, graphic interchange format (GIF) images, and the like. Though illustrated in FIG. 2B as including photographs, this is merely for illustrative purposes and is not intended to be so limiting.

Based on the indication of selection of the media gallery selectable option 212 (e.g., a request to view the media gallery, the communication platform may determine one or more media files 216 (e.g., file of media content) to be presented in the media gallery 214. In some examples, the communication platform determines the media file(s) 216 based on the most recent media content shared via messaging threads 206. In the illustrative example, the communication platform presents groups of media files based on dates associated therewith. For example, a first media file 216(1) and a second media file 216(2) have an associated date of April 12, while a third media file 216(3) has an associated date of April 11, the day prior. Because the first media file 216(1) and the second media file 216(2) are more recent, they are presented above the third media file 216(3) in the media gallery 214.

In some examples, the communication platform determines the media files 216 to be presented based on a sender associated therewith. In some examples, the determination may be based on a relationship the sender has with the user 204, an amount or frequency of media content shared between the two users, a number of comments or reactions to a particular media file 216, or the like. For example, a particular media file 216 may receive more comments 218 and/or reactions 220 (e.g., "likes") from users than another media file received via a messaging thread. Based on the number of comments 218 and/or reactions 220, the communication platform may cause the particular media file 216 to be presented first in the media gallery 214. In some examples, the communication platform may present media files 216 that include a number of comments 218 and/or reactions 220 above a threshold number.

In various examples, the communication platform may cause one or more comments 218 and/or reactions 220 associated with the media files 216 to be presented via the media gallery 214. In some examples, a display of the comments 218 and/or reactions 220 may be based on a size of the media file displayed. For example, a first media file 216(1) includes a small photo. Because of the small size of the photo, the communication platform may determine to present a reaction 220(1). A second media file 216(2) may include a larger photo. Due to the larger size of the photo, the communication platform may determine to present comments 218. Though illustrated as having two comments, this is not intended to be limiting, and the photo may include a greater or lesser number of comments 218.

In some examples, the communication platform may cause the comments 218 to be presented based on a timestamp associated therewith. In some examples, the most recent comments 218 associated with a media file 216 may be presented via the media gallery 214. In some examples, the communication platform may cause two or more reactions 220 to be presented in association with a media file 216. For example, a fourth media file 216(4) may have received 5 reactions from users, including at least one "heart" and at least one "smiley face." The communication platform presents the reaction 220(2) as the "heart," the "smiley face" and a total number of reactions "5" to the fourth media file 216(4).

In various examples, the media gallery 214 may include one or more memories 222. The memories may include media files 216 associated with a period of time in the past (e.g., one year ago, six months ago, etc.). In the illustrative example, a first memory 222(1) includes a photo from one year ago and a second memory 222(2) includes a photograph from two years ago, though any other time period is contemplated herein. In various examples, the communication platform may determine a current date and may identify a media file 216 stored in association with a media gallery (e.g., in a user account associated with the user 204) that has a date associated therewith that corresponds to the period of time in the past. For example, the communication platform determines that a current date associated with the user accessing the messaging application is Apr. 12, 2020. The communication platform identifies a media file with a corresponding date of Apr. 12 2019 and identifies the media file as a first memory 222(1). The communication platform then identifies another media file with a corresponding date of Apr. 12 2018 and identifies the media file as the second memory 222(2).

In various examples, one or more of the media files 216 and/or the memories 222 may be linked to a messaging thread associated therewith. In some examples, responsive to receiving an indication of selection of a media file 216 or a memory 222, the communication platform may cause the associated messaging thread to be presented via the messaging application.

In various examples, the media gallery 214 may include a search input box 224 to enable the user 204 to easily search for a particular media file 216, such as based on a sender, a date, a type of file, a location, reaction, or other metadata associated with the media file. In response to receiving characteristics about a particular media file 216 the search input box 224, the communication platform may cause one or more media files 216 including the characteristics to be presented via the media gallery 214.

In various examples, the media gallery 214 may include a selectable option 226 to enable the user 204 to view one or more albums associated with the media gallery 214. As discussed above, the media files 216 may be associated with one or more albums based on default settings and/or user settings. In some examples, the communication platform may enable the user to add a particular media file to an album, such as by selecting the media file (e.g., right click) and selecting an option to add the media file to an album.

FIGS. 3A-3C illustrate example interfaces associated with a messaging application managed by a communication platform. FIG. 3A illustrates an example interface 300$_A$ of a first messaging thread 302 through which media content may be shared between a first user 304 and a second user 306. The first messaging thread 302 may include one or more messages 308 sent by the first user 304, such as a message 308(1), 308(2), and 308(3), and one or more messages 310 sent by the second user 304, such as messages 310(1), 310(2), and 310(3).

In various examples, one or more of the message(s) 308 and/or the message(s) 310 may include media content. The media content may include one or more media files including photographs, videos, links, screenshots, documents, GIF images, and the like. In the illustrative example, the message 308(1) includes two photographs, and the message 310(2) includes one photograph, though this is merely an illustrative example, and the message(s) 308 and/or message(s) 310 may include a greater or lesser number of media files.

In various examples, the communication platform may process the messages in the messaging thread 302, to enable the first user 304 and the second user 306 to communicate. In some examples, the communication platform may determine that a first message, such as message 308(1) includes one or more media files. The communication platform may receive the message 308(1) and associate the message with a media gallery, as depicted in FIG. 3C, based on the determination that the message 308(1) includes the media file(s). In some examples, the communication platform may assign a timestamp to the first message 308(1). In such examples, the timestamp may be stored as metadata associated with the message 308(1) and/or the media file(s) corresponding thereto.

In various examples, the communication platform may receive additional messages after the first message 308(1), such as message 308(2) and message 310(1). In some examples, the communication platform may assign timestamps to the additional messages and may cause the additional messages to be presented in chronological order.

In various examples, the communication platform may determine that one or more of the additional messages include comments and/or reactions to the media content included in message 308(1). In some examples, the communication platform may determine that the additional message(s) include comments and/or reactions based on a proximity to the message 308(1) in the first messaging thread 302. In such examples, based on a determination that the additional messages, such as messages 308(2) and 310(1) are proximate the message 308(1) in the first messaging thread 302, the communication platform may determine that the messages 308(2) and 310(1) include comments and/or reactions thereto.

In some examples, the communication platform may determine that the additional message(s) include comments and/or reactions to the media content based on the timestamps associated therewith being within a threshold time (e.g., 1 minute, 5 minutes, 1 hour, etc.). In some examples, the communication platform may determine that the additional message(s) include comments and/or reactions based on the contents of the additional messages. In some examples, the communication platform may determine the contents utilizing natural language processing. The communication platform may analyze words associated with the additional messages to determine whether the additional messages include comments and/or reactions. In some examples, the communication platform may compare the words to one or more words of an expected comment and/or reaction to the media content. In such examples, the expected comments and/or reactions may be determined utilizing machine learning techniques, heuristics, observations, experimentation, and/or other methods of predicting reactions to media content. For example, the communication platform may determine, based on an analysis of the contents of the additional messages 308(2) and 310(1), that the message 308(2) includes a comment describing the media content associated with message 308(1) and the message 310(1) includes a comment in response to the media content.

In various examples, the communication platform may store the comments and/or reactions as metadata associated with the message 308(1) and/or the media files associated therewith. In some examples, the communication platform may additionally store a user identifier associated with the comments and/or reaction as metadata. For example, the communication platform may determine that the message 310(1) includes a comment in response to the photographs associated with the message 308(1). The communication platform may store the comment and a user identifier associated with the second user 306 as metadata associated with the image and/or the photographs associated therewith.

In some examples, based in part on determining that at least one message in a messaging thread, such as the first messaging thread 302, includes media content, such as message 308(1) and message 310(2), the communication platform identify messages associated with a conversation 312 of the first messaging thread 302. The conversation 312 may include a burst of messages sent within a pre-determined time of one another (e.g., within 5 minutes, 10 minutes, etc.) or within a span of time (e.g., during a day). The communication platform may determine a first message 308 or 310 (illustrated as message 308(1)) and a last message 308 or 310 (illustrated as message 308(3)) associated with the conversation 312. In some examples, the communication platform may store message identifiers associated with the first message 308(1) and the last message 308(3) as metadata associated with the media files transmitted during the conversation, such as the photographs in message 308(1) and the photograph in message 310(2). In such examples, the conversation of the messaging thread 302 may be associated (e.g., linked) to the particular messages 308 and 310 of with the conversation 312 corresponding to the media files.

FIG. 3B illustrates an interface $300_B$ of a second messaging thread 314 through which media content may be shared between the first user 304 and a third user 316. The second messaging thread 314 may include one or more messages 308 sent by the first user 304, such as a message 308(4), 308(5), 308(6) and 308(7), and one or more messages 318 sent by the third user 316, such as messages 318(1), 310(2), 318(3), and 318(4).

In various examples, one or more of the message(s) 308 and/or the message(s) 318 of the second messaging thread 314 may include media content. In some examples, the communication platform may receive a message, such as message 318(1), and determine that the message 318(1) includes one or more media files. The communication platform may associate the message 318(1) with a media gallery, as depicted in FIG. 3C, based on the determination that the message 318(1) includes the media file. In some examples, the communication platform may assign a timestamp to the message 318(1). In such examples, the timestamp may be stored as metadata associated with the message 318(1) and/or the media file(s) corresponding thereto.

As discussed above with regard to the first messaging thread 302 depicted in FIG. 3A, the communication platform may determine that one or more messages 308 and/or 318 include comments and/or reactions to the media content associated with another message 308 and/or 318. In some examples, the communication platform may cause a label 319 to be presented via the first messaging thread 302 in association with a comment and/or reaction. In such an example, the label 319 may include an explicit association between a media content associated with a message 310 and the comment associated with the message 308, such as the photograph associated with message 310(2) and a comment included in message 308(3). Though the label 319 includes a statement that "you replied to Mary," this label is not intended to be limiting and the label 319 may include any other words used to describe that the user 304 reacted and/or commented on particular media content.

In some examples, the reactions may include reaction emojis, such as a "smiley face," a "heart," or the like. In various examples, the communication platform may identify the reaction emoji based on a reaction identifier 320. The reaction identifier 320 may be associated with a particular emoji and/or a number of the particular emojis included in a message. For example, the reaction identifier 320 associated with message 318(4), "ht384," may identify that the reaction includes three "heart" emojis.

In some examples, the communication platform may store the reaction identifier 320 as metadata associated with one or more media files associated with a preceding message, such as the three photographs associated with message 308(6). In such examples, the communication platform may associate the reaction with the media file(s).

In various examples, the interface $300_A$ associated with the first messaging thread 302 and interface $300_B$ associated with the second messaging thread 314 may include a media gallery selectable option 322. The media gallery selectable option 322 may enable the first user 304 to access the media gallery illustrated in FIG. 3C. In various examples, responsive to receiving an indication of selection of the media gallery selectable option 322, the communication platform may cause a gallery options window 324 to be presented to the user 304. The gallery options window 324 may include an option for the user to view a media gallery associated with a particular messaging thread (e.g., media files transferred between the first user 304 and one or more other users associated with a particular messaging thread) or a media gallery including media content shared via one or more messaging threads. For example, the first user 304 may select an option to view a media gallery associated with "this chat." Responsive to receiving an indication of selection of the option to view the media gallery associated with this chat, the communication platform may present one or more media files associated with the second messaging thread between the first user 304 and the third user 316.

In the illustrative example, the first user 304 selects the option to view a combined media gallery. Responsive to receiving an indication of selection of the option to view the combined media gallery, the communication platform causes the media gallery 326 to be presented via interface $300_C$ of the messaging application. The media gallery 326 may include media files sent and/or received by the first user 304 via one or more messaging threads, such as the first messaging thread 302 and/or the second messaging thread 314. In the illustrative example, the interface $300_C$ includes a first media files 328 associated with the first messaging thread 302 and second media files 330 associated with the second messaging thread 314.

As illustrated in FIG. 3C, the media gallery 326 may include one or more comments 332 and/or reactions 334 associated with media files 328 and/or 330 (e.g., saved as metadata associated with the media files 328 and/or 330). For example, a first media file 328(1) includes a reaction 334 of a "heart" based on the message 318(4) of the second messaging thread 314 illustrated in FIG. 3B. For another example, a second media file 330(1) includes a comments sent in response to the media file, such as via message 310(3) and message 308(3) of the first messaging thread 302 illustrated in FIG. 3A.

In the illustrative example, the media files 328 and 330 are presented in groups associated with the respective messaging threads 302 and 314. In other examples, the media files may be presented irrespective of the messaging threads via which the media files 328 and 330 were transmitted. In some examples, the media files 328 and 330 may be presented in chronological order. In some examples, the chronological order may be associated with respective timestamps associated with media files 328 and 330, and/or the messages 308, 310, and/or 318 associated therewith. In some examples, the chronological order may be based on a time associated with creation of the media file 328 and/or 330

(e.g., time associated with capturing an image or video, capturing a screenshot, generating a hyperlink, etc.).

In various examples, the media gallery 326 may include one or more memories 340, such as memories 222. The memories 340 may include media files 328 and/or 330 associated with a period of time in the past (e.g., one year ago, six months ago, etc.). In various examples, the communication platform may determine a current date associated with the user 304 requesting to view the media gallery 326 and may identify a media file 328 and/or 330 stored in association with a media gallery 326 (e.g., in a user account associated with the first user 304) that has a date associated therewith that corresponds to the period of time in the past.

In various examples, the media gallery 326 may include an album selectable option 336 to enable the user 304 to view one or more albums associated with the media gallery 326. In some examples, responsive to receiving an indication of selection of the album selectable option 336, the communication platform may cause one or more albums of media files 328 and 330 to be presented to the user 304.

In various examples, the media gallery 326 may include a search input box 338 to enable the user 304 to easily search for a particular media file 328 and 330, such as based on a sender, a date, a time, a type of file, a location, reaction, or other characteristics associated with the media file. In response to receiving characteristics about a particular media file the search input box 338, the communication platform may cause one or more media files 328 and 330 including the characteristics to be presented via the media gallery 326.

FIGS. 4A-4E illustrate example interfaces usable to enable a first user 402, such as first user 108(1), 204, and 304, to view and share a media content and associated messages from a past conversation. FIG. 4A illustrates an example interface $400_A$ of a media gallery 404, such as media gallery 214 and 326. The media gallery 404 may include one or more media files 406, such as media files 216, 328, and 330. In some examples, the media gallery 404 may include one or more memories 408, such as memories 222 and/or 340.

In various examples, the memories 408 may include media files associated with a period of time prior to a date on which the user 402 accesses the media gallery 404. In some examples, the period of time may include a number of days, such as 365 days in the past. In some examples, the period of time may include a range of times, such as 11 months to 13 months in the past. In the illustrative example, a first memory 408(1) is associated with a media file 406 captured and/or transmitted via a messaging thread one year ago and the second memory 408(2) is associated with another media file 406 captured and/or transmitted via a messaging thread two years ago. The first memory 408(1) and the second memory 408(2) may be associated with a same or a different messaging thread between the first user and another user.

In various examples, the communication platform may store metadata 410 associated with the memories 408. In some examples, the metadata may include a messaging thread identifier 412 associated with a respective memory 408. In various examples, the metadata may include a conversation identifier 414 corresponding to the messaging thread. In such examples, the conversation identifier 414 may be used to identify one or more messages transmitted via the messaging thread that are associated with the memory 408. In some examples, the metadata 410 may include a first message identifier 416 (illustrated as "start msg") and a last message identifier 418 (illustrated as "end msg") associated with the conversation.

In various examples, the memories 408 may include a link to the conversation associated therewith. In such examples, the communication platform may access the metadata 410, such as the conversation identifier 414, the first message identifier 416 and/or the last message identifier 418, to determine the conversation. In various examples, responsive to receiving an indication of selection of a memory, such as memory 408(2) illustrated in FIG. 4A, the communication platform may determine the conversation associated therewith, and may cause the conversation to be presented via interface 400B illustrated in FIG. 4B.

In various examples, the interface $400_B$ may include the memory 408(2) and one or more messages 420 corresponding to the conversation 422 of a messaging thread associated therewith. The conversation and/or the associated messaging thread may be between the user 402 and a second user 424. In the illustrative example, the communication platform presents a name or identifier associated with the second user 424 and a date 426 associated with the memory 408(2). In some examples, the name or identifier associated with the second user 424 may include a nickname, an alias (e.g., @user, etc.), or other identifier. In some examples, the identifier may be determined by the user 402 or the second user 424, such as that stored as a user preference in a user account associated with the user 402 in association with the second user 424 or in a user account associated with the second user 424. The date 426 may include a date associated with a generation of the memory 408(2), such as a date and/or time the memory 408(2) was captured, or the like. In some examples, the date 426 may include a date associated with transmission of the memory 408(2) via the messaging thread (e.g., a timestamp corresponding to an associated message 420). In some examples, the date 426 may be stored as metadata associated with the memory 408(2).

In various examples, the communication platform may determine the message(s) 420 to present based on the first message identifier 416 and the last message identifier 418. For example, the conversation may begin with a first message 420(1) associated with the first message identifier 416 and may end with a second message 420(2) associated with the last message identifier 418.

In the illustrative example, of FIG. 4B, the messages 420 associated with the conversation 422 do not all fit on a display of the interface $400_B$ at a single time. In such an example, the interface $400_B$ may include an instruction 428 to scroll down to view more messages (illustrated as "scroll to view more"). The interface $400_C$ of FIG. 4C illustrates additional messages 420 of the conversation being presented based on the user 402 scrolling to view the end of the conversation 422.

As discussed above, the end of the conversation label 430 may be presented on the display based on a determination that the last message 420(2) associated with a conversation is presented. In some examples, the communication platform may determine that the last message 420(2) is being presented based on the last message identifier 418.

In the illustrative example, the memory 408(2) includes a single conversation 422, as depicted by the label 432. In other examples, a memory 408 may include more than one conversation 422. In such examples, the user 402 may select a next option 434 or a previous option 436 to view other conversations 422 and/or media files associated with a memory 408. In some examples, the other conversations 422 may be associated with a same or different messaging threads.

In various examples, the interface 400_C may include a link 438 to the messaging thread between the user 402 and the second user 424. Responsive to receiving an indication of selection of the link 438, the communication platform may cause the messaging thread to be presented to the user 402. In some examples, the communication platform may present the messages 420 associated with the selected memory 408(2). In some examples, the communication platform may present a last message sent via the messaging thread, such as a more current message.

In various examples, the interface 400_C may include a selectable option 440 to share the memory 408(2). Responsive to an indication of selection of the selectable option (e.g., a request to share the memory 408(2)), the communication platform may a share page to be presented to the user 402. Interface 400_D of FIG. 4D illustrates a share interface 442 via which a user 402 may share the memory 408(2) with the second user 424.

In various examples, the share interface 442 may include a synopsis 444 of the memory 408(2) being shared. The synopsis 444 may include information about the media content to be shared. For example, as illustrated, the synopsis 444 includes a thumbnail image of the memory 408(2), a time period in the past associated with the memory 408(2), a date associated with the memory 408(2), and an identifier or name associated with the second user 424.

In various examples, the share interface 442 may include a message entry window 446 via which the user 402 may input a message to add an additional comment and/or note about the memory 408(2). In the illustrative example, the share interface 442 includes a send selectable option 448. In various examples, the user 402 may select the send selectable option 448 to share the memory 408(2) with the second user 424.

Interface 400_E of FIG. 4E illustrates a messaging thread 450 between the user 402 and the second user 424, as viewed on a second user device 452 associated with the second user 424. The messaging thread 450 may include one or more messages 454, such as messages 454(1), 454(2), and 454(3). In the illustrative example, the communication platform presents the shared memory 408(2) to an instance of the messaging application on the second user device 452 as a message 454(3) sent and/or shared by the user 402, Jane Farm.

In the illustrative example, the message 454(3) includes a link 456 to the conversation 422 in which the media file 406 associated with the memory 408(2) was transmitted, the memory 408(2), and a portion of the conversation 422 between the user 402 and the second user 424. In other examples, the message 454(3) may include more or less information about the shared memory 408(2).

FIGS. 5A-5C illustrate example interfaces usable to enable a user 502 to search for media content associated with messaging threads. Interface 500_A of FIG. 5A illustrates a media gallery 504 including media content. The media content may include one or more media files 506 including photographs, videos, links, screenshots, GIF images, documents, and the like. Though illustrated in FIG. 5A as including photographs, this is merely for illustrative purposes and is not intended to be so limiting. For example, the media gallery 504 may include a combination of photographs, videos, links, screenshots, documents, and/or GIF images.

In various examples, the media gallery 504 may include a search input box 508 to enable the user 502 to easily search for a particular media file 506, such as based on a sender, a date, a type of file, a location, reaction, or other metadata associated with the media file. In some examples, in response to receiving the search characteristics associated with the search, the communication platform may cause one or more media files 506 associated with the characteristics to be presented via the media gallery 504. For example, a user 502 may forget a particular thread in which a particular media file 506 was shared, but may remember the individual with whom the particular media file 506 was shared. The user 502 may input an identifier associated with the individual, such as a name, username, or other code, and may access one or more media files 506 shared with the individual. The user 502 may scroll through the search results presented via the media gallery 504 to find the particular media file 506.

In various examples, the responsive to receiving an indication of selection of the search input box 508, the communication platform may cause a search page 510 to be presented to the user 502. Interface 500_B of FIG. 5B illustrates an example search page 510. The search page 510 may include one or more selectable media types 512 to enable a quick search of a particular type of media content. In various examples, the search page 510 may include the search input box 508 to enable the user 502 to further refine a search, such as by sender or receiver, location, dates, or the like. For example, the user 502 may select the photograph media type 512(1) to search for photographs and may input a particular other user in the search input box 508. The communication platform may identify one or more media files 506 including photographs that are associated with the particular other user.

In various examples, the search page 510 may include messaging thread links 514 to enable the user 502 to quickly search for a particular messaging thread and/or media files 506 associated therewith. In some examples, responsive to receiving an indication of selection of a messaging thread link 514, such as messaging thread link 514(1), the communication platform may present the associated messaging thread. In some examples, responsive to receiving an indication of selection of a messaging thread link 514, such as messaging thread link 514(1), the communication platform may present one or more media files 506 corresponding to the associated messaging thread. In such examples, the indication of selection may include a request to view media file(s) 506 associated with the messaging thread.

Interface 500_C of FIG. 5C illustrates a media gallery page 516 associated with media content shared with a second user 518 (e.g., Jeff). In various examples, the media gallery page 516 may be presented in response to a request to view media file(s) 506 associated with a messaging thread between the user 502 and the second user 518. In some examples, responsive to selecting the messaging thread link 514(1) associated with the second user, such as that illustrated in FIG. 5B, the communication platform may populate the search input box 508 with a name or other user identifier associated with the second user. For example, responsive to selecting the messaging thread link 514(1) associated with a messaging thread with Jeff, the communication platform may present "Jeff Farm" in the search input box 508. In other examples, the communication platform may cause the media gallery page 516 to be presented in response to the user 502 inputting "Jeff Farm" in the search input box 508.

In the illustrative example, the media gallery page 516 may include information associated with the second user, such as a user image 520, name, and a number of media files shared. In other examples, the information may include additional or alternative information about messages between the user 502 and the second user 518, such as a length of time the users have been communicating via the messaging application, a relationship of the second user 518 to the user 502 (e.g., sibling, spouse, etc.).

In various examples, the media gallery page 516 may include a representation of one or more media files 506 shared between the user 502 and the second user 518 via the messaging thread. In some examples, the communication platform may order the media file(s) 506 in chronological order. In some examples, the chronological order may be based on a time in which the messages associated with the media files are transmitted via the messaging thread. In such examples, the first media file 506(1) may be the most recently shared media file, the second media file 506(2) may include the second most recently shared media file, and so on. In some examples, the chronological order may be based on times at which the respective media files 506 are created (e.g., generated, captured, etc.). In such examples, the first media file 506(1) may be the most recently captured media file, the second media file 506(2) may include the second most recently captured media file, and so on.

In various examples, one or more of the media files 506 associated with the media gallery page 516 may include a view chat link 524. The view chat link may include a link to a conversation corresponding to the associated media file 506. For example, responsive to receiving an indication of selection of the view chat link 524, the communication platform may cause the conversation associated with the media file 506(1) to be presented via the messaging application. In various examples, a conversation identifier, first message identifier, and/or last message identifier corresponding to the conversation may be stored as metadata associated with the first media file 506(1).

FIGS. 6A-6C illustrate example interfaces usable to enable a user 602 to comment on a media file via an example media gallery. Interface $600_A$ of FIG. 6A illustrates a messaging thread 604 between the user 602 and a second user 606. The messaging thread 604 may include one or more messages 608. In the illustrative example, the messaging thread 604 includes a first message 608(1) sent by the second user 606 and including a media file 610.

In various examples, the communication platform may determine that the first message 608(1) in the messaging thread 604 includes the media file 610. As discussed above, the communication platform may identify the media file 610 based on a type of file associated therewith, such as a JPEG, GIF, PNG, TIFF, BMP, AAC, MP3, WAV, MPEG-1, MPEG-2, AVI, DOC, hyperlink, or the like. In various examples, responsive to determining that the first message 608(1) includes the media file 610, the communication platform may associate the media file 610 with a first media gallery associated with the user 602 and a second media gallery associated with the second user 606. In some examples, communication platform may additionally store the contents of the first message 608(1) as a comment associated with the media file 610, such as in metadata associated with the media file 610.

Interface $600_B$ of FIG. 6B illustrates the first media gallery 612 associated with the user 602, including the media file 610, as well as other media files 614. As discussed above, the first media gallery 612 may include one or more memories 616 including media files associated with a particular time in the past. In various examples, the communication platform may cause the contents of the first message 608(1) (e.g., comment associated with the media file 610) to be presented in association with the media file 610 via the first media galley 612.

In various examples, the user may select the media file 610. In some examples, the communication platform may receive an indication of selection of the media file via the interface $600_B$. In some examples, responsive to receiving the indication of selection, the communication platform may cause a larger size image of the media file 610 to be presented. In some examples, responsive to receiving the indication of selection, the communication platform may cause the messaging thread to be presented, such as that illustrated in interface $600_A$.

In some examples, responsive to receiving the indication of selection, the communication platform may cause a keyboard 618 and/or emoji reaction menu to be presented. In such examples, the user 602 may input a comment and/or reaction 620 to the selected media file 610. In various examples, the user 602 may submit the comment and/or reaction 620 by selecting the submit option 622. In some examples, responsive to receiving an indication of selection of the submit option 622, the communication platform may store the comment and/or reaction 620 in association with the media file 610 (e.g., stored as metadata associated with the media file 610). In various examples, the communication platform may cause the comment and/or reaction 620 to be presented in association with the media file 610 via the media gallery 612, such as above or below the message 608 illustrated in association with the media file.

In some examples, the communication platform may determine a time and/or date associated with the comment and/or reaction 620. The time and/or date may include a time associated with the user selecting the submit option 622. In various examples, the communication platform may store the time and/or date as metadata associated with the media file 610.

Interface $600_C$ of FIG. 6C illustrates the messaging thread 604 between the user 602 and the second user 606 including the comment and/or reaction 620 input via the media gallery 612. In various examples, the communication platform may receive the comment and/or reaction 620 via the media gallery 612 and may cause the comment and/or reaction 620 to be sent to the second user 606 via the messaging thread 604 as a message 608.

In some examples, the communication platform may access metadata associated with the media file 610 to determine an identifier associated with the second user, the messaging thread 604, and/or the conversation associated with the media file 610. In some examples, the communication platform may cause the second message 608(2) including the comment and/or reaction 620 to be presented in association with the messaging thread 604 and/or the conversation.

In various examples, the communication platform may determine, based on the metadata, the time and/or date 624 associated with the comment and/or reaction 620. In some examples, the communication platform may determine that the time and/or date 624 is equal to or greater than a threshold time before a current time 626 and/or a time associated with the first message 608(1). In some examples, based on a determination that the time and/or date 624 is equal to or greater than the threshold time, the communication platform may cause the time and/or date 624 to be presented via the messaging thread 604.

In various examples, the communication platform may cause a label 628 to be presented via the messaging thread and in association with the comment and/or reaction 620. In various examples, the label 628 may include an indication that that the second message 608(2) includes the comment and/or the reaction 620 to the media file 610. For example, the label 628 may indicate that the user 602 replied to the second user 606, commented on the media file 610, reacted to the media file 610, or the like. In the illustrative example, the label 628 includes an indication that the comment was input via the media gallery 612.

FIGS. 7A-7C illustrate example interfaces usable to enable a user 702 to share comments and reactions to media content via an example media gallery 704. Interface 700$_A$ of FIG. 7A illustrates the media gallery 704 comprising media files 706 shared via one or more messaging threads. In the illustrative example, the first media file 706(1) and a second media file 706(2) may be shared via a same messaging thread between the user 702 and a second user 708. In other examples, the first media file 706(1) and the second media file 706(2) may be shared via different messaging threads.

In some examples, the media gallery may include a label 710 identifying the second user 708 and/or the messaging thread via which the media file(s) 706 were shared. In the illustrative example, the label 710 includes an identifier associated with the second user 708 and a date associated with sharing the media file. In other examples, the label 710 may include a date associated with generation of the media file 706. In the illustrative example, the label 710 is associated with both the first media file 706(1) and the second media file 706(2). In other examples, each media file may include a separate label. In some examples, media files 706 associated with different messaging threads may include independent labels.

In various examples, the media gallery may include a comment/reaction section 712 via which the user 702 may comment and/or react to the media file 706. In the illustrative example the comment/reaction section 712 includes a reaction selectable option 714. In various examples, the user may select the reaction selectable option 714 to launch a reaction menu 716. As illustrated in FIG. 7A, the reaction menu 716 includes one or more reactions 718 (e.g., emojis) to select for a particular reaction. For example, and as illustrated, the user 702 may select the "heart" emoji as a reaction to the first media file 706(1).

In various examples, responsive to receiving an input via the reaction menu 716, the communication platform may store a reaction identifier as metadata associated with the media file 706(1). As illustrated in interface 700$_B$ of FIG. 7B, the communication platform may cause the selected reaction 718 (illustrated as the "heart") to be presented in association with the media file 706(1). Additionally, the comment/reaction section 712 of the media gallery 704 may include a comment selectable option 720. In various examples, the user may select the comment selectable option 720 to launch an input section 722 for inputting a comment 724. In the illustrative examples, the input section 722 includes a keyboard 726, a comment input box 728, and a submit option 730, usable to draft and submit one or more comments 724 and/or a reaction, such as reaction 718.

In other examples, the comment may be input via other input means, such as orally, via the media gallery 704. For example, the user may select a microphone selection option 732 to speak the comment 724 into a microphone associated with a corresponding user device. The communication platform may store the aural comment in association with the media file 706(1) and/or may present an indication of the aural comment via the media gallery 704. For another example, the user 702 may launch a camera on the user device to take a photograph or video of a comment 724 and/or reaction 718 to the photo. The communication platform may store the comment 724 and/or reaction 718 in association with the media file 706(1).

In various examples, the user 702 may send the comment 724 input via the media gallery 704 by selecting the submit option 726 associated with the input section 722. In various examples, responsive to receiving an input via the comment 724 via the media gallery 704 (e.g., receiving an indication of selection of the submit option 726), the communication platform may store the comment 724 and/or a comment identifier associated therewith as metadata associated with the media file 706(1). In various examples, the communication platform may send the comment 724 to the second user 708 via the messaging thread between the first user 702 and the second user 708, such as in a message.

Interface 700$_C$ of FIG. 7C illustrates the messaging thread 734 between the first user 702 and the second user 708. The messaging thread 734 may include one or more messages 736, such as a first message 736 including the first media file 706(1), the second media file 706(2), and a third media file 706(3).

As discussed above, the communication platform may receive the reaction 718 and/or the comment 724 via the media gallery 704 and may send the reaction 718 and/or the comment 724 as a message 736 via the messaging thread 734. In the illustrative example, the first message 736(1) includes the media file 706(1), the second message 736(2) includes the reaction 718, and the third message 736(3) includes the comment 724. In some examples, the reaction 718 and the comment 724 may be sent together as a single message, based on respective times associated therewith being within a threshold time of one another.

In the illustrative example, the second message 736(2) and the third message 736(3) each include a representation of the media file 706(1) to which the user 702 reacted and/or commented. In other examples, the second message 736(2) and/or the third message 736(3) may not include the representation of the media file 706(1). In some examples, the second message 736(2) includes a first label 738(1) and the third message 736(3) includes a second labels 738(2). In the illustrative example, the first label 738(1) indicates that the user 702 reacted to the first media file 706(1) and the second label 738(2) indicates that the user 702 replied to the second user 708. While the first label 738(1) includes "you reacted to this" and the second label 738(2) includes "you replied to Jeff," these labels are not intended to be limiting and the first label 738(1) and the second label 738(2) may include any other words used to describe that the user 702 reacted and/or commented on a particular media file 706, such as media file 706(1). In some examples, the first label 738(1) and/or the second label 738(2) may include information that the reaction 718 and/or the comment 724 were input via the media gallery 704.

FIGS. 8A-8F illustrate example interfaces usable to enable a user 802 to manage albums of media content via an example media gallery 804. Interface 800$_A$ of FIG. 8A illustrates the media gallery 804. The media gallery 804 may include media files 806 sent and/or received by the user 802 via one or more messaging threads. In some examples, the media gallery 804 may include one or more memories 808 comprising media files 806 associated with a time in the past.

In the illustrative example, the media files 806 are presented in groups associated with a date 810 associated therewith. In some examples, the media files 806 may be presented in chronological order. In some examples, the chronological order may be associated with respective timestamps associated with media files 806. In some examples, the chronological order may be based on a time associated with creation of the media file 806 (e.g., time associated with capturing an image or video, capturing a screenshot, generating a hyperlink, etc.).

In some examples, the media files 806 may be presented in association with a messaging thread via which they were shared. In some examples, the media files 806 may include a label indicating the particular message thread and/or the other user with whom the media files 806 are shared. In some examples, the media files may be presented irrespective of the date 810 and/or the messaging threads via which the media files 806 were shared.

In various examples, the media files 806 may be selectable. As discussed above, the user 802 may select a particular media file 806 such as to comment and/or react to the media file 806. In such examples, the comment and/or reaction may be sent to the other user(s) associated with the media file 806 via a message on the messaging thread associated therewith. In some examples, the user 802 may select a media file 806 to associate the media file 806 with an album. In some examples, responsive to receiving an indication of selection of a media file 806 (e.g., right click, or the like), the communication platform may cause an album selection window 812 to be presented via the media gallery 804. The album selection window 812 may include a list of one or more albums 814 associated with a user account of the user 802. In various examples, responsive to selection of an album 814 via the album selection window 812, the communication platform may associate the particular media file 806 with the selected album 814.

In some examples, the communication platform may automatically associate media files 806 with one or more albums 814. In some examples, the communication platform may associate the media files with the album(s) 814 based on a type of media file. For example, the communication platform may associate videos with a "VIDEO" album, links with a "LINK" album, and the like. In some examples, the communication platform may associate the media file 806 with an album(s) 814 based on one or more other users with whom the media file 806 is shared. In such examples, media files 806 shared with a particular user or group of users may be presented in a single album.

In some examples, the communication platform may associate the media files 806 with the albums 814 based on a time and/or location associated therewith. In such examples, the communication platform may determine the time and/or location based on the metadata associated with the media file. For example, the communication platform may determine that a group of photographs were captured in the Fiji. The communication platform may then associate media files 806 that include a location corresponding to Fiji to be associated with a particular album. For another example, the communication platform may determine that a number of photographs and videos are associated with a particular date and/or range of dates. Based on the date and/or range of dates, the communication platform may associate the photographs and/or videos with an album.

In some examples, the communication platform may associate the media files 806 with the albums 814 based on the contents therein. In some examples, the contents may include one or more people, objects (e.g., birds, dogs, cats, etc.) places, buildings, lakes, mountains, sunsets, or the like. In some examples, the communication platform may determine the contents utilizing image recognition techniques. In some examples, the image recognition techniques may include facial recognition.

In some examples, the communication platform may associate the media files 806 with an album 814 based on comments and/or reactions associated therewith. In some examples, the comments and/or reactions may include a type of comment and/or reaction. For example, media files associated with a "thumbs up" and/or a "heart" reaction may be associated with an album. In some examples, the communication platform may associate the media files 806 with an album 814 based on a number of comments and/or reactions. For example, the communication platform may determine the media files 806 with a highest rank or those that are the "most liked" and may associate the media files 806 with a "most liked" album. In some examples, the association may be based on the number of comments and/or reactions exceeding a threshold number.

In some examples, the communication platform may determine that the number of media files 806 associated with a particular person, content, a date, range of dates, and/or location exceed a threshold number. In some examples, based on the number of media files 806 exceeding the threshold number, the communication platform may automatically generate a new album. In some examples, based on the number of media files 806 exceeding the threshold number, the communication platform may cause an album creation window 816 to be presented via the media gallery 804 to suggest that a new album be created. In the illustrative example, the album creation window 816 includes information about the potential new album. For example, the information includes an indication that the communication platform has recognized another photograph associated with a handstand.

The album creation window 816 may include selectable option 818(1) to decline the creation of a new album 814 and selectable option 818(2) to accept the creation of the new album 814. Responsive to receiving an indication of selection of the selectable option 818(2), the communication platform may generate an album associated with the album creation window 816. For example, as illustrated, the user may select the selectable option 818(2) to instruct the communication platform to create (e.g., generate) an album 814 associated with images of handstands.

In various examples, the media gallery 804 may include an album selectable option 820 to enable the user 802 to view the album(s) 814 associated with the media gallery 804. In some examples, responsive to receiving an indication of selection of the album selectable option 820, the communication platform may cause the album(s) 814 of media files 806 to be presented to the user 802.

Interface $800_B$ of FIG. 8B illustrates an album page 822 including the one or more albums 814 of media files 806 associated with the media gallery 804. In various examples, a user 802 may view and/or manage the albums 814 via the album page 822. In various examples, the user 802 may select an album 814 to view and/or manage the album.

In various examples, responsive to receiving an indication of selection of an album 814, such as album 814(1), the communication platform may cause the album management window 824 to be presented via the album page 822. The album management window 824 may include one or more selectable options 826 for viewing and/or managing the album 814(1). For example, the user 802 may select the "VIEW" selectable option 826(1) to view the contents of the album 814(1).

In some examples, the album management window 824 may include a "RENAME ALBUM" selectable option 826(2). In such examples, the user 802 may modify a name of the album 814(1). In some examples, based on a selection of the "RENAME ALBUM" selectable option 826(2) (e.g., request to modify the name), the communication platform may cause a renaming window 828 to be presented. In such examples, the user 802 may input a new name for the album via the renaming window 828. For example, the user may change the name of the album 814(1) from "SELFIES" to "THIS IS ME."

Interface 800$_C$ of FIG. 8C illustrates the user 802 sharing the album with one or more other users 830. As discussed above, responsive to receiving an indication of selection of an album 814, such as album 814(2), the communication platform may cause the album management window 824 to be presented via the album page 822. The album management window 824 may include a "SHARING" selectable option 826(3) to enable a user 802 to share the one or more media files 806 associated with the album.

In various examples, responsive to receiving an indication of selection of the "SHARING" selectable option 826(3) (e.g., request to share), the communication platform may cause a sharing window 832 to be selected. The sharing window 832 may include a list 834 of one or more other users 830, such as "suggested users". In some examples, the communication platform may determine the other users 830 associated with the list 834 based on users associated with different messaging threads via which the media files were shared. In some examples, the communication platform may determine the other users 830 based on a relationship with the user, such as a parent, spouse, etc. In some examples, the communication platform may determine the other users 830 based on one or more recognized faces in the media files 806 associated with the album.

In various examples, the user 802 may select the one or more other users 830 via the list 834. In the illustrative example, the user 802 selects a first other user 830(1), a second other user 830(2), and a third other user 830(3). In some examples, the user 802 may search for other users 830 via a search input box 836. In such examples, the user 802 may input a name or identifier associated with another user to select the other user for sharing the album 814(2).

In various examples, the sharing window 832 may include a message box 838 to input a message 840 in association with a sharing of the album 814(2). For example, the user 802 inputs the message 840 "hey guys, check out this album from our Fiji trip!" In some examples, the user may select the send option 842 and cause the album 814(2) and/or the message 840 to be shared with the selected other users 830, such as other users 830(1), 830(2), and 830(3).

Interface 800$_D$ of FIG. 8D illustrates the user 802 associating dates and/or locations with an album 814. As discussed above, responsive to receiving an indication of selection of an album 814, such as album 814(3), the communication platform may cause the album management window 824 to be presented via the album page 822. The album management window 824 may include a "DATE/LOCATION" selectable option 826(4) to enable a user 802 to modify one or more dates and/or locations associated with the selected album 814(3). For example, the user 802 may modify the dates and/or locations to organize the media files 806 associated with the album 814(3).

In various examples, responsive to receiving an indication of selection of the "DATE/LOCATION" selectable option 826(4) (e.g., request to modify the dates and/or locations associated with the album 814(3)), the communication platform may cause the date/location window 844 to be presented via the album page 822. In the illustrative example, the date/location window 844 includes date input boxes 846 associated with a start date and an end date. For example, the album 814(3) may include a plurality of photographs and videos associated with the user's children. The user 802 may want to organize the album 814(3) into an album associated with a child's first year of life. As such, the user 802 would modify the dates associated with the album 814(3) accordingly.

In some examples, the date/location window 844 may include a location input box 848 to enable the user 802 to input location for association with the album 814(3). Though illustrated as city, state, country, this is not intended to be so limiting and the location input box 848 may be configured to receive a province, zip code, area code, rural delivery code, or any other method for identifying a particular location.

Responsive to receiving an instruction to modify the album 814(3), such as via the user 802 selecting the modify option 850, the communication platform may identify one or more media files 806 that match the updated characteristics (e.g., the new dates and/or location) associated with the album 814(3). For example, the album 814(3) may be associated with the user's children. Prior to the modification, the album 814(3) may any media files 806 recognized by the communication platform as including the children. Based on receiving the instruction to modify the album 814(3) via selection of the modify option 850, the communication platform may filter the media files 806 of the children that include a date associated with the new date range input via the date input boxes 846.

Interface 800$_E$ of FIG. 8E illustrates the user 802 adding people to an album 814. As discussed above, responsive to receiving an indication of selection of an album 814, such as album 814(2), the communication platform may cause the album management window 824 to be presented via the album page 822. The album management window 824 may include an "ADD PEOPLE" selectable option 826(4) to enable a user 802 to modify one or more dates and/or locations associated with the selected album 814(3). For example, the user 802 may modify the people captured in media files associated with the album 814(2), such as to further organize the media files 806 associated with the album 814(2).

In various examples, responsive to receiving an indication of selection of the "ADD PEOPLE" selectable option 826(3) (e.g., request to add people), the communication platform may cause an add people window 852 to be selected. The add people window 852 may include a list 854 of one or more other users 856, such as a first other user 856(1) and/or a second other user 856(2). In some examples, the other users 856 may include suggested other users, such as those described above with regard to FIG. 8C. In some examples, the communication platform may determine the other users 856 associated with the list 854 based on recognized faces, such as using facial recognition techniques. In some examples, the communication platform may determine the other users 856 based on a relationship with the user, such as a parent, spouse, etc.

In various examples, the user 802 may select the one or more other users 856 via the list 854. In the illustrative example, the user 802 selects a first other user 856(1) and the second other user 856(2). In some examples, the user 802 may search for other users 856 via a search input box 858. In such examples, the user 802 may input a name or identifier associated with another user to select the other user for adding to the album 814(2).

In various examples, the add people window 852 may include an add user selectable option 860. Responsive to receiving an instruction to modify the album 814(2), such as via the user 802 selecting the add user selectable option 860, the communication platform may identify one or more media files 806 that match the updated characteristics (e.g., the face(s)) associated with the album 814(2). For example, the album 814(2) may be include media files 806 associated with a location "FIJI." Based on receiving the instruction to modify the album 814(2) via selection of the add user selectable option 860, the communication platform may filter the media files 806 that include a location of Fiji to include those associated with the first other user 856(1) and the second other user 856(2).

In some examples, the add people window 852 may include a new face selectable option 862. In some examples, the new face selectable option 862 may enable the user 802 to add a new face to add a new face associated with another person. In some examples, the other person may include another user 856 or another person who is not associated with a messaging application (e.g., not associated with a user account of the communication platform). For example, the user 802 may add Darren S.'s face to the album 814(2), such as by selecting the add user selectable option 860. The user may also associate Darren S's child with the album. However, the child may not have an associated account and/or may not be recognized by the communication platform. As such, the add people window 852 may include the new face selectable option 862 to enable the user to add a new face of the child for association with the album.

Interface 800$_F$ of FIG. 8F illustrates the user 802 adding a new person to an album. In various examples, responsive to receiving a selection of the new face selectable option 862 via the add people window 852, the communication platform may cause the camera roll window 864 to be presented via the album page 822. In some examples, the camera roll window 864 may include one or more media files 806 (e.g., photographs and/or videos) stored on a device of the user 802. In some examples, the camera roll window 864 may include photographs and/or videos associated with a user account of the user 802.

In various examples, the user 802 may select a media file 806, such as media file 806(1), for association with the album 814(2). Responsive to receiving an indication of selection of the media file 806(1), the communication platform may determine the new face in the media file 806(1) and may identify one or more media files 806 associated with the new face.

FIGS. 9A-9C illustrate example interfaces usable to enable a user 902 to create an album of media content via an example media gallery. Interface 900$_A$ of FIG. 9A illustrates the album page 904, such as album page 822. The album page 904 includes one or more albums 906, such as a first album 906(1) and a second album 906(2). As discussed above, the albums 906 may be generated based on user preferences (e.g., user settings, modifications, etc.) and/or default settings determined by the communication platform.

In various examples, the album page 904 may include a new album selectable option 908. In such examples, the user 902 may request to generate a new album 906 for organizing one or more media files.

Interface 900$_B$ of FIG. 9B illustrates the album page 904 with a new album creation window 910 via which the user 902 may create a new album 906. In various examples, the new album creation window 910 may include a label input box 912 in which the user 902 may input a name 914 for the album. In some examples, the communication platform may associate a name 914 input via the label input box 912 with the album and/or one or more media files associated therewith, such as in metadata. For example, the user may input "LAKE VACATION" into the label input box 912 as a name 914 for the new album to be generated.

In various examples, the album creation window 910 may include a subscribers section 916 in which the user 902 may add subscribers to the album. The subscribers may include other users who may receive a notification when new content is added to the album. The subscribers will be discussed in greater detail below with regard to FIGS. 10A-11E.

In some examples, responsive to receiving an indication of selection a no new subscribers option 918, the communication platform may cause the album details window 920 to be presented. The album details window 920 may enable the user 902 to determine one or more characteristics associated with the new album 906. The characteristics may include dates, locations, people and/or comments/reactions. In some examples the album details window 920 may include one or more characteristic entry boxes 922 via which the user 902 may enter the associated characteristics. For example, the album details window 920 may include a first characteristic entry box 922(1) associated with a start date of a range of dates, a second characteristic entry box 922(2) associated with an end date of the range of dates. For another example, the album details window 920 may include a third characteristic entry box 922(3) associated with a location for association with the album.

In some examples, one or more of the characteristics may include selectable options 924 in which the user may provide additional information and/or view additional windows associated therewith. For example, responsive to receiving an indication of selection of the selectable option 924(1), the communication platform may launch an add people window, such as add people window 852. For another example, responsive to receiving an indication of selection of the selectable option 924(2), the communication platform may launch a window to modify settings associated with comments and/or reactions to media files corresponding to the new album 906. For example, the user 902 may select an option to associated photographs and videos with at least 3 comments and/or reactions to the new album 906.

In various examples, responsive to receiving an indication of selection of the "FINISH" option 926, the communication platform may generate the new album 906 based on the input characteristics. Interface 900$_C$ of FIG. 9C illustrates the album page 904 including the new album 906(3) generated based on the one or more characteristics input via the album details window 920 of FIG. 9B. In some examples, the albums 906 may be presented in an order based on a time associated with a creation of the respective albums. In the illustrative example, the new album 906(3) is presented as a most recently created album 906. In some examples, the albums 906 may be presented in another order, such as in alphabetical order, chronological order based on a most recently shared media file, or the like.

Figure 10C:
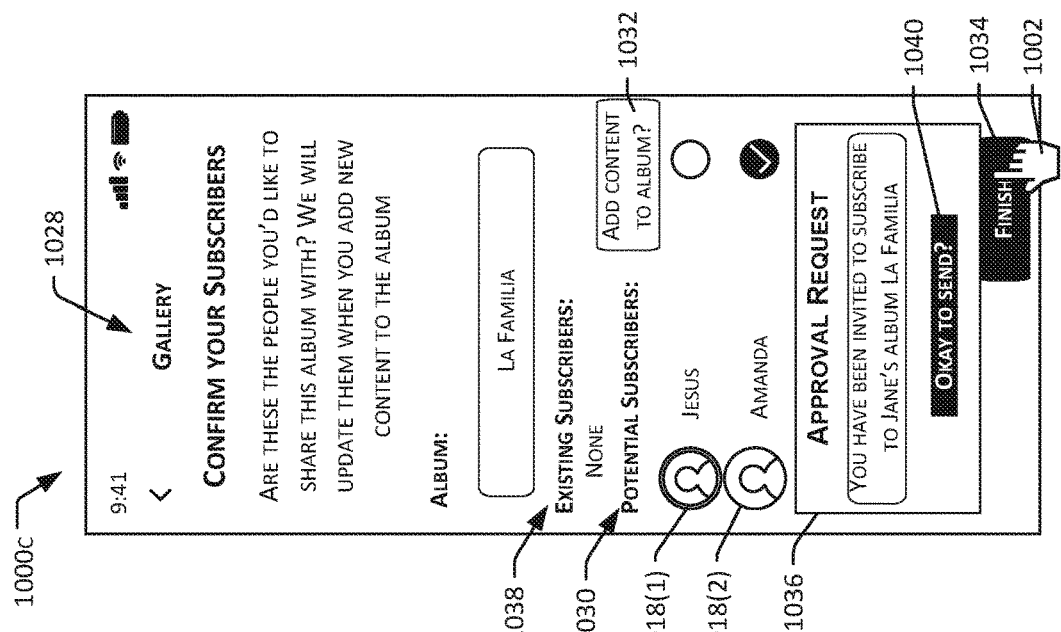
FIGS. 10A-10C illustrate example interfaces usable to enable a user to create an album of media content to share with other users.
Figure 10B:
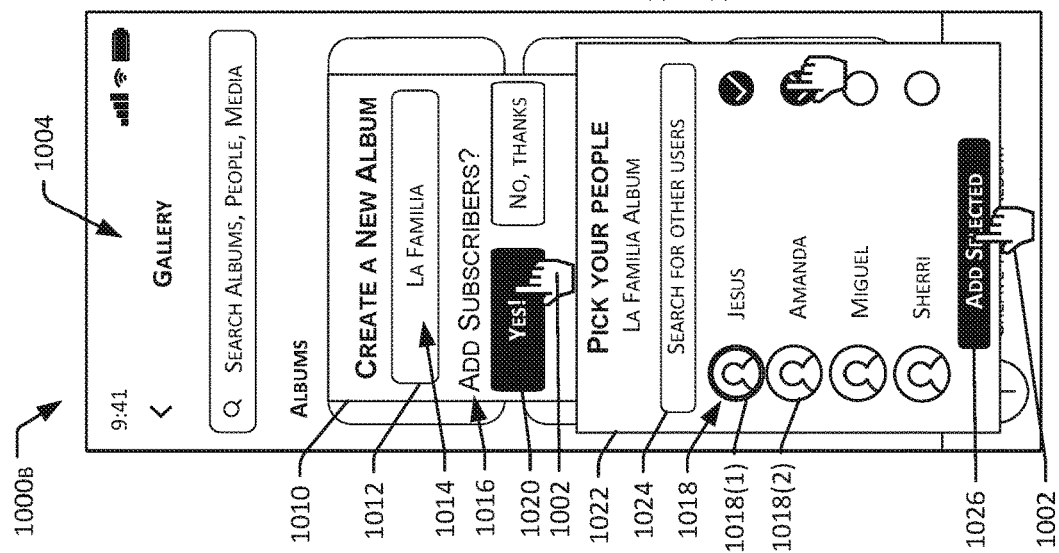
Figure 10A:
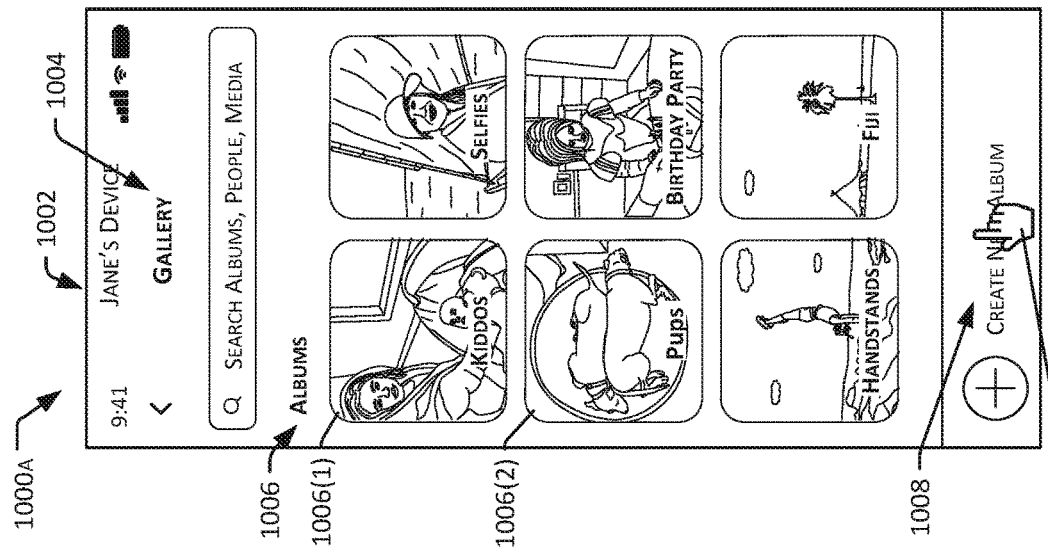

FIGS. 10A-10C illustrate example interfaces usable to enable a user 1002 to create an album of media content to share with other users. Interface 1000$_A$ of FIG. 10A illustrates the album page 1004, such as album page 822 and 904. The album page 1004 includes one or more albums 1006, such as a first album 1006(1) and a second album 1006(2). As discussed above, the albums 1006 may be generated based on user preferences (e.g., user settings, modifications, etc.) and/or default settings determined by the communication platform.

In various examples, the album page 1004 may include a new album selectable option 1008. In such examples, the user 1002 may request to generate a new album 1006 for organizing one or more media files.

Interface $1000_B$ of FIG. 10B illustrates the album page 1004 with a new album creation window 1010 via which the user 1002 may create a new album 1006. In various examples, the new album creation window 1010 may include a label input box 1012 in which the user 1002 may input a name 1014 for the album. In some examples, the communication platform may associate a name 1014 input via the label input box 1012 with the album and/or one or more media files associated therewith, such as in metadata. For example, the user may input "LA FAMILIA" into the label input box 1012 as a name 1014 for the new album 1006 to be generated.

In various examples, the album creation window 1010 may include a subscribers section 1016 in which the user 1002 may add subscribers to the album. The subscribers may include other users 1018 who may receive a notification when new content is added to the associated album 1006.

In various examples, responsive to receiving an indication that the user 1002 selected an add subscriber option 1020 associated with the album creation window 1010, the communication platform may cause a subscriber window 1022 to be presented via the album page 1004. The subscriber window 1022 may include identifiers associated with the other users 1018. In some examples, the communication platform may determine a list of suggested users, such as user 1018(1), 1018(2), etc., to be included in the subscriber window 1022. In such examples, the list may be determined based on a relationship with the user 1002, a number of media files shared between the user 1002 and respective other user 1018, activity on one or more messaging thread between the user 1002 and the other user(s) 1018 (e.g., number of messages transmitted), or the like.

In some examples, the user 1002 may search for additional other users 1018 not included in the list. In such examples, the user 1002 may input a name or other identifier associated with another user 1018 into a search input box 1024. In such examples, the user 1002 may select the other user 1018 based on a presentation of another list associated with the search.

In various examples, responsive to receiving an input of selection of an "ADD SELECTED" option 1026, the communication platform may associate the users as subscribers to the new album. In some examples, responsive to receiving an input of selection of an "ADD SELECTED" option 1026, the communication platform may launch a confirmation page to confirm the subscribers.

Interface $1000_C$ of FIG. 10C illustrates the confirmation page 1028 via which the user 1002 may confirm the subscribers. In the illustrative example, the confirmation page 1028 includes one or more potential subscribers 1030 based on the selected other users 1018, such as the first other user 1018(1) and the second other user 1018(2).

In some examples, the user 1002 may select one or more of the potential subscribers 1030 (other users 1018) to be contributors to the album 1006. In such examples, the confirmation page 1028 may include a content add option 1032 through which the one or more other users 1018 may be selected. In the illustrative example, the first other user 1018(1) is not granted permission to contribute to the album 1006 and the second other user 1018(2) is granted permission to contribute to the album 1006.

In various examples, the user 1002 may confirm the potential subscribers 1030 and/or the permission to contribute by selecting a "FINISH" option 1034. In some examples, responsive to receiving an indication of selection of the "FINISH" option 1034, the communication platform may automatically associate the selected other users 1018(1) and 1018(2) as potential subscribers 1030 of the album. In such examples, the first other user 1018(1) and the second other user 1018(2) may receive notifications of media content being added to the album 1006 named "LA FAMILIA."

In some examples, responsive to receiving an indication of selection of the "FINISH" option 1034, the communication platform may generate an approval request 1036. In some examples, the approval request 1036 may be sent to the potential subscribers 1030. In some examples, the approval request may be sent as a notification in the messaging application, as a message in a messaging thread between the user 1002 and the other users 1018 (e.g., potential subscribers 1030), via email, text message, or other means of communicating an approval request.

In the illustrative example, the approval request 1036 is generated to be delivered to the potential subscribers 1030, such as the first other user 1018(1) and the second other user 1018(2). In such examples, the potential subscribers 1030 may be given the option to approve or deny the subscription to the album 1006 prior to being associated therewith. In some examples, responsive to receiving an indication of approval from the first approve the other users 1018(1) and 1018(2), the communication platform may associate the other users 1018(1) and 1018(2) as subscribers.

In various examples, the user 1002 may request to add additional (potential) subscribers 1030 to the "LA FAMILIA" album 1006 at a later date (after a time associated with creation as depicted in FIGS. 10A-10C. In such examples, the communication platform may send an approval request 1036 to existing subscribers 1038 (illustrated as none in the creation example) to approve of the additional subscribers. In some examples, the approval request 1036 may be sent to one or more existing subscribers 1038 who have permissions to add content to the album 1006, such as those selected via the add content option 1032. In such examples, the communication platform may provide a means by which users 1002 and/or other users 1018 who contribute to the album 1006 may control the subscribers 1030 added to the album. For example, the user 1002 may request to add a third other user (not illustrated) to the "LA FAMILIA" album 1006. The communication platform may generate an approval request 1036 and send the approval request 1036 to the second other user 1018(2), Amanda, for approval. Based on receiving, from an existing subscriber 1038 with contribution permissions (e.g., the second other user 1018(2)), an indication of rejection of the approval request related to the addition of the third other user, the communication platform may not associate the third other user with the album 1006. Based on receiving, from the existing subscriber 1038 with contribution permission, an indication of approval of the third other user, the communication platform may associate the third other user with the album 1006.

In some examples, the approval request 1036 may be sent to the other users 1018 based on a selection, by the user, of the send option 1040. Responsive to receiving an indication of selection of the send option 1040, the communication platform may send the approval request 1036 to the potential subscribers 1030.

FIGS. 11A-11E illustrate example interfaces usable to enable a user 1102 to update an album that is shared with other users. Interface $1100_A$ of FIG. 11A illustrates an album page 1104 in which the user 1102 may add new media content to an album 1106, such as album 1106(1). In various examples, the album 1106(1) may have associated therewith one or more subscribers, such as subscribers 1030. The subscribers may include one or more other users who receive notifications of modifications to the album 1106(1). The modifications may include a name change, media file addition, media file deletion, change to a characteristic, or any other modification the user 1102 may make to the album 1106(1).

As discussed above, the user 1102 may view and/or manage the albums 1106 via the album page 1104. In various examples, the user 1102 may select a particular album 1106, such as album 1106(1), to view and/or manage the album 1106(1).

In various examples, responsive to receiving an indication of selection of an album 1106(1), the communication platform may cause the album management window 1108 to be presented via the album page 1104. The album management window 1108 may include one or more selectable options 1110 for viewing and/or managing the album 1106(1). For example, the user 1102 may select the "VIEW" selectable option 1110(1) to view the contents of the album 1106(1). For another example, the user 1102 may select the "RENAME ALBUM" selectable option 1110(2) to rename the album 1106(1).

In some examples, the album management window 1108 may include an "ADD SUBSCRIBERS" selectable option 1110(4) for adding subscribers to the album 1106(1). In some examples, responsive to receiving a selection of the "ADD SUBSCRIBERS" selectable option 1110(4), the communication platform may send an approval request to the new subscriber. In some examples, responsive to receiving a selection of the "ADD SUBSCRIBERS" selectable option 1110(4), the communication platform may send an approval request to add a subscriber to an existing subscriber of the album. In some examples, the approval request may be sent based on a determination that the existing subscriber is a contributor to the album 1106(1).

In at least one example, the user 1102 may select the "ADD PHOTO(S)" selectable option 1110(3) to add additional media files to the album 1106(1). Though illustrated as "ADD PHOTOS," it is merely for illustrative purposes and is not intended to be so limiting. For example, the user 1102 may add links to articles to share with the subscribers, videos, screenshots, GIFs, or any other type of media content.

In various examples, responsive to receiving a selection of the "ADD PHOTO(S)" selectable option 1110(3) via the album management window 1108, the communication platform may cause the camera roll window 1112 to be presented via the album page 1106. In some examples, the camera roll window 1112 may include one or more media files 1114 (e.g., photographs, videos, links, screenshots, GIFs, etc.) stored on a device of the user 1102. In some examples, the camera roll window 1112 may include media files associated with a user account of the user 1102.

In some examples, the user 1102 may select one or more media files 1114 to add to the album 1106(1) via the camera roll window 1112. In the illustrative example, the user 1102 selects a first media file 1114(1), a second media file 1114(2), and a third media file 1114(3) to be added to the album 1106(1). Responsive to receiving an indication of selection of the album update selectable option 1116, the communication platform may associate the first media file 1114(1), the second media file 1114(2), and the third media file 1114(3) with the album 1106(1). In some examples, the communication platform may store an association with the album in the metadata associated with the first media file 1114(1), the second media file 1114(2), and the third media file 1114(3). In such examples, the association may include an album identifier associated with the album 1106(1).

In various examples, responsive to the new media files 1114 being added to the album 1106(1), the communication platform may cause a notification to be sent to the subscribers associated with the album 1106(1).

Interface $1100_B$ of FIG. 11B illustrates a first messaging thread 1118 between the user 1102 and a first subscriber 1120(1). Interface $1100_C$ of FIG. 11C illustrates a second messaging thread 1122 between the user 1102 and a second subscriber 1120(2). The first messaging thread 1118 includes one or more first messages 1124 between the first user 1102 and the first subscriber 1120(1). The second messaging thread 1122 includes one or more second messages 1126 between the first user 1102 and the second subscriber 1120(2). Though illustrated as a first messaging thread 1118 between the first user 1102 and the first subscriber 1120(1) and a second messaging thread 1122 between the first user 1102 and the second subscriber 1120(2), this is not intended to be limiting and a messaging thread may be between the first user 1102 and one or more subscribers 1120, such as in a group messaging thread. For example, the interface $1100_E$ and/or interface $1100_C$ may include a group messaging thread between the user 1102, the first subscriber 1120(1), and the second subscriber 1120(2). For another example, the user 1102 may designate an existing group associated with a group messaging thread as a subscriber 1120 to an album 1106. In such an example, updates to the album 1106 may be published in association with the group messaging thread.

In various examples, responsive receiving a request to add the new media files 1114 to the album 1106(1) (e.g., based on a selection of the album update selectable option 1116), the communication platform may cause a notification 1128 to be sent to the subscribers associated with the album 1106(1). In the illustrative example of FIGS. 11B and 11C, a first notification 1128(1) is presented as a first message 1124 in the first messaging thread 1118 and a second notification 1128(2) is presented as a second message 1126 in the second messaging thread 1122. In other examples, the notification 1128 may be presented as push notifications, such as on a notification page associated with instances of a messaging application, text messages, electronic mail messages, or the like.

In the illustrative examples, the first notification 1128(1) and the second notification 1128(2) include an indication that the new media files 1114(1), 1114(2), an 1114(3) have been added to the album. In other examples, the notification 1128(1) and the second notification 1128(2) may include additional or alternative information regarding the update to the album 1106(1). Additionally, in the illustrative examples, the first notification 1128(1) and the second notification 1128(2) include an instruction 1130 to select the gallery icon 1132 to view the newly added media content. In examples in which a group messaging thread is associated with the album 1106, the notification 1128 may be presented via the group messaging thread.

Interface $1100_D$ of FIG. 11D illustrates a chat page 1134, such as chat page 202, including a third notification 1128(3) and a fourth notification 1128(4). In some examples, the third notification 1128(3) and/or the fourth notification 1128(4) may be presented in addition to or in lieu of the first notification 1128(1) on a device of the first subscriber 1120(1).

As illustrated in FIG. 11D, the third notification 1128(3) may indicate a single update (illustrated as "1") to an album 1106, such as album 1106(1), to which the first subscriber 1120(1) is associated.

In various examples, the fourth notification 1128(4) may include additional information about the album update. For example, as illustrated, the fourth notification 1128(4) includes information that new photos have been added to the "LA FAMILIA" album. In various examples, the fourth notification 1128(4) includes a selectable option 1136 to view the album 1106(1). Responsive to receiving an indication of selection of the selectable option 1136, the communication platform may cause the album 1106(1) to be presented via the messaging application.

Interface $1100_E$ of FIG. 11E illustrates an album page 1138 associated with the album 1106(1). In various examples, the album page 1138 may include one or more media files 1114 associated with the album 1106(1). In various examples, the album page 1138 may include a recently added section 1140. In such examples, the album page 1138 may display the first media file 1114(1), the second media file 1114(2) and the third media file 1114(3) added by the user 1102 illustrated in FIG. 11A. In the illustrative example, the album page 1138 includes a previously added section 1142 including media files 1114 added prior to those recently added (e.g., media files 1114(1), 1114(2), and 1114(3)). In some examples, the media files 1114 may be presented in a chronological order, such as based on a time associated with media file 1114 generation, addition to the album 1106(1), and/or sharing via a messaging thread. In some examples, the media files 1114 may be grouped based on the times. In such examples, the media files 1114 may be presented in the groups of media files 1114.

Example Computing Architecture

Figure 12:
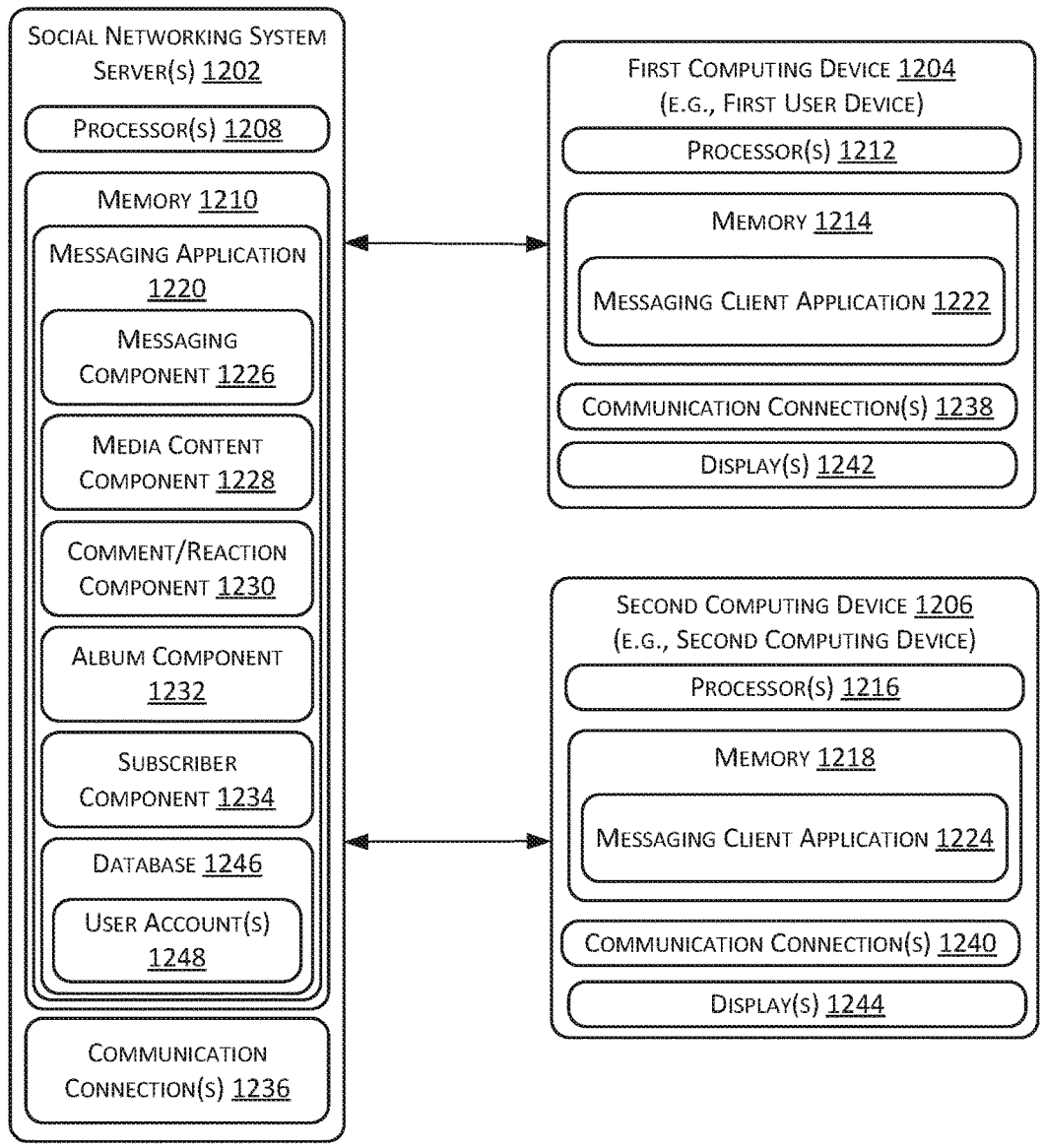
FIG. 12 is a block diagram illustrating an example system of computing devices usable to implement example techniques described herein.

FIG. 12 illustrates a block diagram illustrating an example system 1200 of computing devices usable to implement example techniques described herein. For example, FIG. 12 illustrates example computing devices including communication platform server(s) 1202, one or more first computing devices 1204, and one or more second computing devices 1206, that interact over a network, such as network 110 in FIG. 1. By way of example and not limitation, the communication platform server(s) 1202 may be representative of servers used to implement the system 100, the first computing device(s) 1204 may be representative of the first user computing device 106(1) associated with the first user 108(1), and the second computing device(s) 1206 may be representative of the second user computing device 106(2) associated with the second user 108(2).

The communication platform server(s) 1202 may comprise one or more individual servers or other computing devices that may be physically located in a single central location or may be distributed at multiple different locations. The communication platform server(s) 1202 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

Each of the computing devices described herein may include one or more processors and/or memory. Specifically, in the illustrated example, communication platform server(s) 1202 include one or more processors 1208 and memory 1210, first computing device(s) 1204 includes one or more processors 1212 and memory 1214, and second computing device(s) 1206 includes one or more processors 1216 and memory 1218. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory may comprise one or more non-transitory computer-readable media and may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

As shown in FIG. 12, communication platform server(s) 1202 include a messaging application 1220, first computing device(s) 1204 includes messaging client application 1222, and second computing device(s) 1206 includes messaging client application 1224 that enables interaction of content among the computing devices via the communication platform server(s) 1202. For example, media content (e.g., messages including text, images, audio, video, etc.) can be shared among users associated with messaging accounts of an online messaging network provided by the communication platform system and may include sharing content in accordance with an account of a user that is restricted. In some examples, the messaging client application enables interfaces to share content, to access content, to view content, to comment and/or react to content, and to generate albums of content as those described with reference to FIGS. 3A-11E, for example. In particular examples, communication platform server(s) 1202 send instructions to present, transmit, and receive content as discussed with reference to FIG. 3A-FIG. 11E.

FIG. 12 further illustrates communication platform server(s) 1202 as including messaging component 1226, a media content identification component 1228, comment/reaction component 1230, album component 532, and a subscriber component 1234, to enable content such as messages, photos, and the like, to be shared among the computing devices.

In various examples, the messaging component 1226 may be configured to process messages between the first computing device 1204 and the second computing device 1206, via the messaging client applications 1222 and 1224, respectively. In various examples, the messaging component 1226 may be configured to generate message identifiers for each message transmitted via the messaging application 1220. In various examples, the messaging component 1226 may be configured to store the message identifiers associated with each message, such as in metadata associated therewith.

In various examples, the media content identification component 1228 may be configured to identify media content associated with messages processed by the messaging component 1226. In such examples, the media content identification component 1228 may determine that a media file is associated with a message transmitted via the messaging application 1220, such as from messaging client application 1222 to messaging client application 1224, or vice versa. In some examples, the media content identification component 1228 may be configured to generate media file identifiers to each media file transmitted via the messaging application 1220. The media content identification component 1228 may associate the media file identifiers with the messages, such as in metadata associated therewith. In some examples, the media content identification component 1228 may associate the media file identifiers with the media files, such as in metadata associated therewith.

In various examples, the comment/reaction component 1230 may be configured to receive a message via a messaging client application 1222 and/or 1224 and determine that the message includes a comment and/or reaction to a shared media file. In some examples, the determination that the message includes the comment and/or the reaction may be based on a time associated with the message as compared to a time associated with sharing the media file. In some examples, the determination may be based on the times being within a threshold amount of time of one another (e.g., within 5 minutes, within an hour, etc.).

In some examples, the determination may be based on a content of the message. In some examples, the comment/reaction component 1230 may be configured to perform natural language processing on the message to determine the contents therein. In some examples, the comment/reaction component 1230 may compare the contents to an expected reaction to the message. The expected reaction may be determined utilizing machine learning techniques, heuristics, observations, experimentation, and/or other methods of predicting reactions to media content. In various examples, based on a determination that the content of the message includes an expected reaction, the comment/reaction component 1230 may store the contents as a comment and/or reaction to the media file, such as in metadata associated therewith.

In various examples, the comment/reaction component 1230 may determine that a message includes a reaction based on a reaction identifier associated therewith, such as an identifier associated with a "like" a "heart," or the like. In such examples, the comment/reaction component 1230 may store the reaction identifier as metadata associated with the media file.

In various examples, the comment/reaction component 1230 may determine to present the comments and/or reactions to the media file in media galleries associated with the messaging client application 1222 and/or messaging client application 1224. In some examples, the comment and/or reactions may be presented based on a size of the media file presented via a media gallery. For example, small images may include reactions and larger images may include comments and reactions.

In various examples, the album component 1232 may be configured to organize the media files into one or more albums for presentation to a user. In various examples, the album component 1232 may include default settings. In such examples, the album component 1232 may organize the media files in the same albums in each of the messaging client applications 1222 and 1224. In some examples, the album component 1232 may enable the user to create and/or modify one or more albums associated with a media gallery, such as that described above with regard to FIGS. 8A-11A.

In various examples, the subscriber component 1234 may enable the user to create and/or manage an album with subscribers, such as that described above with regard to FIGS. 10A-11E. In some examples, the user may select one or more other users via a messaging client application 1222 or 1224 to subscribe to a particular album. The user may then add new media content to the album. Based on receipt of the new media content, the subscriber component 1234 may send a notification to the messaging client application 1222 or 1224 associated with the subscriber, indicating that the new content has been added.

In various examples, the subscriber component 1234 may receive a request from a user, such as via the messaging client application 1222 or 1224, to add a new subscriber to an album. The request may include an identifier associated with the new subscriber, such as a name, a nickname, a relationship, or the like. The subscriber component 1234 may determine whether the album includes other subscribers with permissions to contribute content to the album (e.g., contributors). Based on a determination that the album does not include other contributors (e.g., the user is the sole contributor to the album), the subscriber component 1234 may associate the new subscriber to the album.

Based on a determination that the album includes other contributors (e.g., the user is not the sole contributor to the album), the subscriber component 1234 may generate an approval request. The approval request may include the identifier of the new (potential) subscriber, an identifier associated with the user, a relationship between the new subscriber and the user and/or the existing contributing subscriber, and/or any other information to inform the existing contributing subscriber as to whether to approve the new subscriber as a subscriber to the album.

Based on receiving a disapproval of the new subscriber, the subscriber component 1234 may not associate the new subscriber with the album. In some examples, the subscriber component 1234 may send a message and/or notification to the user indicating that the existing contributing subscriber denied access to the album to the other user (e.g., new potential subscriber). Based on receiving an approval of the new subscriber from the existing contributing subscriber, the subscriber component 1234 may associate the new subscriber with the album.

In various examples, the messaging application 1220 may include one or more databases 1246 for storing media files associated with the messaging application 1220. In various examples, the databases 1246 may additionally store messages associated with the media files, such as the conversations associated with the media files. The conversations may include comments and/or reactions to the media files and other messages. In various examples, the comments and/or reactions to the media files may be stored in the database 1246 as metadata, such as that described herein.

In various examples, a media files may be stored in association with a messaging thread via which it was shared between users. In some examples, the media files may be stored in association with an album of media files managed by the communication platform and/or by the user (e.g., based on user preferences). In various examples, the media files, media galleries, messaging threads, albums, and the like, as described herein, may be stored in association with one or more user accounts 1248, such as user accounts 112 of FIG. 1.

As shown in FIG. 12, communication platform server(s) 1202 include communications connection(s) 1236, first computing device(s) 1204 include communications connection(s) 1238, and second computing device(s) 1206 include communications connection(s) 1240 that enable communication between at least the communication platform server(s) 1202 and one or more of the first computing device(s) 1204, and the second computing device(s) 1206.

The communication connection(s) 1236, 1238, and/or 1240 may include physical and/or logical interfaces for connecting communication platform server(s) 1202, first computing device(s) 1204, and/or second computing device(s) 1206 to another computing device or a network, such as network(s) 110. For example, the communications connection(s) 1236, 1238, and/or 1240 may enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with the other computing device(s).

Additionally, the first computing device(s) 1204 may include display(s) 742 and the second computing device(s) 1206 may include display(s) 744. Depending on a type of computing device used as the first computing device(s) 1204 and/or the second computing device(s) 1206, the displays 742 and 744 may employ any suitable display technology. For example, the displays 742 and 744 may include liquid crystal displays, a plasma displays, a light emitting diode displays, OLED (organic light-emitting diode) displays, electronic paper displays, or any other suitable type of displays able to present digital content thereon. In some examples, the displays 742 and 744 may have a touch sensor associated therewith to provide a touchscreen display configured to receive touch inputs for enabling interaction with a graphical user interface presented on the displays 742 and 744. Accordingly, implementations herein are not limited to any particular display technology.

While FIG. 12 is provided as an example system 1200 that can be used to implement techniques described herein, the techniques described and claimed are not limited to being performed by the system 1200, nor is the system 1200 limited to performing the techniques described herein.

Example Methods

FIGS. 13-19 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 13:
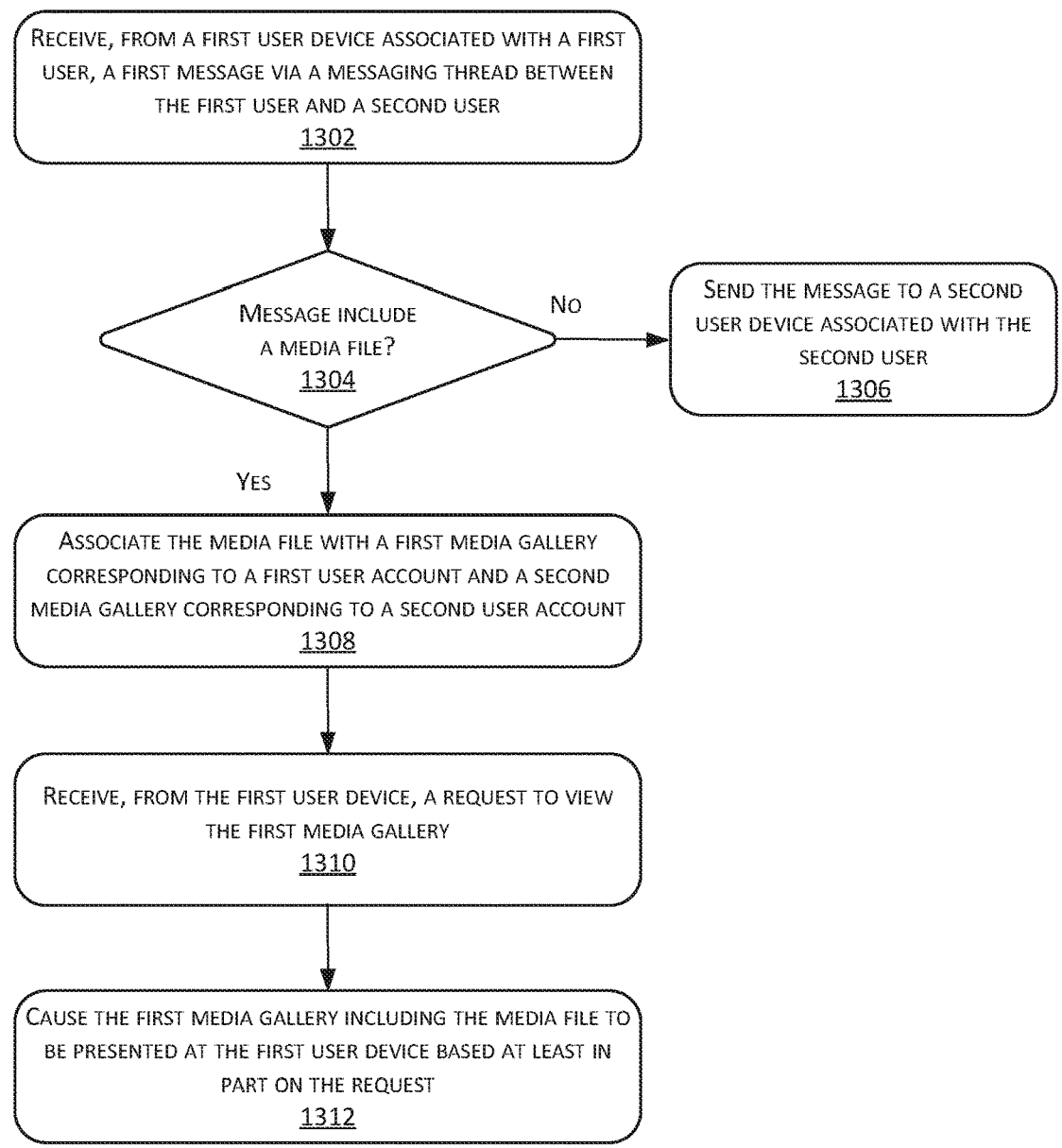
FIG. 13 illustrates an example process for causing a presentation of a media gallery including a media content shared via a messaging thread, utilizing the techniques described herein.

FIG. 13 illustrates a flowchart illustrating example process 1300 for causing a presentation of a media gallery including media content shared via a messaging thread, utilizing the techniques described herein. In some instances, some or all of process 1300 may be performed by one or more components in the systems 100 or 1200. By way of example and not limitation, the communication platform computing device referred to in process 1300 may be representative of a computing device associated with the communication platform 104 or communication platform server(s) 1202, the first user device referred to in process 1300 may be representative of the first user computing device(s) 106(1) and/or first computing device(s) 1204 and the second user device referred to in process 1300 may be representative of the second user computing device(s) 106(2) and/or second computing device(s) 1206. However, the process 1300 is not limited to being performed by the system 100 or 1200.

At operation 1302, the process 1300 may include receiving, from a first user device associated with a first user, a first message via a messaging thread between the first user and a second user. The messaging thread may include one or more messages processed by the communication platform. In various examples, the communication platform may assign an identifier to each message of the messaging thread. In such examples, the communication platform may store the message identifier as metadata associated with the message.

At operation 1304, the process 1300 may include determining whether the message includes a media file. The communication platform may determine that the message includes the media file based on a file type (e.g., JPEG, GIF, PNG, TIFF, BMP, AAC, MP3, WAV, MPEG-1, MPEG-2, AVI, hyperlink, etc.) associated with the message and/or an attachment thereto.

Based on a determination that message does not include a media file (e.g., media content) ("No" at operation 1304), the process 1300 may include, at operation 1306, sending the message to a second user device associated with the second user. In various examples, the communication platform may send the message to a second instance of the messaging application associated with the second user device. In various examples, the second instance of the messaging application and/or the second user device may be determined based on a second user identifier associated with the second user, such as that determined in association with the messaging thread.

Based on a determination that the message includes a media file ("Yes" at operation 1304), the process 1300 may include, at operation 1308, associating the media file with a first media gallery corresponding to a first user account and a second media gallery corresponding to a second user account. The first media gallery may include one or more media files shared via one or more messaging threads between the first user and one or more other users, such as the second user. The second media gallery may include one or more media files shared via one or more messaging threads between the second user and one or more other users, such as the first user.

In various examples, the communication platform may assign an identifier to the media file. In some examples, the communication platform may store the media file identifier as metadata associated with the media file and/or the message. In some examples, the communication platform may store the message identifier associated with the media file as metadata associated with the media file.

Additionally or alternatively, the communication platform may assign a messaging thread identifier (e.g., distinct identifier associated with the messaging thread) and/or a conversation identifier to the media file and/or message associated therewith. In such examples, the media file may store an indication of the messaging thread and/or conversation via which the media file was shared. In some examples, the conversation identifier may include a first message identifier and/or a last message identifier associated with the conversation, such as that illustrated in FIGS. 4A-4C.

In various examples, the communication platform may determine a first order of the one or more media files of the first media gallery and a second order of the one or more media files of the second media gallery. The first order and the second order may be the same or a different order. In some examples, the first order and the second order may be chronological, based on a date and/or time associated with a transmission of the media files, generation of the media files, or the like. In some examples, the first order and the second order may be determined based on the messaging thread via which the respective media files are shared. In some examples, the first order and the second order may be determined based on user preferences, such as based on a user preference to view media files including hyperlinks and articles before media files including photographs.

At operation 1310, the process 1300 may include receiving, from the first user device, a request to view the first media gallery. In various examples, the request to view the first media gallery may include an indication of selection of a media gallery icon, such as media gallery selectable option 212 of FIG. 2.

At operation 1312, the process 1300 may include causing the first media gallery including the media file to be presented at the first user device based at least in part on the request to view the first media gallery. In various examples, the communication platform may receive the request to view the first media gallery (e.g., indication of selection of the media gallery icon), and responsive to the request, may cause the first media gallery to be presented on the first user device, such as that depicted in FIGS. 2A and 2B. In various examples, the media files of the first media gallery may be presented in the first order, as described above.

Figure 14:
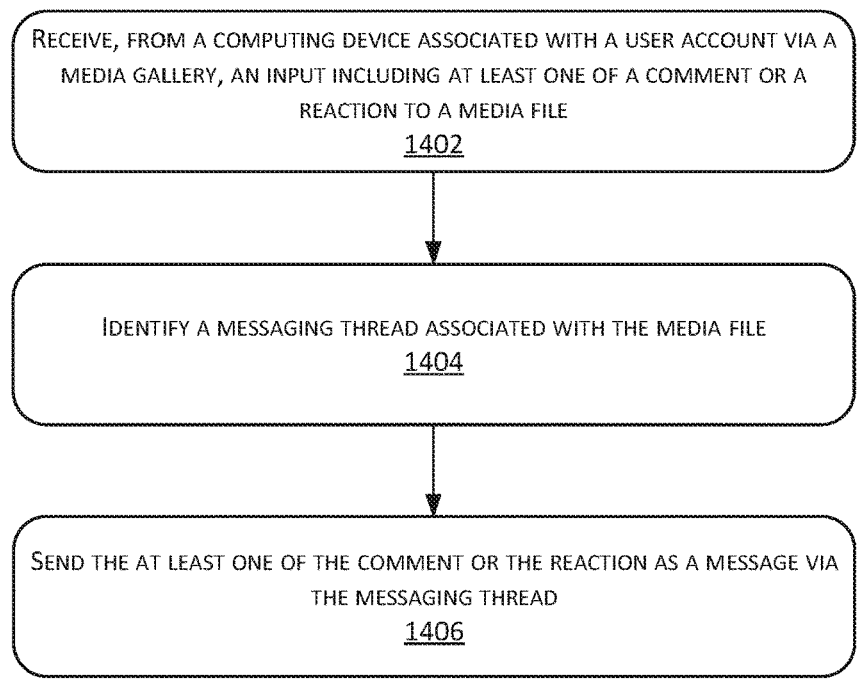
FIG. 14 illustrates an example process for receiving a comment or a reaction to a media content via a media gallery and sending the comment or the reaction as a message via a messaging thread, utilizing the techniques described herein.

FIG. 14 illustrates an example process 1400 for receiving a comment or a reaction to a media content via a media gallery and sending the comment or the reaction as a message via a messaging thread, utilizing the techniques described herein. In some instances, some or all of process 1400 may be performed by one or more components in the systems 100 or 1200. By way of example and not limitation, the communication platform computing device referred to in process 1400 may be representative of a computing device associated with the communication platform 104 or communication platform server(s) 1202, the first user device referred to in process 1400 may be representative of the first user computing device(s) 106(1) and/or first computing device(s) 1204 and the second user device referred to in process 1400 may be representative of the second user computing device(s) 106(2) and/or second computing device(s) 1206. However, the process 1400 is not limited to being performed by the system 100 or 1200.

At operation 1402, the process 1400 may include receiving, from a computing device associated with a user account via a media gallery, an input including at least one of or a comment or a reaction to a media file. In some examples, the communication platform may determine that the input includes the reaction based on the input being received via a reaction emoji menu, such as reaction menu 716 of FIG. 7A. In some examples, the communication platform may determine that the input includes the reaction based on a reaction identifier associated therewith.

In some examples, the communication platform may determine that the input includes a comment based on receiving an indication of selection of a comment selectable option, such as comment selectable option 720 of FIG. 7B, and receiving the subsequent input via a comment input box, such as comment input box 728.

At operation 1404, the process 1400 may include identifying a messaging thread associated with the media file. In some examples, the communication platform may identify the messaging thread based on a messaging thread identifier associated with the media file, such as that stored as metadata. In some examples, the communication platform may identify the messaging thread based on a message identifier associated with the media file. In some examples, the communication platform may identify the messaging thread based on a user identifier associated with another user with whom the media file was shared. In such examples, the user identifier associated with the other user may be stored as metadata associated with the media file.

At operation 1406, the process 1400 may include sending the at least one of the comment or the reaction as a message via the messaging thread. In some examples, the communication platform may generate the message based on a determination that the input at operation 1402 includes the at least one of the comment or a reaction.

Figure 15:
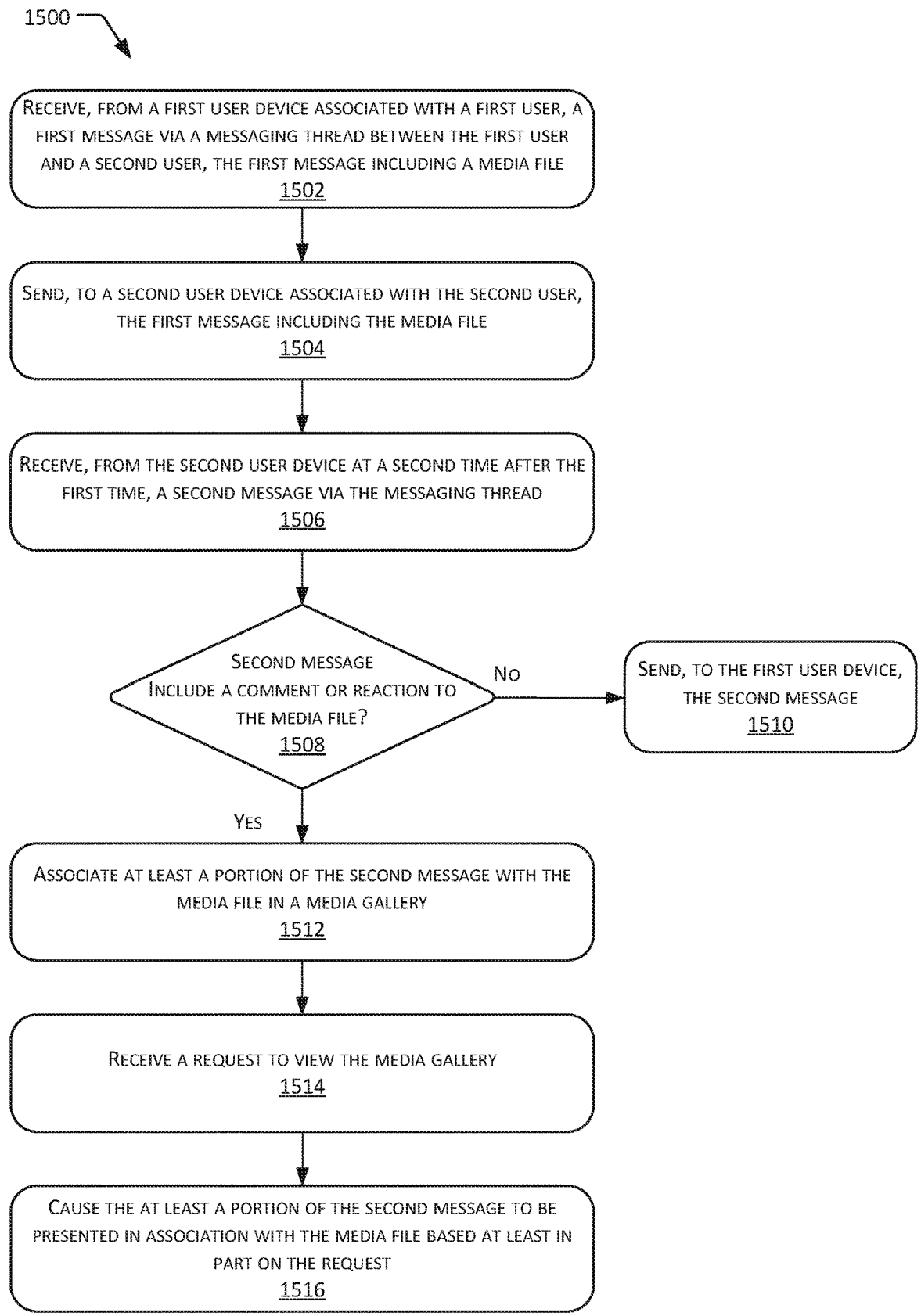
FIG. 15 illustrates an example process for determining that a message includes a comment or a reaction to a media content and presenting the comment or the reaction in association with the media content in a media gallery, utilizing the techniques described herein.

FIG. 15 illustrates an example process 1500 for determining that a message includes a comment or a reaction to a media content and presenting the comment or the reaction in association with the media content in a media gallery, utilizing the techniques described herein. In some instances, some or all of process 1500 may be performed by one or more components in the systems 100 or 1200. By way of example and not limitation, the communication platform computing device referred to in process 1500 may be representative of a computing device associated with the communication platform 104 or communication platform server(s) 1202, the first user device referred to in process 1500 may be representative of the first user computing device(s) 106(1) and/or first computing device(s) 1204 and the second user device referred to in process 1500 may be representative of the second user computing device(s) 106(2) and/or second computing device(s) 1206. However, the process 1500 is not limited to being performed by the system 100 or 1200.

At operation 1502, the process 1500 may include receiving, from a first user device associated with a first user, a first message via a messaging thread between the first user and a second user, the first message including a media file. The messaging thread may include one or more messages processed by the communication platform between the first user and the second user. In various examples, the communication platform may assign a message identifier to each message of the messaging thread. In such examples, the communication platform may store the message identifier as metadata associated with the message. In various examples, the communication platform may assign a media file identifier to each media file. The communication platform may store the media file identifier and/or the message identifier in association with the media file, such as in metadata associated therewith. In some examples, the communication platform may additionally store a messaging thread identifier, a conversation identifier, a first message identifier associated with a conversation, a last message identifier associated with the conversation, and/or other identifiers to link the media file to the messaging thread and/or one or more messages of the messaging thread.

The communication platform may determine that the message includes the media file based on a file type (e.g., JPEG, GIF, PNG, TIFF, BMP, AAC, MP3, WAV, MPEG-1, MPEG-2, AVI, hyperlink, etc.) associated with the message and/or an attachment thereto. In various examples, based on a determination that the message includes the media file, the communication platform may associate the media file with a first media gallery associated with the first user account and a second media gallery associated with the second user. The first media gallery may include one or more media files shared via one or more messaging threads between the first user and one or more other users, such as the second user. The second media gallery may include one or more media files shared via one or more messaging threads between the second user and one or more other users, such as the first user.

At operation 1504, the process 1500 may include sending, to a second user device associated with the second user, the first message including the media file. In various examples, the communication platform may send the message to a second instance of the messaging application associated with the second user device. In various examples, the second instance of the messaging application and/or the second user device may be determined based on a second user identifier associated with the second user, such as that determined in association with the messaging thread.

At operation 1506, the process 1500 may include receiving, from the second user device at a second time after the first time, a second message via the messaging thread. In some examples, the communication platform may assign a message identifier to the second message and may store the identifier as metadata associated therewith. In some examples, the communication platform may store the message in association with the messaging thread, such as in a messaging database.

At operation 1508, the process 1500 may include determining whether the second message includes a comment and/or a reaction to the media file. In various examples, the communication platform determines that the second message include the comment and/or the reaction based on a timestamp associated therewith being within a threshold time of a timestamp associated with the first message including the media content. In some examples, the communication platform may determine the association based on a determination that the first message and the second message are transmitted consecutively, such as in a group or cluster of messages.

In various examples, the communication platform determines that the second message include the comment and/or a reaction based on contents of the second message. In some examples, the contents may include an identifier associated with a particular reaction emoji. In such examples, the reaction emoji may be associated with the media content. In some examples, the communication platform may utilize natural language processing to determine the contents of the second message. In such examples, based on the contents, the communication platform may determine whether the second message is associated with the media content, such as if the contents include a comment and/or a reaction to the media content.

In various examples, the communication platform may be configured to perform image recognition on the media content to determine an expected reaction and/or comment thereto. In such examples, the communication platform may utilize one or more image processing algorithms to determine objects, people, places, actions, and the like captured in an image (or series of images). In some examples, the expected reaction and/or comment thereto may be determined by utilizing machine learned models, heuristics, observations, experimentation, and/or other methods of predicting human behavior. In some examples, the communication platform may compare the contents of the second message to determine whether the second message includes a reaction and/or comment to the media content of the first image. For example, the communication platform may determine that the media content of the first message includes a picture of a bride at a wedding. The communication platform may determine that an expected reaction may include the words "amazing," "stunning," "beautiful," "handsome," and the like. The communication platform may perform natural language processing on the second message to determine that the second message includes a statement "so beautiful!" Based on a determination that the contents of the message match the expected reaction, the communication platform may determine that the second message includes the comment and/or reaction to the media file.

Based on a determination that ("No" at operation 1508), the process 1500 may include, at operation 1510, sending, to the first user device, the second message. In various examples, the communication platform may send the message to a first instance of the messaging application associated with the first user device. In various examples, the first instance of the messaging application and/or the first user device may be determined based on a first user identifier associated with the first user, such as that determined in association with the messaging thread. As used herein an instance of an application may include a native application installed on a user computing device and/or a web application accessed via a web browser associated with the user computing device.

Based on a determination that ("Yes" at operation 1508), the process 1500 may include, at operation 1512, associating at least a portion of the second message with the media file in a media gallery. In various examples, the communication platform may associate the comment and/or the reaction with the media file in the media gallery. In various examples, the communication platform may store the comment and/or reaction as metadata associated with the media file. In various examples, the communication platform may cause the comment and/or the reaction to be presented in association with the media file in a first media gallery associated with the first user and/or a second media gallery associated with the second user.

At operation 1514, the process 1500 may include receiving a request to view the media gallery. In various examples, the request to view the first media gallery may include an indication of selection of a media gallery icon, such as media gallery selectable option 212 of FIG. 2.

At operation 1516, the process 1500 may include causing the at least a portion of the second message to be presented in association with the media file based at least in part on the request. In various examples, the communication platform may receive the request to view the first media gallery (e.g., indication of selection of the media gallery icon), and responsive to the request, may cause the first media gallery to be presented on the first user device, such as that depicted in FIGS. 2A and 2B. In various examples, the media files of the first media gallery may be presented in the first order, as described above.

In some examples, the comment and/or the reaction may be presented as an overlay, overlapping, and/or proximate to the media file in the media gallery. In some examples, the communication platform may cause the comment and/or reaction to be presented based on a determination that a representation of the media file includes at least a minimum size. For example, a first size representation of the media file may include no reactions or comments, a second size representation may include reactions, and a third size representation may include reactions and comments.

FIG. 16 illustrates an example process 1600 for determining that a message includes a comment or a reaction to a media content and presenting the comment or the reaction in association with the media content in a media gallery, utilizing the techniques described herein. In some instances, some or all of process 1600 may be performed by one or more components in the systems 100 or 1200. By way of example and not limitation, the communication platform computing device referred to in process 1600 may be representative of a computing device associated with the communication platform 104 or communication platform server(s) 1202, the first user device referred to in process 1600 may be representative of the first user computing device(s) 106(1) and/or first computing device(s) 1204 and the second user device referred to in process 1600 may be representative of the second user computing device(s) 106(2) and/or second computing device(s) 1206. However, the process 1600 is not limited to being performed by the system 100 or 1200.

At operation 1602, the process 1600 may include receiving, from a first user device associated with a first user account, a media file for association with an album of a media gallery. The media file may include one or more photographs, videos, links, screenshots, graphic interchange format (GIF) images, and/or any other type of media content. In some examples, the communication platform determines the media file based on a file type associated therewith, such as JPEG, GIF, PNG, TIFF, BMP, AAC, MP3, WAV, MPEG-1, MPEG-2, AVI, hyperlink, and the like.

In some examples, the media file may be associated with a messaging thread. In some examples, the media file may be received from a memory of the first user device, such as from a camera roll associated therewith.

At operation 1604, the process 1600 may include identifying a second user account associated with a subscriber to the album. In various examples, the album may include a second user identifier associated with the subscriber. In some examples, a first user may designate the second user as a subscriber, such as when creating the album. In such examples, the first user may associate an identifier of the second user with the album.

At operation 1606, the process 1600 may include identifying a messaging thread between the first user account and the second user account. In various examples, the communication platform may identify the messaging thread based on the second user identifier and/or the second user account. The messaging thread may include one or more messages transmitted between the first user and the second user.

At operation 1608, the process 1600 may include causing a notification that the media file was associated with the album to be presented via the second user account in association with the messaging thread. In some examples, the notification may include a message sent via the messaging thread, indicating the new media file was added to the album. In some examples, the notification may include a pop-up notification or other means by which a messaging application may present a notification of a change to the album, such as that depicted in FIGS. 11B-11D.

Figure 17:
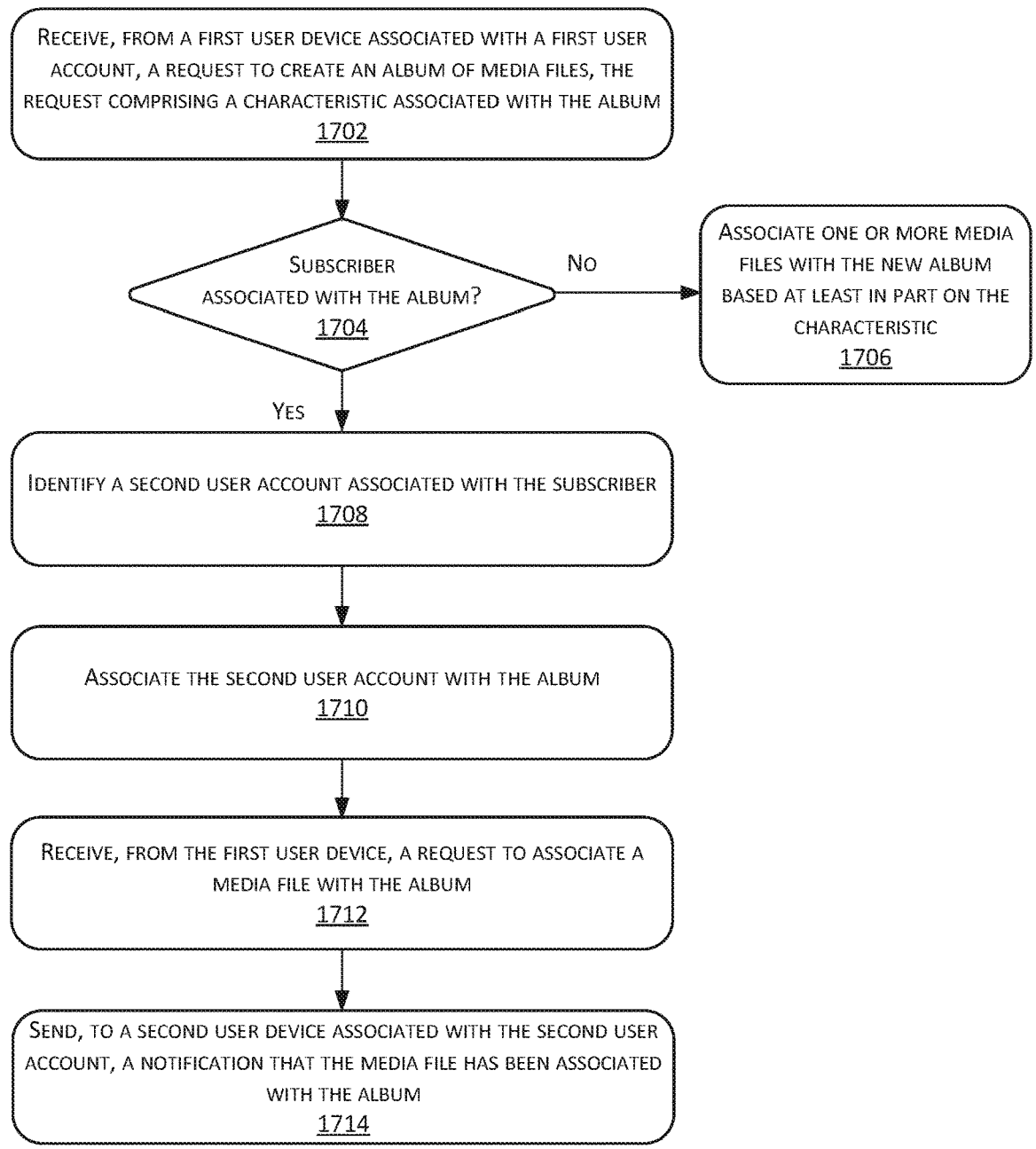
FIG. 17 illustrates an example process for generating an album of media content, utilizing the techniques described herein.

FIG. 17 illustrates an example process 1700 for generating an album of media content, utilizing the techniques described herein. In some instances, some or all of process 1700 may be performed by one or more components in the systems 100 or 1200. By way of example and not limitation, the communication platform computing device referred to in process 1700 may be representative of a computing device associated with the communication platform 104 or communication platform server(s) 1202, the first user device referred to in process 1700 may be representative of the first user computing device(s) 106(1) and/or first computing device(s) 1204 and the second user device referred to in process 1700 may be representative of the second user computing device(s) 106(2) and/or second computing device(s) 1206. However, the process 1700 is not limited to being performed by the system 100 or 1200.

At operation 1702, the process 1700 may include receiving, from a first user device associated with a first user account, a request to create an album of media files, the request comprising a characteristic associated with the album. The request to create an album of media files may include an indication of selection of a create new album selectable option, such as the new album selectable option 908 illustrated in FIG. 9A. In some examples, the request may be received via an album page of a media gallery associated with the first user account.

The characteristic associated with the album may include a user with whom the media content is shared, a date or date range associated with the media file(s), a type of media file(s), a location associated with the media file(s), reaction(s) to media file(s), people and/or objects associated with the media file(s) (e.g., captured in images, etc.), and the like. In various examples, the characteristics may be stored as metadata corresponding to the media files associated with a media gallery.

At operation 1704, the process 1700 may include determining whether a subscriber is associated with the album. In various examples, the communication platform may cause a new album window, such as new album creation window 910 of FIG. 9B, to be presented via the first user device. In some examples, the new album creation window may provide an option for the first user to add subscribers (e.g., add other users to the album). In some examples, the communication platform may determine whether subscribers are associated to the album based on an input from the first user via the new album creation window, such as the first user providing an indication and/or identifier associated with the subscriber.

Based on a determination that the subscriber is not associated with the album ("No" at operation 1704) the process 1700, at operation 1706, may include associating one or more media files with the album based at least in part on the characteristic. The communication platform may analyze media files associated with the media gallery to determine one or more media files that include the characteristic. In some examples, the analysis may include image processing techniques, such as facial and/or object recognition. In such examples, the communication platform may identify images and/or videos that include particular people and/or objects, such as based on the characteristics.

Based on a determination that the subscriber is associated with the album ("Yes" at operation 1704) the process 1700, at operation 1708, may include identifying a second user account associated with the subscriber. In some examples, the communication platform may determine that the subscriber is associated with the album based on an input from the first user via the new album creation window, such as the first user providing an indication and/or identifier associated with the subscriber (e.g., second user identifier). In such examples, the communication platform may identify the second user account based on a second user identifier.

At operation 1710, the process 1700 may include associating the second user account with the album. In various examples, the communication platform may store the second user identifier in association with the album.

At operation 1712, the process 1700 may include receiving, from the first user device, a request to associate a media file with the album. In various examples, the request may include an indication of selection of a selectable option to add a media file to the album, such as that depicted in FIG. 11A. In various examples, the media file may be stored on a datastore associated with the user device, such as in a camera roll associated therewith. In some examples, the media file may be stored in a media gallery associated with the first user, such as that shared with the first user by another user via a messaging thread.

At operation 1714, the process 1700 may include sending, to a second user device associate with the second user account, a notification that the media file has been associated with the album. In some examples, the notification may include a message sent via the messaging thread, indicating the new media file was added to the album. In some examples, the notification may include a pop-up notification or other means by which a messaging application may present a notification of a change to the album, such as that depicted in FIGS. 11B-11D.

Figure 18:
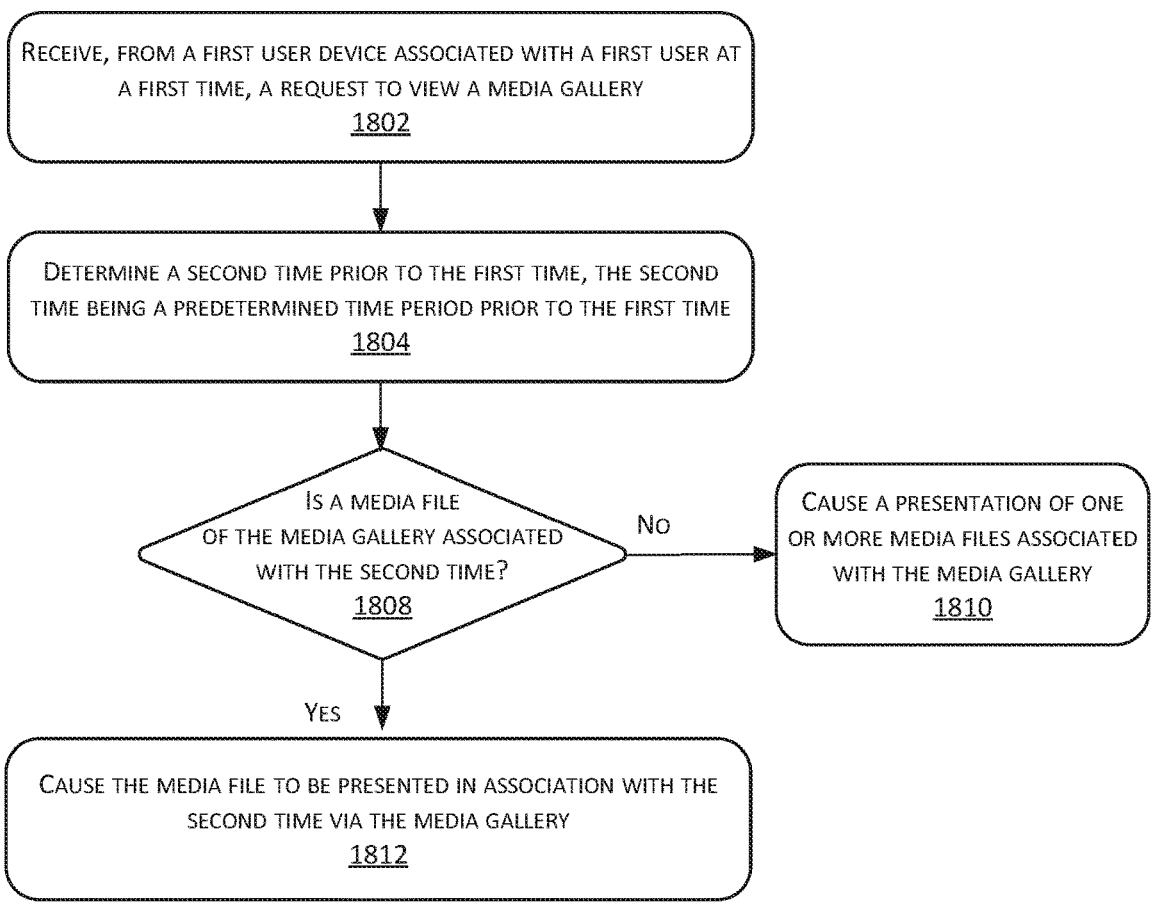
FIG. 18 illustrates an example process for providing a notification to an album subscriber of a recently added media content, utilizing the techniques described herein.

FIG. 18 illustrates an example process 1800 for providing a notification to an album subscriber of a recently added media content, utilizing the techniques described herein. In some instances, some or all of process 1800 may be performed by one or more components in the systems 100 or 1200. By way of example and not limitation, the communication platform computing device referred to in process 1800 may be representative of a computing device associated with the communication platform 104 or communication platform server(s) 1202, the first user device referred to in process 1800 may be representative of the first user computing device(s) 106(1) and/or first computing device(s) 1204 and the second user device referred to in process 1800 may be representative of the second user computing device(s) 106(2) and/or second computing device(s) 1206. However, the process 1800 is not limited to being performed by the system 100 or 1200.

At operation 1802, the process 1800 may include receiving, from a first user device associated with a first user at a first time, a request to view a media gallery. In various examples, the request to view the media gallery may include an indication of selection of a media gallery icon, such as media gallery selectable option 212 of FIG. 2.

At operation 1804, the process 1800 may include determining a second time prior to the first time, the second time being a predetermined time period prior to the first time. The predetermined time period may include a month, a year, two years, or any other span of time. In various examples, the communication platform may determine a date associated with the second time. For example, the communication platform may determine a date associated with one year prior to the request to view the media gallery.

At operation 1806, the process 1800 may include determining whether a media file of the media gallery is associated with the second time. In some examples, the communication platform may determine whether the media file is associated with the second time based on a timestamp associated therewith, such as that saved in metadata associated with the media file. The timestamp may be associated with a date and/or time the media file was generated (e.g., created, captured, etc.) and/or was shared via a messaging thread.

Based on a determination that the media gallery does not include a media file that is associated with the second time ("No" at operation 1806) the process 1800, at operation 1810, may include causing a presentation of one or more media files associated with the media gallery. The one or more media files may include media file(s) that were shared between the first user and one or more other users via a messaging thread associated with a messaging application.

Based on a determination that the media gallery does include a media file that is associated with the second time ("Yes" at operation 1806) the process 1800, at operation 1812, may include causing the media file to be presented in association with the second time via the media gallery. In various examples, the media file may be presented as a memory, such as memories 222 of FIG. 2B and 408 of FIG. 4A.

In various examples, such as that described with regard to FIGS. 4A-4C, the communication platform may enable the first user to view one or more messages associated with the memory. In some examples, responsive to receiving an indication of selection of the media file, the communication platform may cause the one or more messages of the associated messaging thread to be presented via the first user device. In some examples, the one or more messages may be identified based on a conversation identifier, a first message identifier, and/or a last message identifier associated with a conversation corresponding to the media file. In some examples, the communication platform may cause the messaging thread associated with the media file to be presented at a time associated with a sharing of the media file.

In some examples, the communication platform may enable the first user to share the memory with one or more other users, such as that described with regard to FIGS. 4C-4E. In such examples, the communication platform may send the memory to the selected other users via one or more messaging threads associated therewith.

Figure 19:
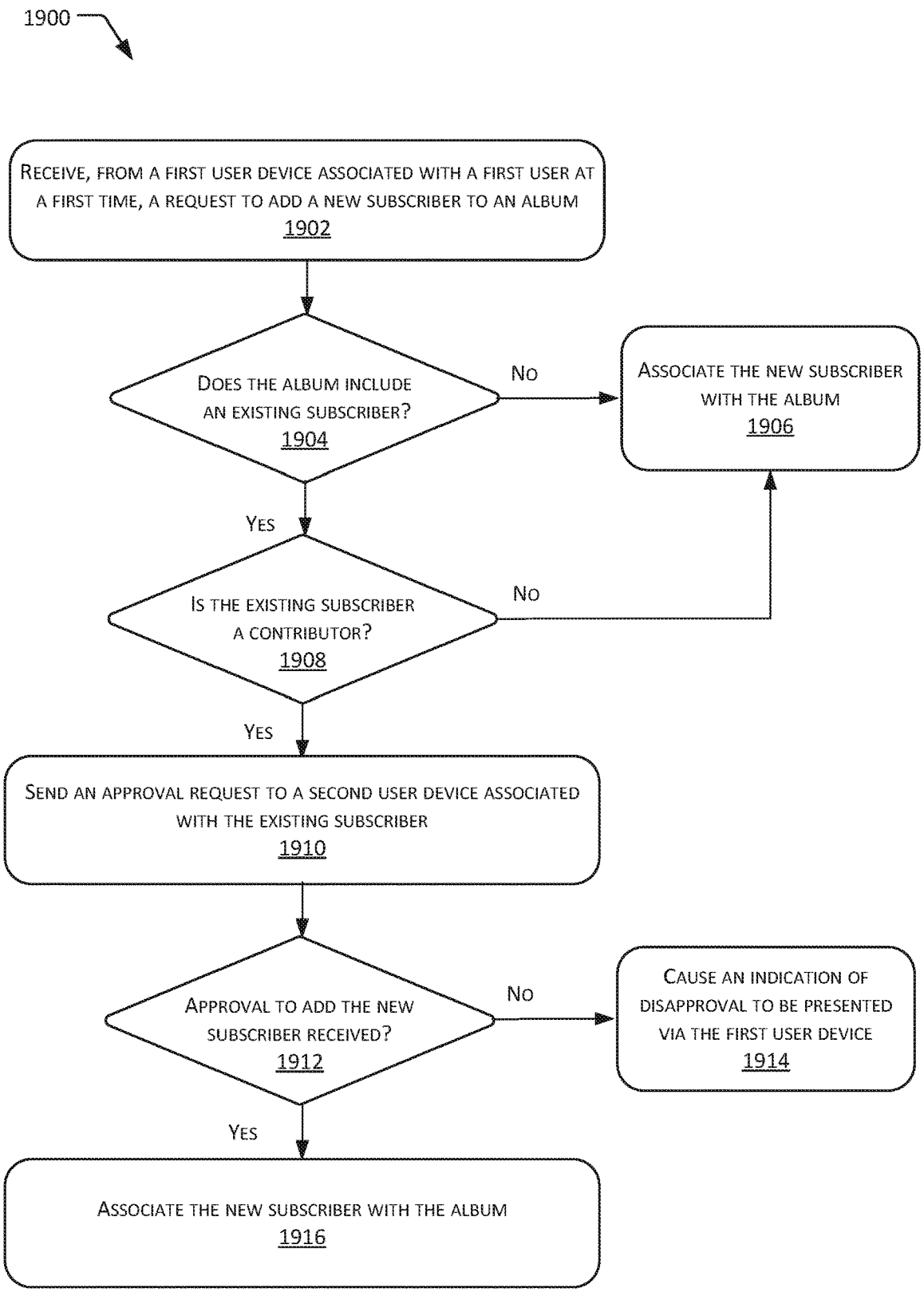
FIG. 19 illustrates an example process for requesting approval of an additional subscriber to an album, utilizing the techniques described herein.

FIG. 19 illustrates an example process 1900 for requesting approval of an additional subscriber to an album, utilizing the techniques described herein. In some instances, some or all of process 1900 may be performed by one or more components in the systems 100 or 1200. By way of example and not limitation, the communication platform computing device referred to in process 1900 may be representative of a computing device associated with the communication platform 104 or communication platform server(s) 1202, the first user device referred to in process 1900 may be representative of the first user computing device(s) 106(1) and/or first computing device(s) 1204 and the second user device referred to in process 1900 may be representative of the second user computing device(s) 106(2) and/or second computing device(s) 1206. However, the process 1900 is not limited to being performed by the system 100 or 1200.

At operation 1902, the process 1900 may include receiving, from a first user device associated with a first user, a request to add a new subscriber to an album. The album may include an existing album of a media gallery including one or more media files. The communication platform may identify the new subscriber based on a user identifier associated therewith.

At operation 1904, the process 1900 may include determining whether the album includes an existing subscriber. The existing subscriber may include a second user associated with the album configured to receive at least notifications of modifications to the album. The modifications may include content added to the album, removed from the album, or the like. In various examples, the communication platform may determine whether the existing subscriber is associated with the album based on a determination that a second user identifier is associated with the album.

Based on a determination that the album does not include an existing subscriber ("No" at operation 1904), the process 1900, at operation 1906, may include associating the subscriber with the album. In some examples, the communication platform may associate the user identifier associated with the new subscriber to the album. In various examples, the communication platform may determine a messaging thread identifier associated with a messaging thread between the user and the new subscriber. In such examples, the communication platform may associate the messaging thread identifier with the album, such as for sending notifications of updates thereto.

Based on a determination that the album does include the existing subscriber ("Yes" at operation 1904), the process 1900, at operation 1908, may include determining whether the existing subscriber is a contributor. A contributor may include another user (other than the first user) who may add and/or remove content from the album. In some examples, an initiating user of the album (e.g., user associated with album creation) may designate one or more subscribers as contributors, such as that illustrated in FIG. 10C. The communication platform may store the contributor designation in association with the album and may enable the first user and designated contributors to modify the contents of the album.

Based on a determination that the existing subscriber is not a contributor ("No" at operation 1908), the process 1900 may include associating the new subscriber with the album, such as that described with regard to operation 1906.

Based on a determination that the existing subscriber is a contributor ("Yes" at operation 1908), the process 1900, at operation 1910, may include sending an approval request to a second user device associated with the existing subscriber. The approval request may include a request to approve the new subscriber. In some examples, the approval request may provide a means by which contributors to the album may approve or deny permissions to other users (e.g., new subscriber) to view content of the album to which the contributor contributes.

At operation 1912, the process 1900 may include determining whether an approval to add the new subscriber was received. In some examples, the communication platform may receive a response to the approval request as an indication of selection of an approval option or a denial option included in the approval request. In some examples, the approval request may be sent as a text and/or electronic mail message. In such examples, the response to the approval request may be sent as a reply to the text and/or electronic mail message. In some examples, the approval request may be sent as a message in a messaging thread between the contributor and the first user and/or the contributor and the communication platform. In such examples, the response to the approval request may be sent as another message in the messaging thread.

Based on a determination that the approval was not received ("No" at operation 1912), the process 1900, at operation 1914, may include causing an indication of disapproval to be presented via the first user device. The indication of disapproval may provide a contributor identifier associated with the denial of the addition of the new subscriber to the album.

Based on a determination that the approval was received ("Yes" at operation 1912), the process 1900, at operation 1916, may include associating the new subscriber with the album. In some examples, the communication platform may associate the user identifier associated with the new subscriber to the album. In various examples, the communication platform may determine a messaging thread identifier associated with a messaging thread between the user and the new subscriber. In such examples, the communication platform may associate the messaging thread identifier with the album, such as for sending notifications of updates thereto.

As stated above, the order in which the operations are described is not intended to be construed as a limitation, and any number of the described operations may be combined in any order and/or in parallel to implement the processes. In some embodiments, one or more operations of the above-described methods may be omitted entirely. By way of example and not limitation, operations 1302 and 1304 may be performed without operations 1306-1312 and/or operations 1502-1506 may be performed without operations 1508-1516. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving a first message associated with a messaging thread including messages between a first user and a second user, wherein the first message is received at a first time and the messages are transmitted between a first instance of an application on a first user device associated with the first user and a second instance of the application on a second user device associated with the second user;
   determining that the first message comprises a media file;
   associating the media file with a first media gallery associated with a first user account of the first user, wherein the first media gallery comprises media files associated with multiple messaging threads between the first user, the second user, and one or more other users;
   receiving, from the second user device via the second instance of the application, a second message associated with the messaging thread, the second message received at a second time after the first time;

determining that the second message includes at least one of a first comment or a first reaction to the media file;
associating the at least one of the first comment or the first reaction with the media file;
receiving, from the first user device via the first instance of the application, a request to view the first media gallery;
causing the first media gallery including the media file to be presented at the first user device via the first instance of the application based at least in part on the request to view the first media gallery, wherein the at least one of the first comment or the first reaction is presented in association with the media file;
storing an association between the media file, the first message, and the second message, the association being stored as a memory, wherein the memory comprises previously generated media content including the media file;
receiving, from the first user device via the first instance of the application, a request to share the memory;
sending the memory to the second user device via the second instance of the application, the memory including a link to the first message and the second message in the messaging thread; and
causing the memory and the link to be presented at the second user device via the second instance of the application, the memory and the link presented within the messaging thread and the memory including a preview of at least one of the media file, the first message, or the second message.

2. The method of claim 1, the method further comprising:
receiving, from the first user device via the first media gallery associated with the first user account, an indication of selection of the media file;
determining that the messaging thread is associated with the media file; and
causing the messaging thread to be presented at the first user device via the first instance of the application based at least in part on the indication of selection.

3. The method of claim 1, wherein the messages comprise a first group of messages, and the media file comprises a first media file, the method further comprising:
processing a second group of messages associated with a second messaging thread of the multiple messaging threads, the second messaging thread being between the first user and a third user, wherein the second group of messages are transmitted between the first instance of the application and a third instance of the application on a third device associated with the third user;
determining that a second message of the second group of messages comprises a second media file received at a third time prior to the first time; and
associating the second media file with the first media gallery;
wherein causing the first media gallery to be presented comprises causing the first media file and the second media file to be presented at the first user device via the first instance of the application.

4. The method of claim 1, the method further comprising:
determining a third time associated with the request to view the first media gallery; and
identifying a second media file associated with a fourth time, the fourth time being a predetermined time period prior to the third time;
wherein causing the first media gallery to be presented comprises causing the second media file to be presented based at least in part on the predetermined time period.

5. The method of claim 4, further comprising:
receiving, from the first user device, an indication of selection of the second media file;
determining a second messaging thread associated with the second media file; and
causing the second messaging thread to be presented at the first user device via the first instance of the application based at least in part on the indication of selection of the second media file, wherein the second media file associated with the fourth time is presented with the second messaging thread.

6. The method of claim 1, further comprising:
associating the media file with a second media gallery associated with a second user account of the second user, wherein the second media gallery comprises a plurality of media files associated with a plurality of messaging threads between the second user and a second plurality of users;
receiving, from the second user device via the second instance of the application, a request to view the second media gallery; and
causing the media file to be presented at the second user device via the second instance of the application based at least in part on the request to view the second media gallery.

7. The method of claim 1, wherein determining that the second message includes the first comment or the first reaction to the media file is based at least in part on determining at least one of:
a time period between the first message and the second message is less than a threshold time period;
the second message is proximate the first message in the messaging thread; or
a content of the second message is associated with the media file.

8. The method of claim 1, wherein the media files are presented in chronological order within the first media gallery based on a time associated with creation of individual media files of the media files.

9. The method of claim 1, wherein the memory includes a synopsis that includes the preview of the at least one of the media file, the first message, or the second message and further includes at least one of a time period associated with the memory, a date associated with the memory, or an identifier or a name of a user associated with the memory.

10. A computing system comprising:
one or more processors; and
computer readable media storing instructions that, when executed by the one or more processors, cause the computing system to:
receive a first message associated with a messaging thread including messages between a first user and a second user, wherein the messages are transmitted between a first instance of an application on a first user device associated with the first user and a second instance of the application on a second user device associated with the second user;
determine that the first message comprises a media file;
associate the media file with a first media gallery associated with a first user account of the first user, wherein the first media gallery comprises media files associated with multiple messaging threads between the first user, the second user, and one or more other users;
receive, from the second user device via the second instance of the application, a second message associated with the messaging thread;

determine that the second message includes at least one of a first comment or a first reaction to the media file;

associate the at least one of the first comment or the first reaction with the media file;

receive, from the first user device via the first instance of the application, a request to view the first media gallery;

cause the first media gallery including the media file to be presented at the first user device via the first instance of the application based at least in part on the request to view the first media gallery, wherein the at least one of the first comment or the first reaction is presented in association with the media file;

store an association between the media file, the first message, and the second message, the association being stored as a memory, wherein the memory comprises previously generated media content including the media file;

receive, from the first user device via the first instance of the application, a request to share the memory;

send the memory to the second user device via the second instance of the application, the memory including a link to the first message and the second message in the messaging thread; and cause the memory and the link to be presented at the second user device via the second instance of the application, the memory and the link presented within the messaging thread and the memory including a preview of at least one of the media file, the first message, or the second message.

11. The computing system of claim 10, the instructions further causing the computing system to:

receive, from the first user device via the first media gallery associated with the first user account, at least one of a second comment or a second reaction to the media file;

associate the at least one of the second comment or the second reaction with the media file; and send, to the second user device via the second instance of the application, the at least one of the second comment or the second reaction as a third message associated with the messaging thread; and cause the at least one of the second comment or the second reaction to be presented via the first media gallery in association with the media file.

12. The computing system of claim 10, the instructions further causing the computing system to:

determine a characteristic of the media file, wherein the characteristic comprises at least one of:
an object captured in the media file;
a location associated with the media file; or
a time associated with a capture of the media file;
identify an album corresponding to the first media gallery that is associated with the characteristic; and
associate the media file with the album.

13. The computing system of claim 10, wherein the first media gallery comprises a plurality of media files, the instructions further causing the computing system to:

receive, from the first user device via the first media gallery associated with the first user account, a request to view one or more albums associated with the first media gallery, each of the one or more albums having associated therewith at least one media file of the plurality of media files; and cause the one or more albums to be presented at the first user device via the first instance of the application based at least in part on the request to view the one or more albums.

14. The computing system of claim 10, wherein the memory includes a synopsis that includes the preview of the at least one of the media file, the first message, or the second message and further includes at least one of a time period associated with the memory, a date associated with the memory, or an identifier or a name of a user associated with the memory.

15. One or more non-transitory computer readable media storing instructions that, when executed by one or more processors of a computing device, cause the computing device to:

receive a first message associated with a messaging thread including messages between a first user and a second user, wherein the messages are transmitted between a first instance of an application on a first user device associated with the first user and a second instance of the application on a second user device associated with the second user;

determine that the first message comprises a media file;

associate the media file with a first media gallery associated with a first user account of the first user, wherein the first media gallery comprises media files associated with multiple messaging threads between the first user, the second user, and one or more other users;

receive, from the second user device via the second instance of the application, a second message associated with the messaging thread;

determine that the second message includes at least one of a first comment or a first reaction to the media file;

associate the at least one of the first comment or the first reaction with the media file;

receive, from the first user device via the first instance of the application, a request to view the first media gallery;

cause the first media gallery including the media file to be presented at the first user device via the first instance of the application based at least in part on the request to view the first media gallery, wherein the at least one of the first comment or the first reaction is presented in association with the media file;

store an association between the media file, the first message, and the second message, the association being stored as a memory, wherein the memory comprises previously generated media content including the media file;

receive, from the first user device via the first instance of the application, a request to share the memory;

send the memory to the second user device via the second instance of the application, the memory including a link to the first message and the second message in the messaging thread; and cause the memory and the link to be presented at the second user device via the second instance of the application, the memory and the link presented within the messaging thread and the memory including a preview of at least one of the media file, the first message, or the second message.

16. The one or more computer readable media of claim 15, the instructions further causing the computing device to:

determine a characteristic of the media file, wherein the characteristic comprises at least one of:
an object captured in the media file;
a location associated with the media file; or
a time associated with a capture of the media file;
identify an album corresponding to the first media gallery that is associated with the characteristic, the album comprising at least one media file including the characteristic; and
associate the media file with the album.

17. The one or more computer readable media of claim 16, the instructions further causing the computing device to:
receive, from the first user device via the first media gallery associated with the first user account, a request to share the album with a third user; and
send, to a third user device associated with the third user, an instance of the album.

18. The one or more computer readable media of claim 16, the instructions further causing the computing device to:
receive, from the first user device via the first media gallery associated with the first user account, a request to modify the characteristic associated with the album;
associate a modified characteristic with the album;
determine, based at least in part on the modified characteristic, that the media file is not associated with the album; and
remove an association between the media file and the album, wherein responsive to removing the association, the media file is presented via the first media gallery but not via the album associated therewith.

19. The one or more computer readable media of claim 16, the instructions further causing the computing device to:
receive, from the first user device via the first media gallery associated with the first user account, a request to add a person to the album; and
receive at least one of:
an indication of a user identifier corresponding to a second user account associated with the person; or
a second media file comprising an image of the person;
identify one or more media files associated with the person; and
cause the one or more media files to be presented in association with the album.

20. The one or more computer readable media of claim 15, the instructions further causing the computing device to:
receive, from the first user device via the first media gallery associated with the first user account, a request to create an album comprising one or more media files, the request comprising a characteristic associated with the album, the characteristic comprising at least one of:
an object captured in the media file;
a location associated with the media file; or
a time associated with a capture of the media file;
identify the one or more media files of a plurality of media files that comprise the characteristic;
associate the one or more media files with the album;
receive, from the first user device via the first media gallery associated with the first user account, a request to view the album; and
cause the album comprising the one or more media files to be presented at the first user device based at least in part on the request to view the album.

\* \* \* \* \*